US009226265B2

(12) United States Patent
Gupta et al.

(10) Patent No.: US 9,226,265 B2
(45) Date of Patent: Dec. 29, 2015

(54) DEMAND-BASED MULTIMEDIA BROADCAST MULTICAST SERVICE MANAGEMENT

(75) Inventors: Ajay Gupta, San Diego, CA (US); Gang Bao, San Diego, CA (US); George Cherian, San Diego, CA (US); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 13/445,864

(22) Filed: Apr. 12, 2012

(65) Prior Publication Data

US 2012/0263089 A1    Oct. 18, 2012

Related U.S. Application Data

(60) Provisional application No. 61/476,229, filed on Apr. 15, 2011, provisional application No. 61/507,530, filed on Jul. 13, 2011.

(51) Int. Cl.
| H04H 20/71 | (2008.01) |
| H04W 72/00 | (2009.01) |
| H04W 4/06 | (2009.01) |
| H04W 28/08 | (2009.01) |
| H04W 64/00 | (2009.01) |

(52) U.S. Cl.
CPC .............. *H04W 72/005* (2013.01); *H04W 4/06* (2013.01); *H04W 28/08* (2013.01); *H04W 64/00* (2013.01)

(58) Field of Classification Search
USPC ........................................................ 370/312
See application file for complete search history.

(56) References Cited

U.S. PATENT DOCUMENTS

| 6,914,894 B2 | 7/2005 | Wilmer et al. |
| 7,886,056 B2 | 2/2011 | Collet et al. |

(Continued)

FOREIGN PATENT DOCUMENTS

| EP | 2202919 A1 | 6/2010 |
| EP | 2362705 A1 | 8/2011 |

(Continued)

OTHER PUBLICATIONS

3GPP TS 23.246 V10.0.0, Multimedia Broadcast/Multicast Services (MBMS), Architecture and functional description, dated Mar. 2011, published by 3GPP Organizational Partners.*

(Continued)

*Primary Examiner* — Gregory Sefcheck
*Assistant Examiner* — Majid Esmaeilian
(74) *Attorney, Agent, or Firm* — Novak Druce Connolly Bove + Quigg LLP

(57) ABSTRACT

A method or system for managing demand-based multicast services in a wireless communications system (WCS) capable of both unicast and multicast signaling may include providing content requested by a mobile entity in an area of the WCS via a unicast session, determining that a concurrent demand level for the content exceeds a defined threshold for the area of the WCS, and initiating a multicast session for the content in the area of the WCS, in response to determining the concurrent demand level has exceeded the threshold. The method or system may include more detailed operations or aspects for measuring the concurrent demand level, transitioning signaling between unicast and multicast modes, communicating between network components, or related functions.

76 Claims, 36 Drawing Sheets

(56) References Cited

U.S. PATENT DOCUMENTS

| | | | |
|---|---|---|---|
| 8,340,011 B2 | 12/2012 | Kenagy | |
| 2008/0008179 A1* | 1/2008 | Chen et al. | 370/392 |
| 2008/0267109 A1 | 10/2008 | Wang et al. | |
| 2008/0274759 A1 | 11/2008 | Chen et al. | |
| 2009/0067395 A1* | 3/2009 | Curtis et al. | 370/338 |
| 2010/0080159 A1* | 4/2010 | Hu et al. | 370/312 |
| 2011/0096669 A1* | 4/2011 | Iovieno et al. | 370/241 |
| 2013/0007814 A1 | 1/2013 | Cherian et al. | |
| 2013/0182643 A1 | 7/2013 | Pazos et al. | |
| 2013/0294321 A1 | 11/2013 | Wang et al. | |

FOREIGN PATENT DOCUMENTS

| | | |
|---|---|---|
| WO | 02102132 A2 | 12/2002 |
| WO | 2007068290 A1 | 6/2007 |

OTHER PUBLICATIONS

Co-pending U.S. Appl. No. 14/153,888, filed Jan. 13, 2014.
Co-pending U.S. Appl. No. 14/264,132, filed Apr. 29, 2014.
Co-pending U.S. Appl. No. 14/302,502, filed Jun. 12, 2014.
Co-pending U.S. Appl. No. 14/305,557, filed Jun. 16, 2014.
Ericsson: "LTE MBMS functionality", 3GPP Draft; R3-070140, 3rd Generation Partnership Project (3GPP), Mobile Competence Centre; 650, Route Des Lucioles; F-06921 Sophia-Antipolis Cedex; France, vol. RAN WG3, no. St. Louis, Missouri; Feb. 7, 2007, XP050161070, [retrieved on Feb. 7, 2007].
International Search Report and Written Opinion—PCT/US2012/033550—ISA/EPO—Aug. 22, 2012.
NEC: "DISC on MBMS service activation/deactivation further to counting", 3GPP DRAFT; R2-106488, 3rd Generation Partnership Project (3GPP), Mobile Competence Centre; 650, Route Des Lucioules; F-06921 Sophia-Antipolis Cedex; France, vol. RAN WG2, no. Jacksonville, USA, Nov. 8, 2010, XP050466202, [retrieved on Nov. 11, 2010].
New Postcom: "Corrections on MBMS counting", 3GPP DRAFT; R3-110024, 3rd Generation Partnership Project (3GPP), Mobile Competence Centre; 650, Route Des Lucioles; F-06921 Sophia-Antipolis Cedex; France, vol. RAN WG3, no. Dublin, Ireland; Jan. 11, 2011, XP050497088, [retrieved on Jan. 11, 2011].
Nokia Siemens Networks et al., "MBMS architecture for SAE/LTE", 3GPP DRAFT; S2-072471, 3rd Generation Partnership Project (3GPP), Mobile Competence Centre; 650, Route Des Lucioles; F-06921 Sophia-Antipolis Cedex; France, vol. SA WG2, no. Orlando; Jun. 19, 2007, XP050260073, [retrieved on Jun. 19, 2007].
Partial International Search Report—PCT/US2012/033550—ISA/EPO—Jun. 21, 2012.
Philips: "On the issue of switching between p2p and p2m—channels in MBMS", 3GPP DRAFT; R2-030078, 3rd Generation Partnership Project (3GPP), Mobile Competence Centre; 650, Route Des Lucioles; F-06921 Sophia-Antipolis Cedex; France, vol. RAN WG2, no. UK, Jan. 13, 2003, XP050141520, [retrieved on Jan. 13, 2003].

* cited by examiner

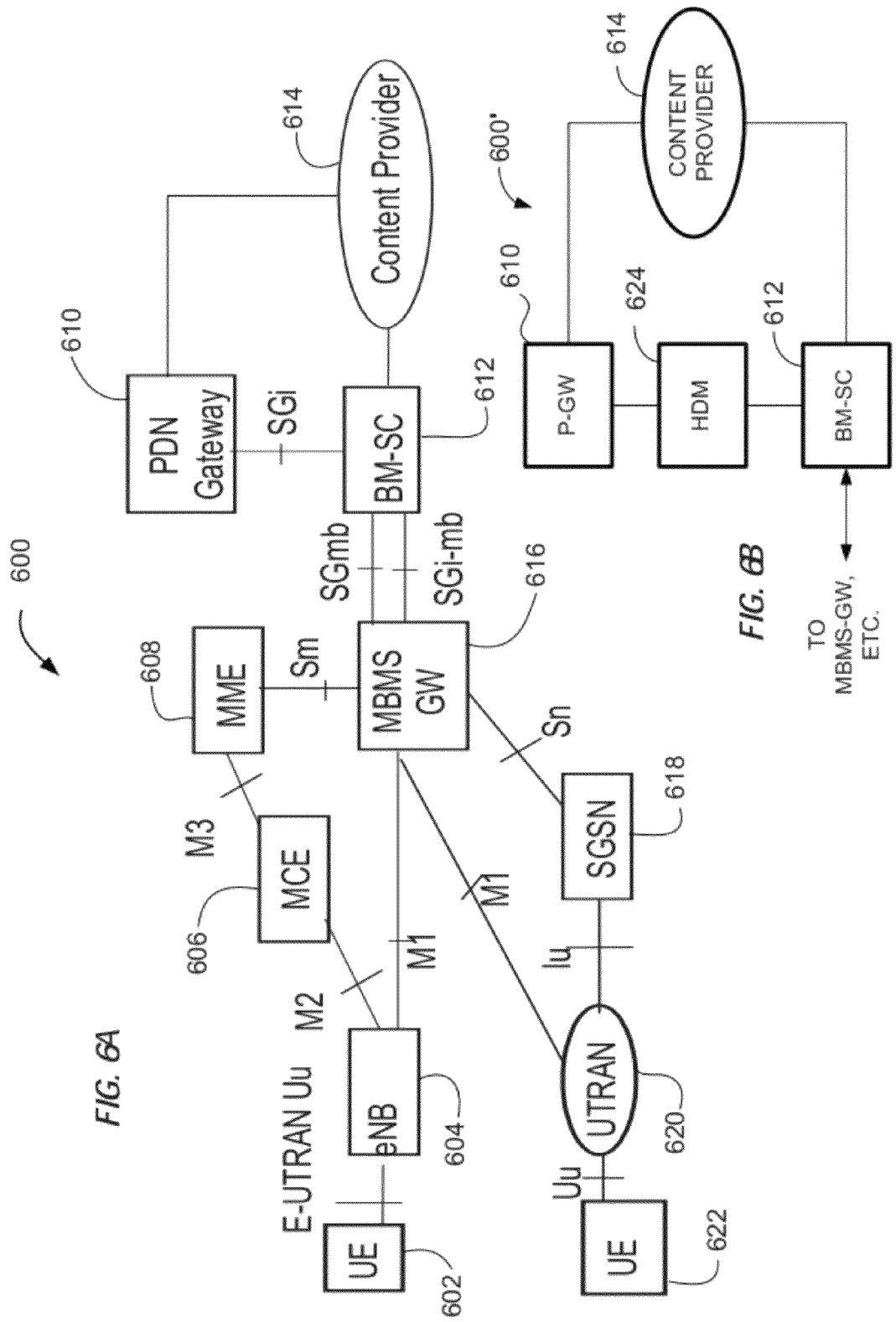

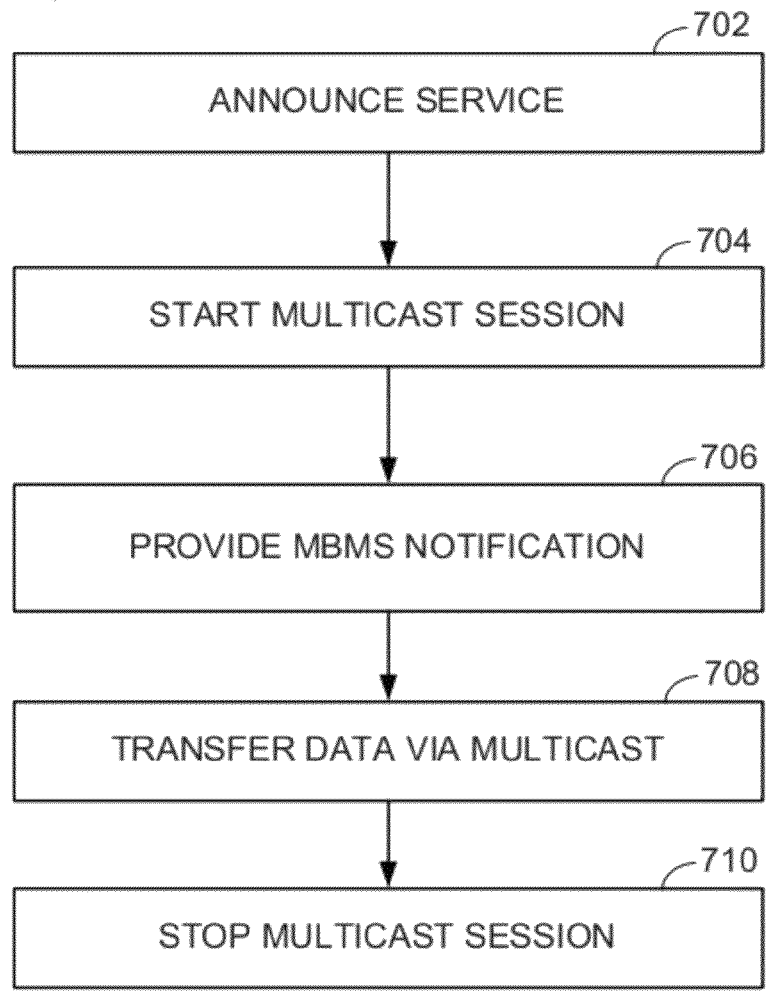
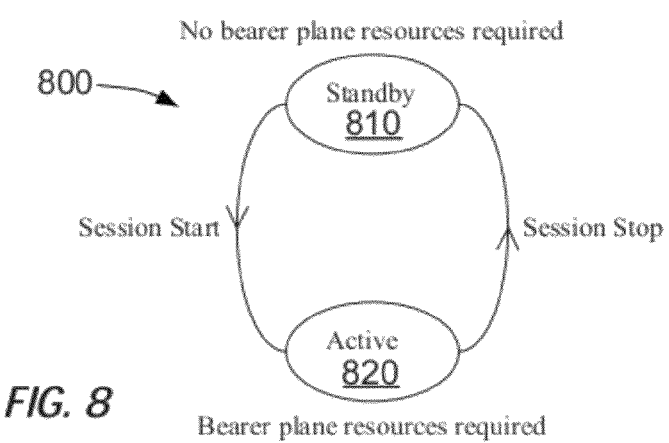

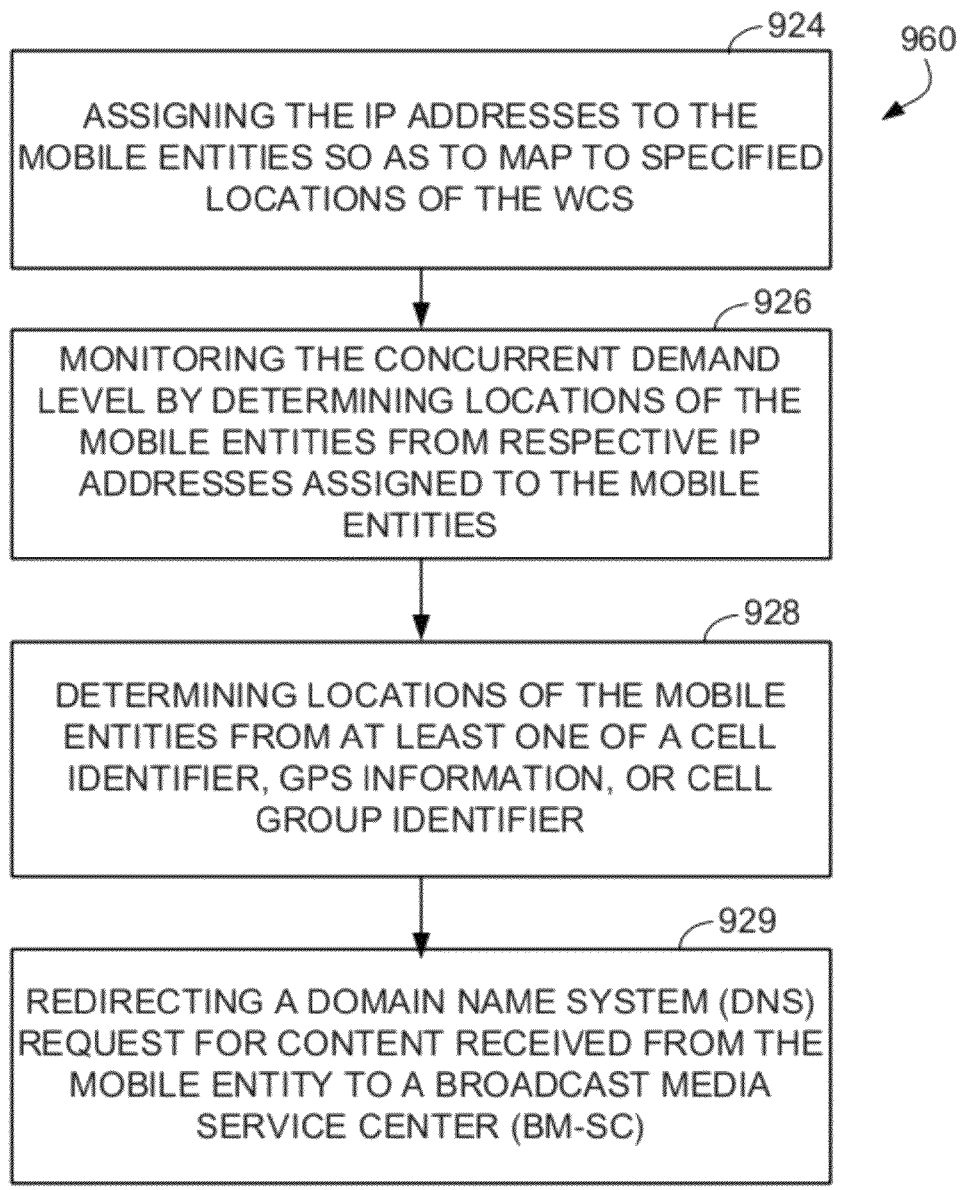

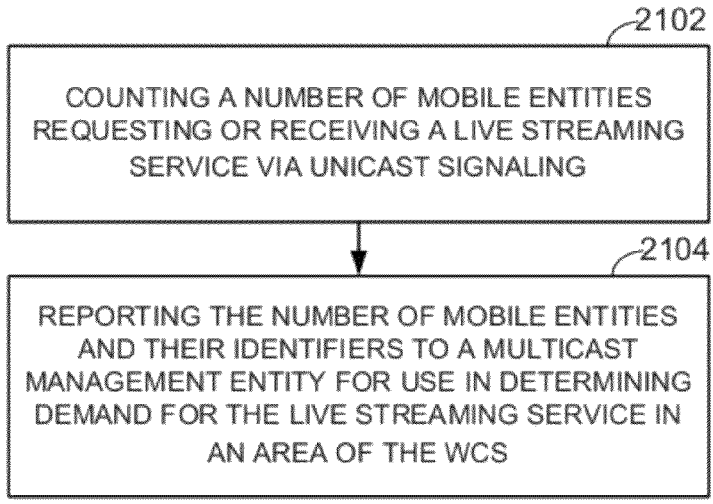
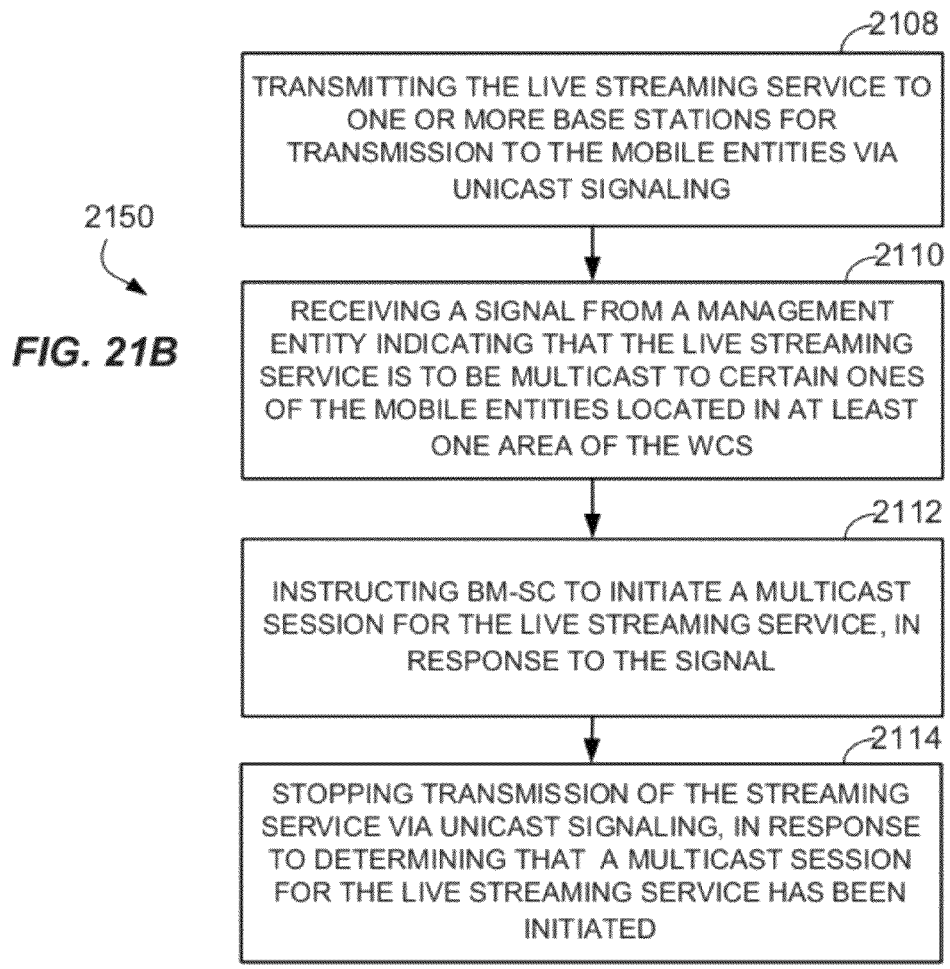

DEMAND-BASED MULTIMEDIA BROADCAST MULTICAST SERVICE MANAGEMENT

CROSS-REFERENCE TO RELATED APPLICATIONS

This application claims priority pursuant to 35 U.S.C. §119 (e) to U.S. provisional application Ser. No. 61/476,229 filed Apr. 15, 2011 and to U.S. provisional application Ser. No. 61/507,530 filed Jul. 13, 2011, which applications are hereby incorporated by reference, in their entireties.

BACKGROUND

1. Field

Aspects of the present disclosure relate generally to wireless communication systems, and more particularly, to managing demand-based Multimedia Broadcast Multicast Service in a wireless communications network.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

SUMMARY

Methods, apparatus and systems for managing demand-based Multimedia Broadcast Multicast Service in a wireless communications network are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for managing demand-based multicast services in a wireless communications system (WCS) capable of both unicast and multicast signaling, may include providing content requested by a mobile entity in an area of the WCS via a unicast session. The method may further include determining that a concurrent demand level for the content exceeds a defined threshold for the area of the WCS, and initiating a multicast session for the content in the area of the WCS, in response to determining the concurrent demand level has exceeded the threshold.

In related aspects, the method may include stopping transmission of the content via the unicast session for the mobile entity located in the area of the WCS, after initiating the multicast session. The method may also include establishing multicast areas for the content, in advance of providing the content via a unicast session. The method may include publishing availability of the content to the mobile entities, in advance of providing the content via a unicast session. In addition, the method may include resuming providing of the content via a unicast session, for a mobile entity receiving the content via the multicast session, in response to detecting that a number of mobile entities receiving the content via the multicast session has dropped below a defined threshold. The method may include redirecting a Domain Name System (DNS) request for content received from the mobile entity to a Broadcast Media Service Center (BM-SC).

In other aspects related to monitoring concurrent demand for multicast, the method may include monitoring the concurrent demand level by counting a number of requests in the area of the WCS for the content received via respective base stations of the WCS. The method may further include recognizing the requests for the content using a Uniform Resource Locator (URL) that is common to the requests.

In an alternative, or in addition, the method may include monitoring the concurrent demand level by determining locations of the mobile entities from respective source Internet Protocol (IP) addresses assigned to the mobile entities. In such case, the method may include assigning the IP addresses to the mobile entities so as to map to specified locations of the WCS. The method may also include determining locations of the mobile entities from at least one of a cell identifier, Global Positioning System (GPS) information, tracking area identifier or cell group identifier.

In another aspect, determining that the current demand level for the content exceeds the defined threshold may include obtaining a count of a number of mobile entities presently receiving the content in respective unicast sessions, and comparing the count to the defined threshold. For example, obtaining the count of the number of mobile entities may include receiving one or more reporting messages from respective mobile entities, and based at least in part on the one or more reporting messages, determining the count. A respective reporting message may include a listing of one or URLs and/or temporary mobile group identifiers (TMGIs) corresponding to content being received via one or more sessions, and wherein obtaining the count comprises counting a number of mobile entities providing respective URLs or TMGIs corresponding to the content in their reporting messages. The method may include periodically receiving the one or more reporting messages from the respective mobile entities.

In other aspects, the method may include sending one or more control messages to one or more respective mobile entities to command the one or more respective mobile entities to provide the one or more reporting messages. In some embodiments, obtaining the count of the number of mobile entities may include counting a number of socket-based connections corresponding to the mobile entities presently receiving the content in respective unicast sessions.

In another aspect, a method for managing demand-based multicast services in a wireless communications system capable of both unicast and multicast signaling may be performed by a Multicast Coordinating Entity (MCE). The method may include receiving time-related demand information for a content associated with a prospective multicast session. The method may further include determining a multicast area for the prospective multicast session, in response to the time-related demand information, and communicating with one or more base stations to set up the multicast area. The method may further include communicating with one or more base stations to tear down the multicast area in response to determining that a corresponding multicast session is finished.

In another aspect, an alternative method for managing demand-based multicast services at a network entity of a wireless communications system capable of both unicast and multicast signaling. The method may include determining time-related demand information for a content using packet data requests originating from different mobile entities via unicast signaling. The method may further include determining location data for the mobile entities originating the packet data requests, and instructing a multicast network entity to establish a multicast session within an area of the WCS, in response to the demand information and location data. Determining the time-related demand information may be performed at least in part by detecting common URLs received at a Packet Data Network Gate Way (P-GW) from different mobile entities. Determining the location data may be performed at least in part by using Multicast Management Entity (MME) reports developed from Non-Access Stratum (NAS) level registration data. Instructing a multicast network entity may include communicating with a BM-SC to set up an eMBMS session for the specified area of the WCS. Determining a count of a number of mobile entities receiving the content via unicast sessions may be performed by counting a number of socket-based connections corresponding to the mobile entities presently receiving the content in respective unicast sessions.

The method may further include receiving, at a content server, content requests associated with IP addresses assigned to the mobile entities for the content, and determining the location data, based at least in part on information mapping the IP addresses to one or more areas of the WCS. Determining the location data may be based on at least one of an IP Version 6 prefix and an IP Version 4 Most Significant Bit (MSB) portion of the IP addresses. In the alternative, or in addition, determining the IP addresses assigned to the mobile entities may be performed using source IP addresses of connecting sockets requesting the content. Determining the time-related demand information may be performed by counting requests for the content from locations within the one or more areas and within a defined time window.

In another aspect, the method may include receiving a connection request from at least one of the mobile entities at a P-GW, and assigning a selected one of several IP addresses to at least one of the mobile entities based on a determined location of at least one of the mobile entities originating the connection request. The method may include transmitting a content request associated with the selected IP address to a content server. In an aspect, the content may include multicast live streaming services.

In an alternative method for managing demand-based multicast services at a base station of a wireless communications system capable of both unicast and multicast signaling, the method may include receiving data for a prospective multicast session, the multicast session defined in cooperation with a network entity, transmitting a portion of the data using unicast signaling, and transitioning signaling of the data between unicast and multicast modes in response to time-related demand information for the prospective multicast session. Transitioning the signaling may include determining whether a recent count of mobile entities receiving the data via unicast signaling for the prospective multicast session meets a threshold. The method may further include providing a portion of the data from a buffer to one or more mobile entities requesting multicast content after a multicast session for the content has been initiated. The method may further include transmitting the portion of the data using unicast signaling via a specific radio bearer and logical channel. In such case, the method may further include providing an indication that, for the specific radio bearer and logical channel, data will be transitioned to a multicast traffic channel.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a computer-readable storage medium holding encoded instructions, which when executed by a processor, cause a wireless communications apparatus to perform the methods and aspects of the methods as summarized above.

BRIEF DESCRIPTION OF THE DRAWINGS

FIGS. 6A-B are block diagrams illustrating components of wireless communication systems for providing or supporting MBSFN service.

FIG. 7 illustrates an embodiment of a methodology for managing a multicast service in a wireless communications system.

FIG. 8 is a state diagram illustrating active and inactive states of a multicast session.

FIGS. 9A-E illustrate embodiments of a methodology for implementing a demand-based multicast service in a wireless communications system.

FIGS. 21A-B illustrate embodiments of a methodology for implementing a demand-based multicast service using a Packet Data Network Gate Way, according to a fourth alternative for live streaming content.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
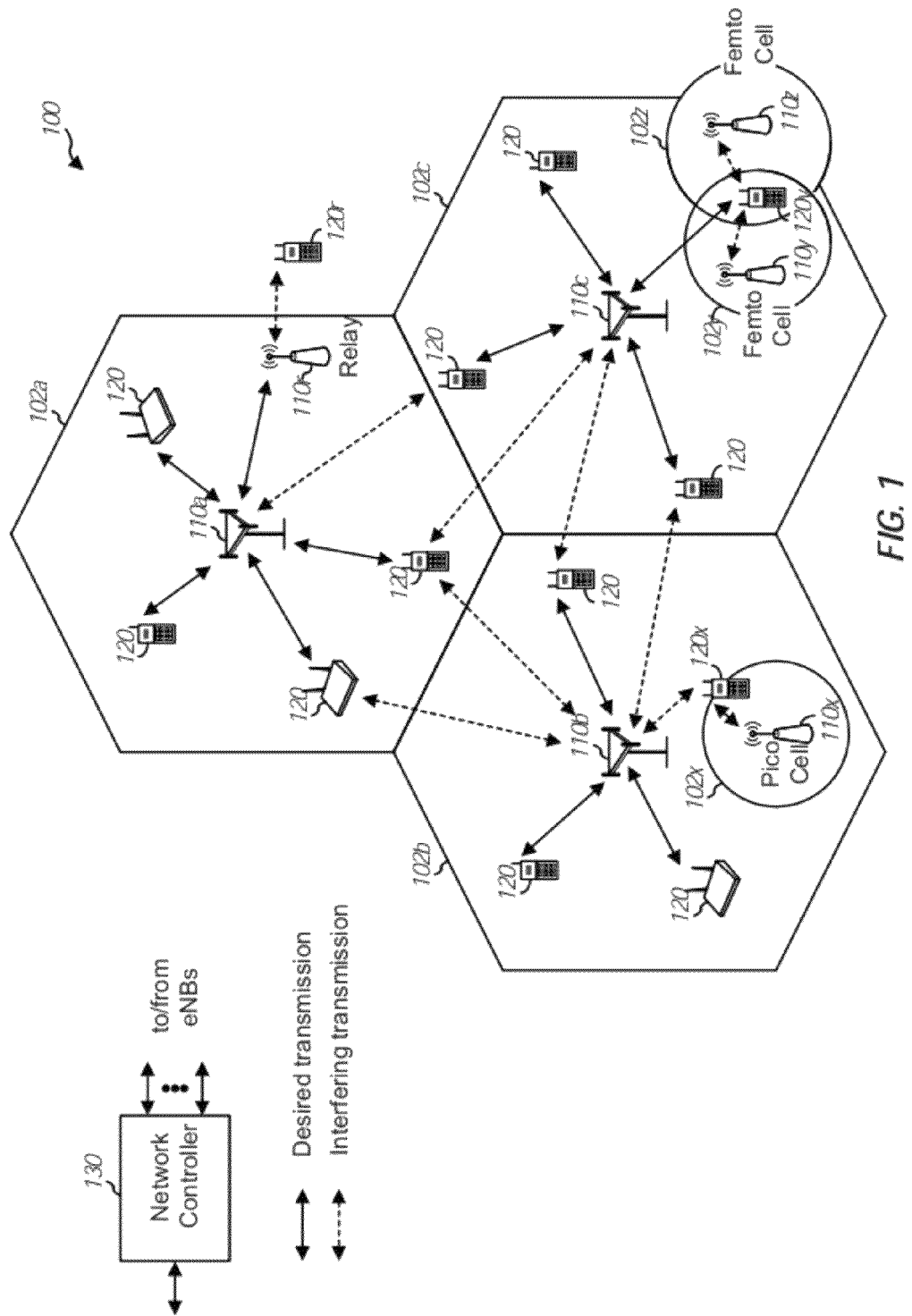
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, or other terminology.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, mobile entity, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or other terminology. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for system bandwidth of 1.25, 2.5, 5, 10 or 20 MHz, respectively.

Figure 2:
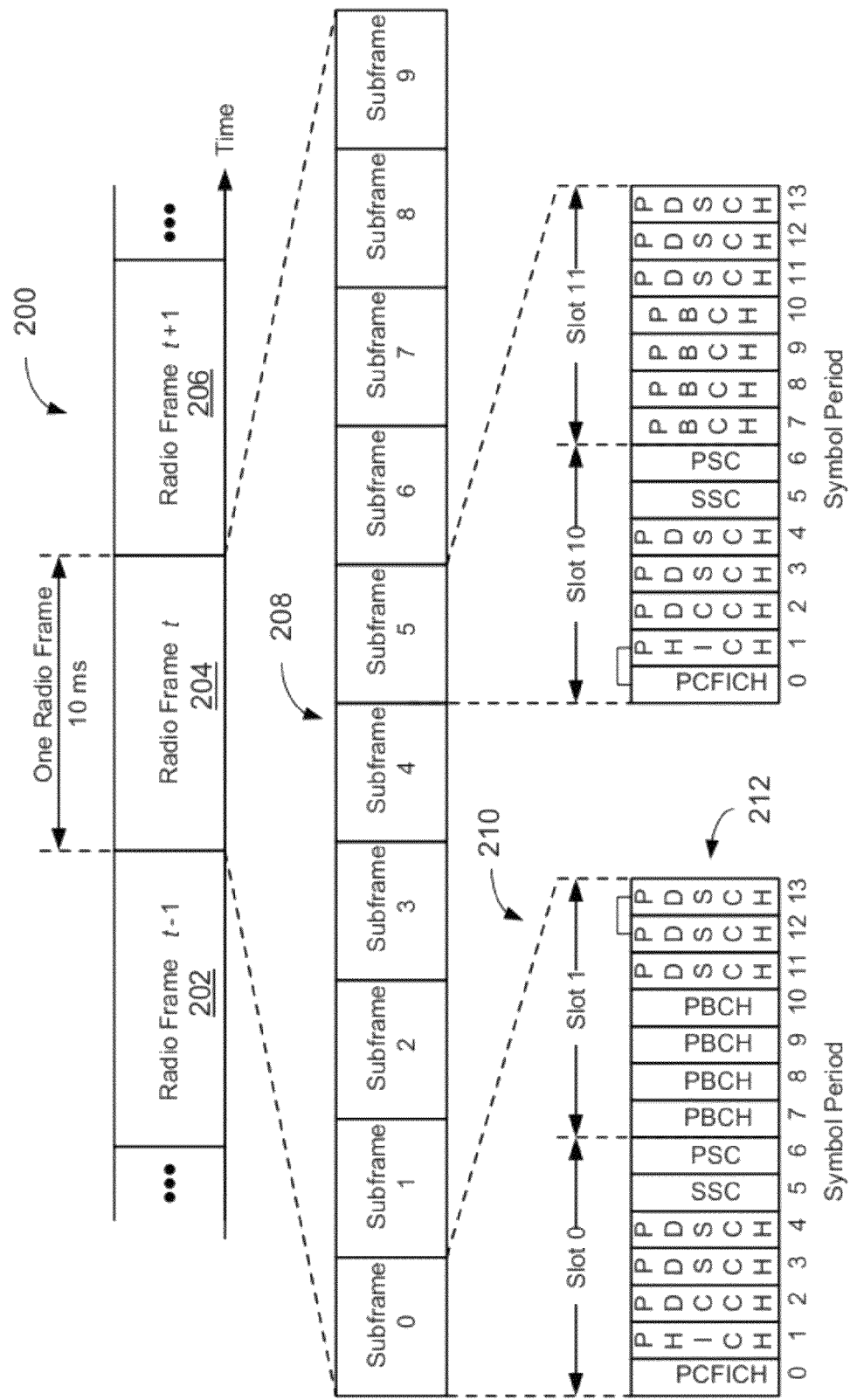
FIG. 2 is a block diagram conceptually illustrating an example of a down link frame structure in a telecommunications system.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
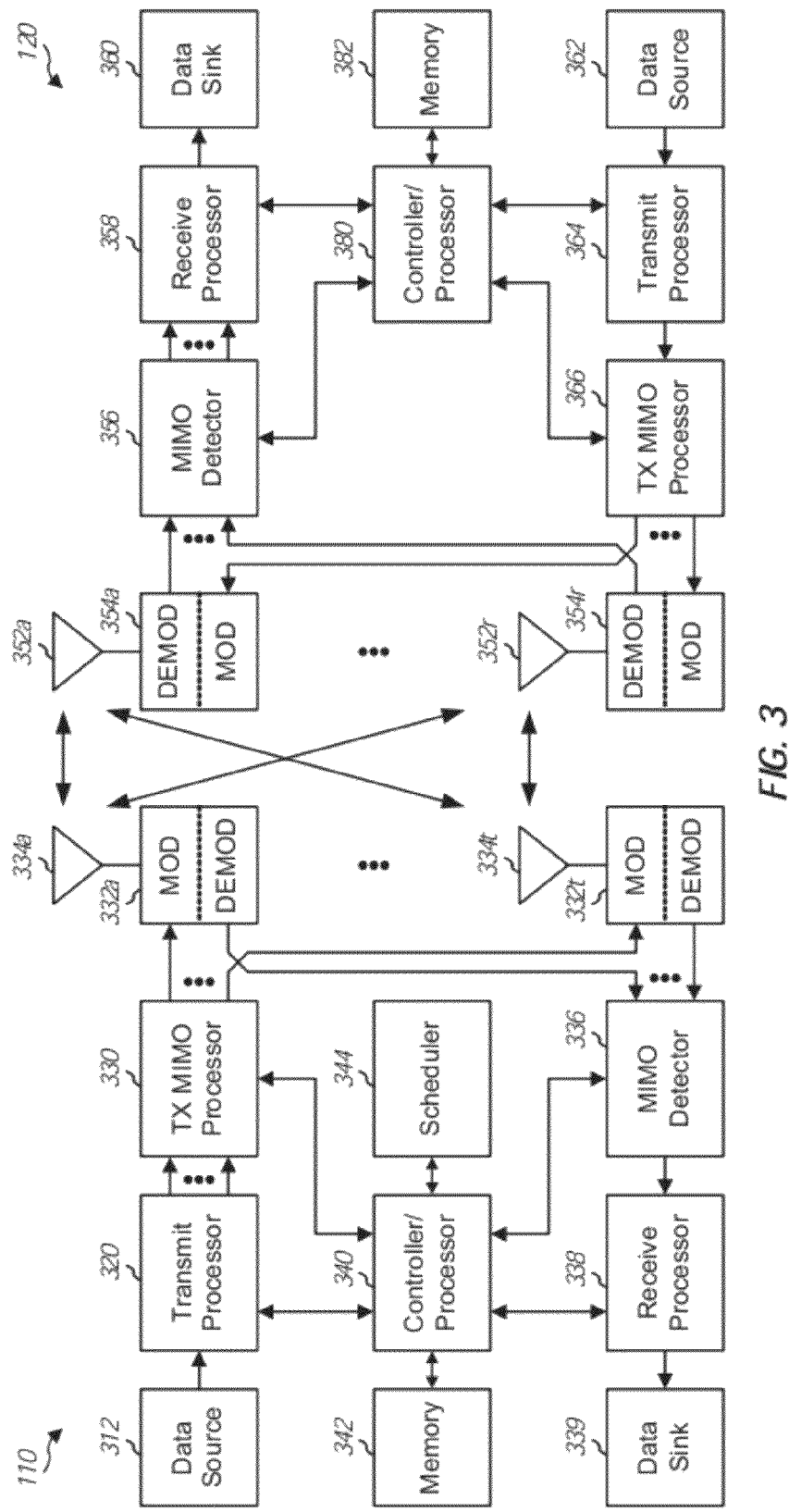
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other control channel. The data may be for the PDSCH, or other data channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may also perform or direct the execution of the functional blocks illustrated in FIGS. 29A-B, and/or other processes for performance by a UE according to the techniques described herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 27A-B, and/or other processes for performance by a base station according to the techniques described herein. The memories 342 and 382 may store data and program codes for the base station 110 and the UE 120, respectively. A scheduler 344 may schedule UEs for data transmission on the downlink and/or uplink. Other aspects of the techniques described herein may be performed by other network entities of a wireless communications systems as described elsewhere herein.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other at the receiver. In the context of eMBMS, the shared content is transmitted from multiple eNB's of a LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
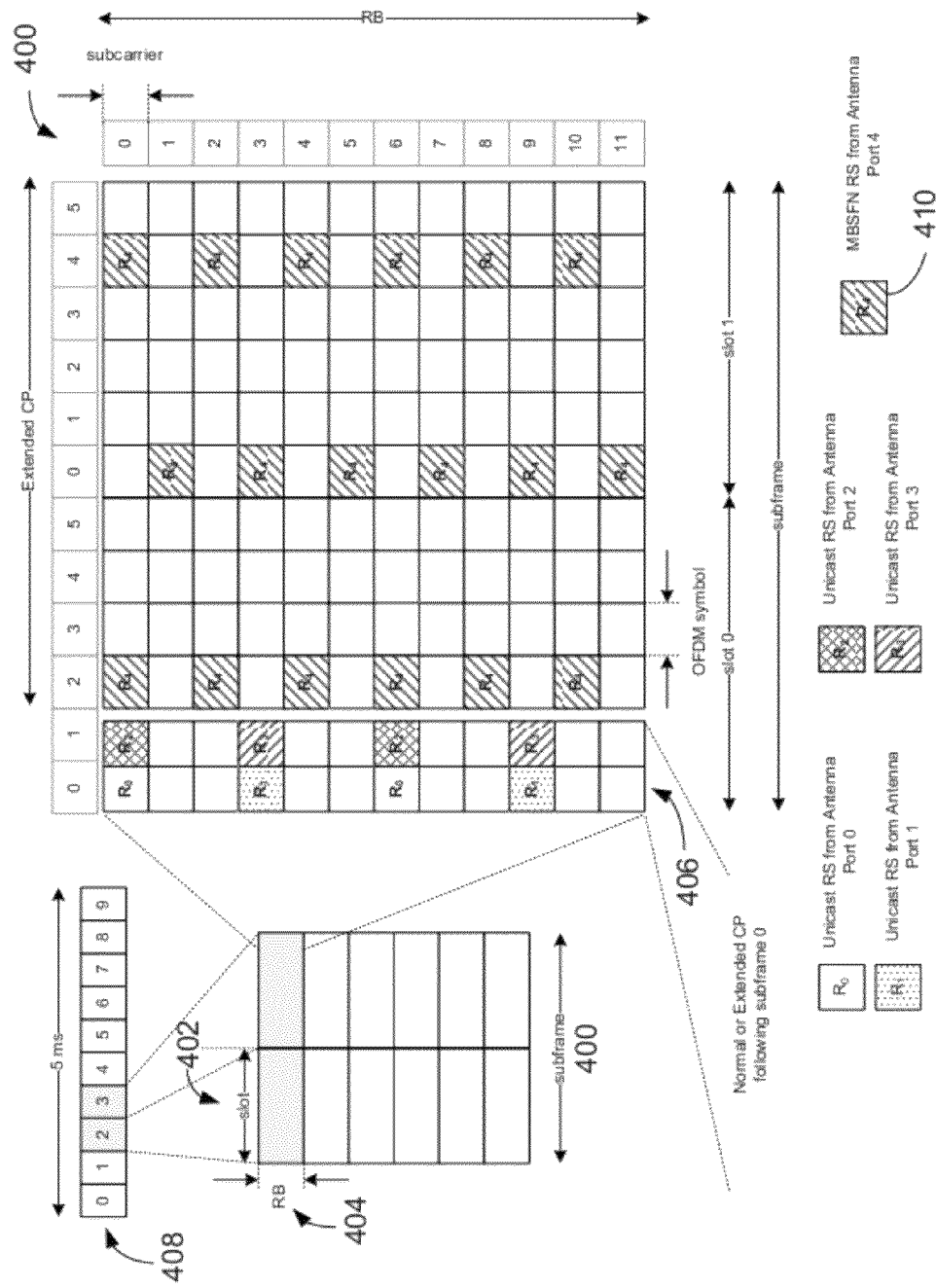
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, a RB 404 spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 408 labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different in adjacent subframes. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe 400 includes MBSFN RSs 410 but not unicast RSs. The present technology is not limited to the particular frame allocation scheme illustrated by FIGS. 2 and 4, which are presented by way of example, and not by way of limitation. A multicast session (which may sometimes also be referred to as a multicast broadcast) may use any suitable frame allocation scheme.

eMBMS Service Areas

Figure 5:
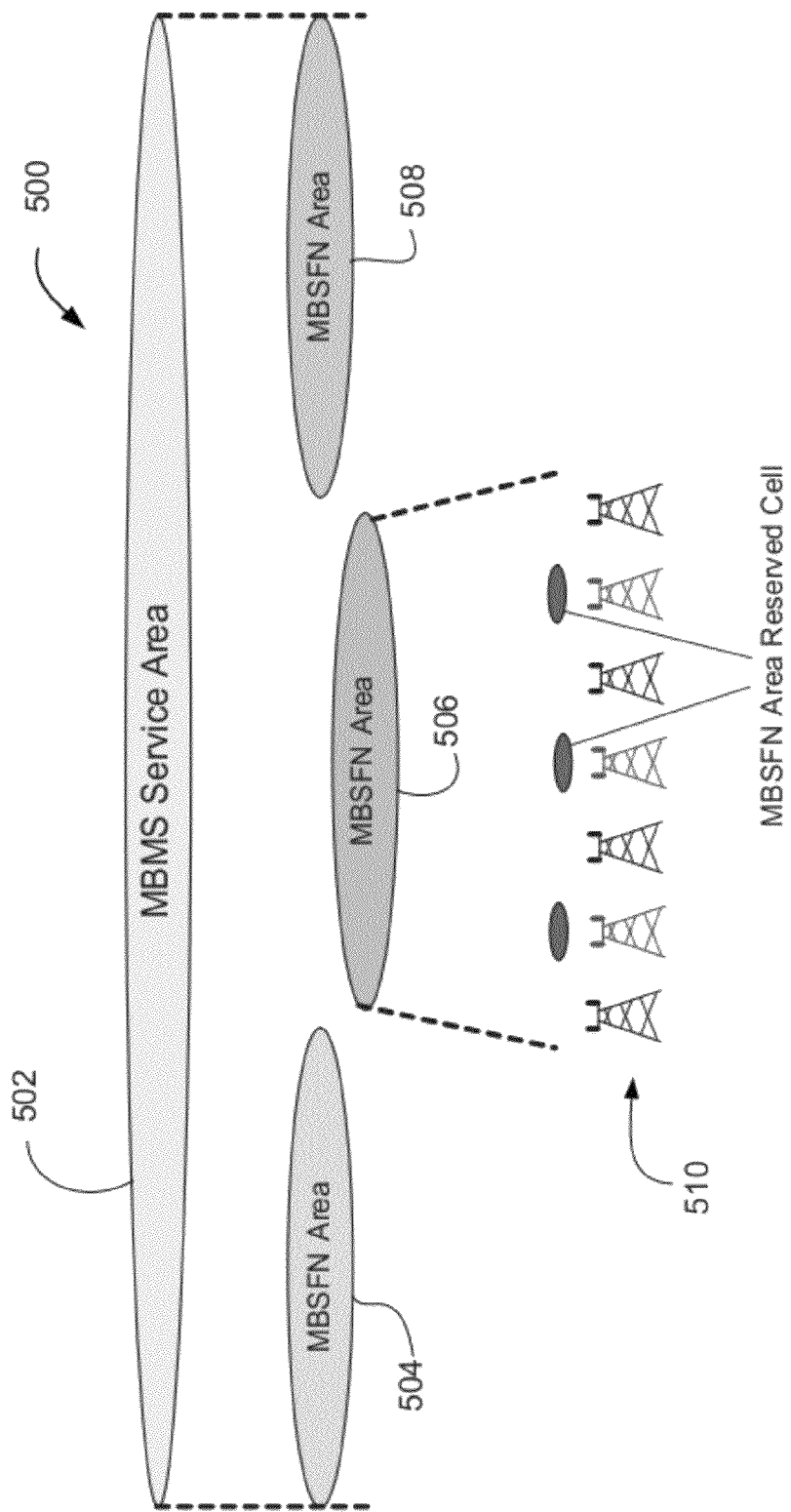
FIG. 5 is a diagram illustrating MBMS over a Single Frequency Network (MBSFN) areas within an MBSFN service area.

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized manner using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS System Components and Functions

FIG. 6A illustrates functional entities of a wireless communication system 600 for providing or supporting MBSFN service. Regarding Quality of Service (QoS), the system 600 uses a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface; one eNB 604 of many possible eNBs is shown, wherein "M1" refers to a logical interface as described by technical specifications for LTE and related specifications. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE/mobile entity 602 via an E-UTRAN Uu interface, wherein "Uu" refers to an air interface as described by technical specifications for LTE and related specifications. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface, wherein "Sm" refers to a logical interface as described by technical specifications for LTE and related specifications. The MBMS GW 616 may further provide an interface for entities using MBMS bearers through the SG-mb (user plane) reference point, and provide an interface for entities using MBMS bearers through the SGi-mb (control plane) reference point, wherein "SG-mb" and "SGI-mb" refer to logical interfaces as described by technical specifications for LTE and related specifications. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function for MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604, wherein "M2" and "M3" refer to logical interfaces as described by technical specifications for LTE and related specifications.

The system 600 may further include a Broadcast-Multicast Service Center (BM-SC) 612 in communication with a content provider server 614. The BM-SC 616 may handle intake of multicast content from one or more sources such as the content provider 614, and provide other higher-level management functions as described below. These functions may include, for example, a membership function, including authorization and initiation of MBMS services for an identified UE. The BM-SC 616 may further perform MBMS session and transmission functions, scheduling of live broadcasts, and delivery, including MBMS and associated delivery functions. The BM-SC 616 may further provide service advertisement and description, such as advertising content available for multicast. A separate Packet Data Protocol (PDP) context may be used to carry control messages between a UE and a BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS-GW 608. The MME 600 may provide a control plane function for MBMS over E-UTRAN. In addition, the MME may provide the eNB 604, 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

An alternative system 600' as shown in FIG. 6B may utilize a network entity that may be referred to, for example, as a high attach rate detection module (HDM) 624. The system 600' is similar to system 600 shown in FIG. 6A, and uses the same reference numerals for corresponding elements. The HDM 624 may be an additional distinct network entity, or it may be incorporated into, for example, the P-GW 610 or the BM-SC 612 (e.g., as a logical entity). If the HDM 624 is implemented as a distinct network entity, it may be located, for example, between the P-GW 610 and the BM-SC 612; however, other arrangements are also possible. Further details regarding the alternative system 600' are discussed in the disclosure below in connection with demand monitoring.

Either of the systems 600 and 600' may be used to transmit an eMBMS or other multicast session in an MBMS area. As shown in FIG. 7, a method 700 for handling an MBMS session may include an initial operation 702 of announcing or advertising availability of a scheduled transmission. For example, an MBMS broadcast of a sporting event may be advertised in a specified area to begin at a certain date and time, for further example by using an Open Mobile Alliance (OMA) Mobile Broadcast Services Enabler Suite (BCAST) service guide. To obtain advertising, users may subscribe to a message service, download a program guide or listing, or take some other action. In the alternative, advertising may be pushed to mobile entities without requiring any action from the user. A service announcement may include, for example, a service identifier, service area identifier, schedule, applicable IP multicast address(es), and other information.

At 704, the system may initiate a multicast transmission at the advertised date and time, within the specified broadcast area. For example, a BM-SC may initiate an MBMS broadcast service using a session start procedure to establish an MBMS radio bearer.

At 706, the system may provide a notification of ongoing or forthcoming MBMS services to a mobile entity, such as, for example, by using an MCCH change notification transmitted to the mobile entity. At 708, the system transfers MBMS content for the advertised service to the mobile entity, using the established MBMS radio bearer. At 710, once the eMBMS broadcast is completed, the system stops the multicast session and releases its associated radio bearer.

An MBMS bearer context may be created in the MME, MBMS GW, SGN and other elements of a Radio Access Network (RAN) upon initiation of an MBMS session. FIG. 8 illustrates a state cycle 800 between an active session state 820 and a standby state 810 of an MBMS bearer context. The MBMS bearer context itself may include an MBMS GW Tunnel Endpoint ID for Control plane (TEID-C) and a Temporary Mobile Group Identity (TMGI). A unique TMGI per MBMS bearer service may be allocated by the BM-SC, and used for MBMS notification purpose. The MBMS bearer context may further include a Flow Identifier; an MBMS GW IP Address for Control Plane in use; an MBMS GW IP Address for User Plane in use; and a Common Tunnel Endpoint ID (C-TEID) of the MBMS GW for the user plane. The MBMS bearer context may further include one or more QoS indicators or parameters, for example, a QoS Class Identifier (QCI), or MBR=GBR as mentioned above. The MBMS bearer context may further include an MBMS Service Area identifier; a list of downstream nodes; and an IP multicast and Source address for distribution, which may be selected by the MBMS GW. The foregoing MBMS bearer context components are provided by way of example only, and the present technology is not limited to a particular configuration of MBMS bearer context.

Demand Based MBMS Management

In LTE, eMBMS applications may be classified as schedule based eMBMS or demand based eMBMS. In a schedule based eMBMS application, a system operator on the network side controls transmission of eMBMS content, which occurs at a scheduled time. A mobile entity may be used to subscribe to the scheduled transmission and thereby receive content of interest to the mobile user. The eMBMS content offerings are limited to the operator's scheduled eMBMS transmissions.

In a demand based eMBMS application, eMBMS content offerings are provided in response to demand monitoring. For example, users may search and request content available over a wide-area network, such as the Internet. The system monitors demand levels for specific content, and detects demand that exceeds a specified threshold. This threshold may float in response to current load levels or other parameters. In response to detecting demand in excess of the threshold, the system may provide the demanded content via an eMBMS session and, as necessary, transition mobile entities from separately controlled unicast sessions to a common eMBMS broadcast for the contact within a specified network area, e.g., an MBMS area. Advantageously, available MBMS content is not limited to predetermined content selections broadcast by system operators on a schedule based basis. Users therefore may have access to a much broader array of content via eMBMS broadcasts. At the same time, system operators may more efficiently utilize system resources by transmitting the most popular content in an area via multicast based on user demand.

Demand based eMBMS may be further classified into two different types: (1) live broadcasting and (2) recorded on-demand broadcasting, for example on-demand streaming or file downloading. Streaming of television-like programming using IP (IP TV) and IP radio are examples of live broadcasting types of demand based eMBMS. A characteristic of live broadcasting is that the source streams identical content to one or more destination addresses at substantially the same time regardless of when a user initiates a streaming download, thereby emulating a broadcast of identical content to different receivers at the same time. Mobile entities receiving or requesting to receive particular live broadcast content may, using a demand based methodology, be aggregated to receive the live content via multicast when located in the same MBSFN service area.

In comparison, a second type of demand based eMBMS— on-demand streaming or file downloading—may be characterized by the content being provided to different destinations at different times selected by a user. The release of popular content may trigger concurrent or substantially concurrent streaming or downloading to different addresses. For example, the popularization of a video, or the release of a popularly anticipated application or application update, may cause many users to stream or download the content within a relatively narrow time window. Mobile entities receiving or requesting identical content within shared time window, for example, concurrent or overlapping downloading or streaming sessions, may partially or completely share bandwidth needed for the downloading or streaming using a demand-based eMBMS session.

Certain technical issues arise in providing demand based eMBMS service, which may be resolved using different technological solutions. These technical issues may include demand monitoring; that is, detecting mobile entities that are requesting specific content, either by receiving the content via a unicast session, requesting to receive the content, or both. Another technical issue may relate to establishing the demand based eMBMS service in the correct area to serve the common demand. Establishing the eMBMS service in the correct area may involve detecting locations of the mobile entities requesting common content. Another technical issue relates to switching between unicast and multicast sessions when initiating or terminating a demand based eMBMS session. Another technical issue relates to handling a mobile entity that requests content that is already being broadcast in an eMBMS session in the mobile entity's area. The present disclosure provides alternative technical solutions for addressing these and other issues related to providing demand based eMBMS in a wireless communications system. Before discussing these alternatives in detail, an overview of a demand based eMBMS method and system are discussed at a system level.

Methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

In general, a demand-based eMBMS method may be implemented using a system as shown and described in connection with FIGS. 6A-B. FIGS. 9A-D illustrate related methodologies for managing demand-based multicast services in a wireless communications system (WCS) capable of both unicast and multicast signaling. Method 900 shown in FIG. 9A describes operations preparatory to initiation of demand-based multicasting. As used herein, "multicast" or "multicasting" may include MBMS, eMBMS, MBSFN, or other coordinated wireless transmission from multiple base stations directed to a specific, identified group of mobile entities, or to an unspecified group of mobile entities (e.g., any mobile entity within radio range capable of receiving the wireless signal). The method 900 may include, at 902, establishing multicast areas for the content, in advance of providing the content via a unicast session. One or more network entities may set up the multicast area in advance of initiating a demand-based multicasting session, but the system does not initiate a multicast session yet. In the alternative, or in addition, a multicast area may be set up in response to demand, and then a multicast session initiated. The method 900 may further include, at 904, one or more network entities publishing availability of the content to the mobile entities, in advance of providing the content via a unicast session. This may correspond to the operation 702 described in connection with FIG. 7 above. The method 900 may further include, at 906, one or more network entities receiving service requests for the content published in operation 904 from a mobile entity.

Figure 9A:
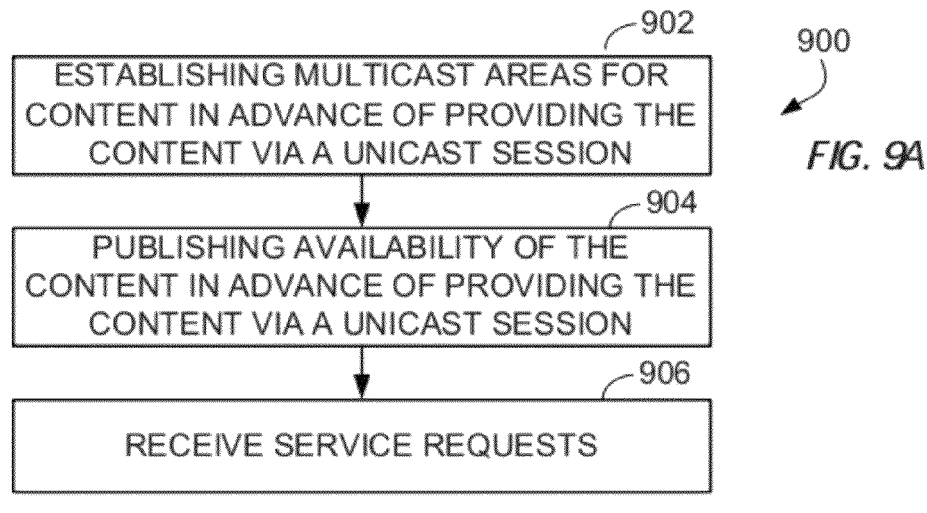
Figure 9B:
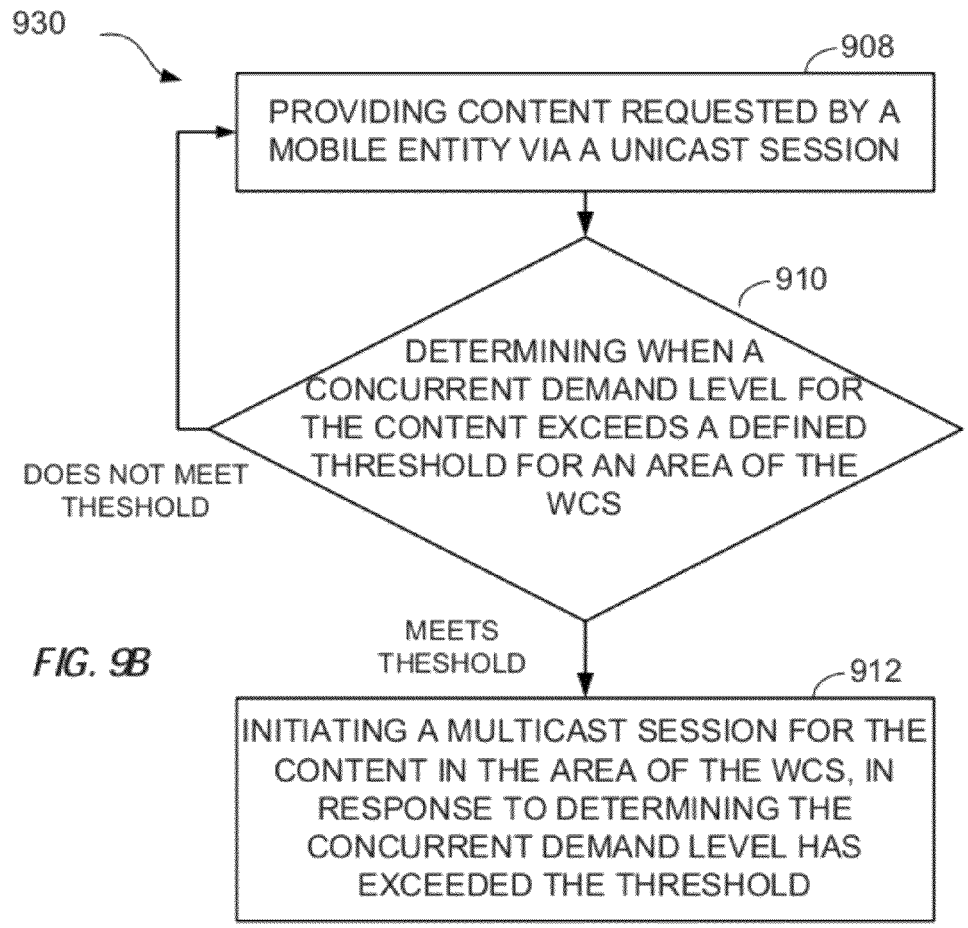

In addition, as illustrated in FIG. 9B, the system may perform a method 930 in which a multicast session is initiated in response to a demand level. Method 930 may include, at 908, one or more network entities providing content requested by a mobile entity via a unicast session. The content may be delivered to a base station and transmitted via unicast signaling to the mobile entity. This operation 908 may be repeated for multiple mobile entities in an MBSFN area. A demand level for the content may be equal to or related to a count of mobile entities receiving or requesting the content in a defined area and time envelope, or to some other estimate or measure of concurrent demand. A time envelope may be used to limit counts to concurrently receiving users and exclude users who are no longer receiving content. For example, a number of mobile entities receiving the content may be counted on a rolling average basis, and the rolling average used to determine a concurrent demand level. The period of the rolling average may be selected to be equal to, or in some proportion to, an average or estimated time required to complete a download of particular content. For example, if a particular content offering is expected to take five minutes to download, the system may track a rolling average number of downloads initiated over the most recent five-minute period (i.e., downloads initiated per period). This rolling average number will represent a reasonable estimate, at any given time, of how many users are concurrently downloading the same content. In the alternative, some other method may be used to decrement a count or other demand index to account for users no longer receiving content. For example, when a download is completed by a user, a signal may be provided to an entity tracking demand, and in response to the signal the tracking entity may decrement a cumulative count of current demand.

The method 930 may further include, at 910, one or more network entities determining that a concurrent demand level for the content exceeds a defined threshold for an area of the WCS. For example, if the demand level is defined as a count of concurrent users for specific content within a defined area, the system may monitor demand levels for one or more areas to determine when the count exceeds some threshold. The threshold may be fixed, or may be varied by the network entity as a function of system load or other factors. The method 930 may further include, at 912, one or more network entities initiating a multicast session for the content in the area of the WCS, in response to determining the concurrent demand level has exceeded the threshold. Thus, the system may shift the most highly demanded content to multicast delivery in a flexible fashion to improve efficiency in use of system resources.

Figure 9C:
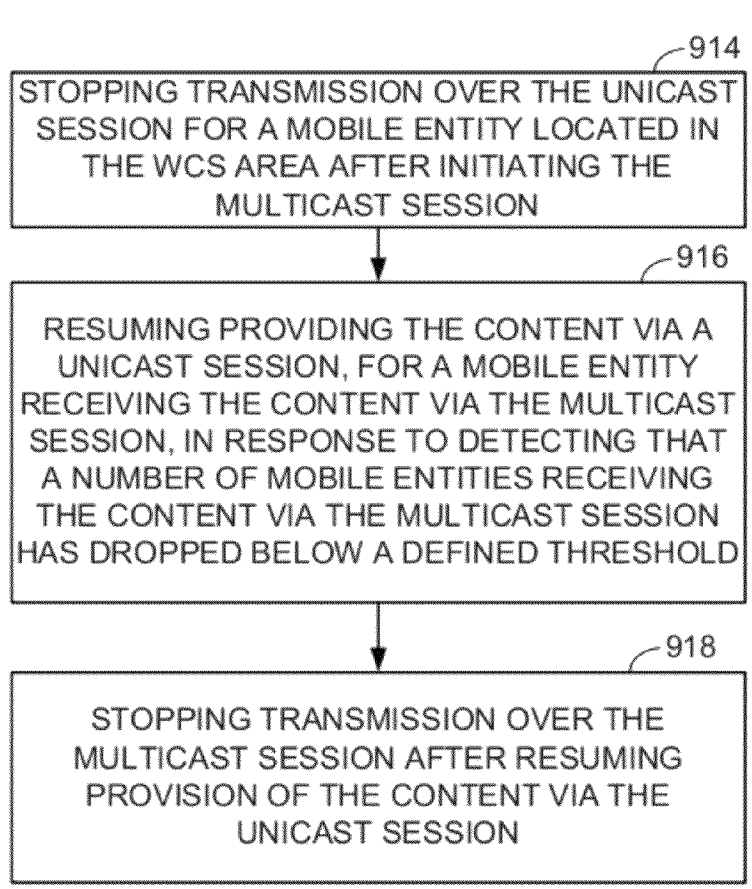

In addition, the system may perform certain operations 940 after initiating the multicast session in response to sufficient demand, as shown in FIG. 9C. These operations may include, at 914, one or more network entities stopping unicast transmission to the mobile entities located in the newly-established multicast area of the wireless communication system, after initiating the multicast session there. In addition, the operations may include continued demand monitoring to detect when the number of multicast users drops below a minimum threshold. The operations 940 may further include, at 916, resuming providing of the content via a unicast session, for a mobile entity receiving the content via the multicast session, in response to detecting that a number of mobile entities receiving the content via the multicast session has dropped below a defined threshold. Subsequently, the operations 940 may further include, at 918, stopping transmission over the multicast session after resuming provision of the content via the unicast session.

Figure 9D:
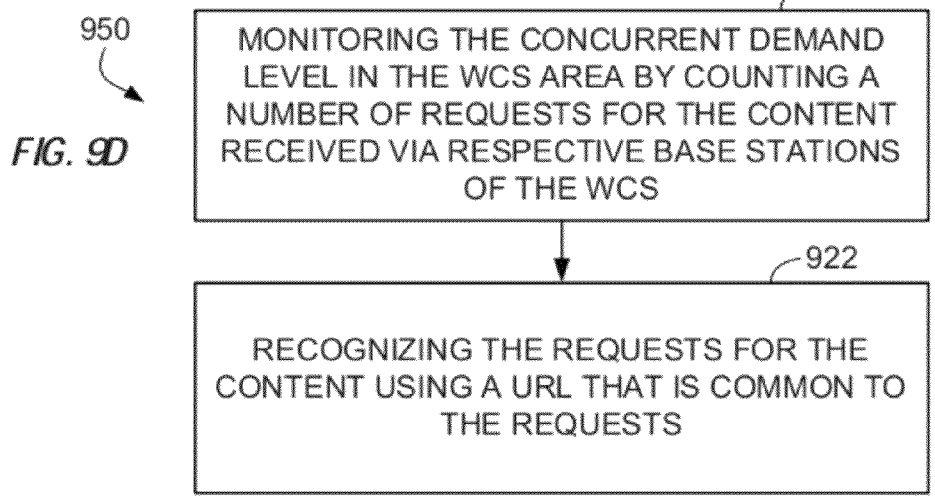

Monitoring of demand levels may be performed using various different methods. FIG. 9D illustrates one method 950 for demand monitoring, which may include, at 920, monitoring the concurrent demand level by counting a number of requests in the area of the WCS for the content received via respective base stations of the wireless communications system. This may include, as illustrated at 922, recognizing the requests for the content using a Uniform Resource Locator (URL) that is common to the requests from mobile entities. A base station or other network entity may count requests that share a common URL or other content address, within a rolling time envelope such as, for example, the last minute, the last ten minutes, or any desired rolling period. The method 950 may be generally understood as demand monitoring at the demand (i.e., mobile entity/base station) side of the system, where the number and location of mobile entities may be easily ascertained by the base station. Therefore the base station monitors the requests to determine which content is being requested by various mobile entities.

FIG. 9E illustrates an alternative method 960 for demand monitoring. Method 960 may include, at 924, a first network entity assigning the Internet Protocol (IP) addresses to the mobile entities so as to map to specified locations of the wireless communications system. As used herein, an IP address "maps" to a location when the address, or a portion of the address, indicates a definite location or limited area, for example a geographic area such as a city or metropolitan area. The method 960 may further include, at 926, a second network entity monitoring the concurrent demand level by determining locations of the mobile entities from respective source IP addresses assigned to the mobile entities. The second network entity should be positioned to readily determine which content is being requested, for example, at a content provider or PDN gate way. The first network entity should be positioned to readily determine locations of mobile entities. The method 960 may further include, at 928, the first entity determining locations of the mobile entities from at least one of a cell identifier, Global Positioning System (GPS) information, tracking area identifier or cell group identifier. The method 960 may further include, at 929, redirecting a Domain Name System (DNS) request for content received from the mobile entity to a Broadcast Media Service Center (BM-SC). For example, a URL specifying a first content server may be redirected to a BM-SC using a DNS proxy. The method 960 may be generally understood as demand monitoring at the content source side of the system, with location mapped to IP addresses on the demand side. Other demand monitoring methods may be used, and the present technology is not limited to those described herein.

Figure 10:
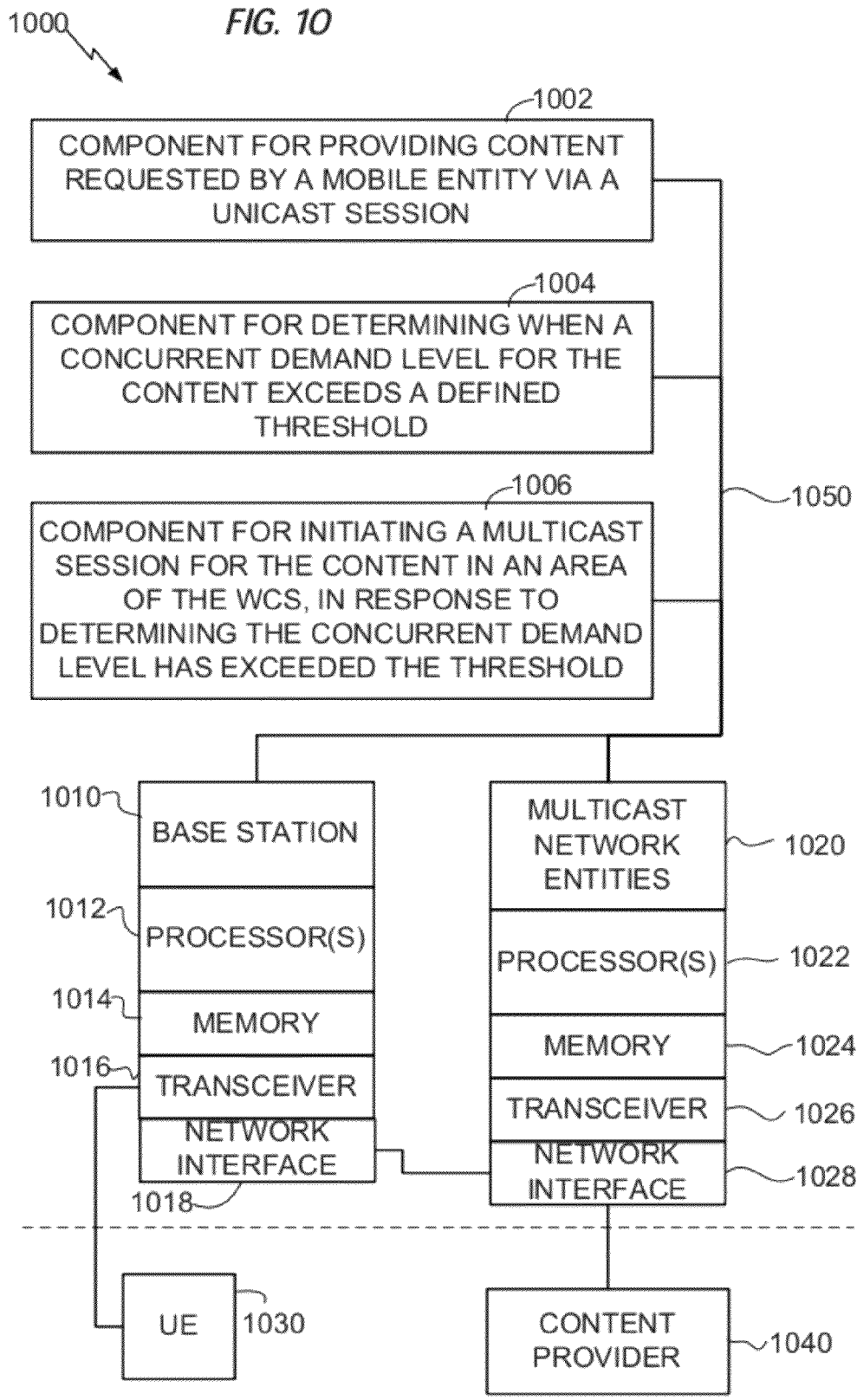
FIG. 10 illustrates an example of a system for implementing the methodologies of FIGS. 9A-E.

With reference to FIG. 10, there is provided an exemplary system 1000 for managing demand-based multicast services in a wireless communications system capable of both unicast and multicast signaling, that may be configured as wireless network capable of unicast and multicast signaling, or as a processor or similar device for use within entities of the network. The network entities may include a base station 1010 (e.g., eNB, or other base station (e.g., Home Node B, etc.) of a wireless communications network, which may be in communication with a mobile entity 1030 via a transceiver 1016. The system may also include one or more multicast network entities 1020 as described above, for example, a P-GW, MME, MCE, and so forth, at least one of which may be linked to a content provider 1040 via a network interface 1028. The system 1000 may include functional blocks that can represent functions implemented by a processor, software, or combination thereof (e.g., firmware).

As illustrated, in one embodiment, the system 1000 may include an electrical component or module 1002 for providing content requested by a mobile entity in an area of the WCS via a unicast session. For example, the electrical component 1002 may include at least one control processor coupled to a transceiver or the like and to a memory with instructions for providing requested content via unicast signaling, in one or both of the base station 1010 and network entities 1020. The electrical component 1002 may be, or may include, means for providing content requested by a mobile entity in an area of the WCS via a unicast session. Said means may include an algorithm executed by one or more processors. The algorithm may include, for example, receiving a content request from the mobile entity, relaying the request to a content source, receiving the content from the source, and relaying the content to the mobile entity via a unicast wireless transmission.

The system 1000 may include an electrical component 1004 for determining that a concurrent demand level for the content exceeds a defined threshold for the area of the WCS. For example, the electrical component 1004 may include at least one control processor coupled to a transceiver or the like and to a memory holding instructions for monitoring concurrent demand levels for specific content within specified areas and comparing to a threshold. The electrical component 1004 may be, or may include, means for determining that a concurrent demand level for the content exceeds a defined threshold for the area of the WCS. Said means may include an algorithm executed by one or more processors. The algorithm may include, for example, any of the more detailed algorithms for demand monitoring as disclosed herein, including but not limited to the operations 960 shown in FIG. 93, the operations 1500 shown in FIG. 15A, the operations 1550 shown in FIG. 15B, the operations 1700 shown in FIG. 17A, the operations 1750 shown in FIG. 17B, the operations 2100 shown in FIG. 21A, or operable selections from or combinations of the foregoing operations.

The system 1000 may include an electrical component 1006 for initiating a multicast session for the content in the area of the wireless communications system, in response to determining the concurrent demand level has exceeded the threshold. For example, the electrical component 1004 may include at least one control processor coupled to a transceiver or the like and to a memory holding instructions for initiating a multicast session in a specified area, in response to a control signal. The electrical component 1006 may be, or may include, a means for initiating a multicast session for the content in the area of the wireless communications system, in response to determining the concurrent demand level has exceeded the threshold. Said means may include an algorithm executed by one or more processors. The algorithm may include, for example, the operations 2760 shown in FIG. 27C, and/or other operations such as, for example, determining a threshold value, comparing the concurrent demand level to the threshold value, requesting that a multicast entity initiate a multicast transmission if the demand level exceeds the threshold, and informing the mobile entity of the multicast transmission. The system 1000 may include similar electrical components for performing any or all of the additional operations 900, 940, 950, 960 described in connection with FIGS. 9A and 9C-D, which for illustrative simplicity are not shown in FIG. 10.

The components 1002-1006 may be related via a logical link 1050 the one or more eNB 1010 and the multicast network entities 1020. The link 1050 to both of the elements 1010, 1020 indicates that each element may involve the eNB 1010, one or more of the multicast network entities 1020, or both. For example, the component 1002 for providing content requested by a mobile entity in an area of the WCS via a unicast session may involve the eNB and one or more of the network entities MBMS-GW, BM-SC, P-GW, MCE and MME discussed above in connection with FIGS. 6A-B, or similar entities. Therefore the components 1002-1006 are not necessarily limited to one processor entity of a wireless communications system, and may be embodied, or whole or in part, by different processing entities of the system operating in cooperation via a logical link 1050. The logical link is not necessarily limited to a single communications link or interface, and may include more than one communication link or interface, for example as described in connection with FIGS. 6A-B above showing different interfaces between different system elements.

In related aspects, the system 1000 may optionally include processor components 1012, 1022 each having at least one processor. The processors 1012 and 1022 may be in operative communication with the components 1002-1006 or similar components via any suitable communication coupling. As noted above, more than one of the eNB 1010 or the multicast network entities 1020 may include a portion of the components 1002-1006. Accordingly, the processors 1012 and 1022 may effect initiation and scheduling of the processes or functions performed by electrical components 1002-1006.

In further related aspects, the system 1000 may include radio transceiver components 1016, 1026 and network interface components 1018, 1028. The system 1000 may optionally include components for storing information, such as, for example, memory devices/components 1014, 1024. The computer readable medium or the memory components 1014, 1024 may be operatively coupled to the other components of the system 1000 via a bus or other coupling. The memory components 1014, 1024 may be adapted to store computer readable instructions and data for performing the activity of the components 1002-1006, and subcomponents thereof, or the processors 1012, 1022, the additional operations 900, 940, 950, 960, or the methods disclosed herein. The memory components 1014, 1026 may retain instructions for executing functions associated with the components 1002-1006. While shown as being external to the memory 1014, 1026, it is to be understood that the components 1002-1006 can exist within the memory 1014, 1026.

Example Component-Level Methodologies and Apparatus

Further details concerning the foregoing system are presented here for specific network components and embodiments using different operations or components to address technical issues noted herein. Different embodiments may be grouped into four classes, which are discussed in turn below by way of example only, and not by way of limitation. Demand based multicasting may also be performed for classes falling outside of the examples provided.

Class 1

One aspect of demand based eMBMS may incorporate pre-established MBSFN areas.

Pre-established MBSFN areas may be useful for situations where the operator is aware of some upcoming event that is likely to generate widespread interest in particular content that can be delivered via for multicast. For example, streaming video of an upcoming or recent popular concert or sporting event, a report of a breaking news event, or the downloading of a popular game or application when released are events that might generate widespread interest. The operator may configure one or more MBSFN areas for multicasting the anticipated popular content before or shortly after the anticipated triggering event (e.g., concert, game, software release, or breaking news) occurs. An eMBMS session is set up on the network side and advertised to users, but multicasting of the content is not immediately started. If demand for the advertised content turns out to be less than anticipated, the multicast session may be left in an inactive state unless and until the demand level reaches a defined threshold. The eNB and MCE can execute transitions between unicast and multicast delivery of the content based on demand level monitoring.

As noted above, demand level monitoring may be performed in various ways, and may include counting a number of mobile entities receiving or about to receive the same content within a defined area and time window. Concurrent demand may be defined as downloading of content within an overlapping time window, and may be estimated using a rolling time envelope equal to or less than the average download time for the content. For example, for a streaming program that takes one hour to view at normal speed and an average of ten minutes to download, a rolling time envelope of ten minutes or less may be used for monitoring concurrent demand. Mobile entities counted as receiving content may be decremented from the demand level indicator as the initial download time for each mobile entity falls outside the time envelope. In the alternative, actual concurrent use may be monitored, wherein mobile entities are decremented from a count in response to completing download of the relevant content. However the count is maintained, a demand level indicator may constitute or include a simple sum total of concurrent users, or some variant of a sum, for example a rolling average or weighted rolling average.

The system may also service mobile entities that first request the content after multicasting has already begun. In this case, the network may set up a unicast channel for each late arriver, in which a portion of the content that has already been multicast is provided to the mobile entity. While receiving this missed portion, the mobile entity may also receive and buffer the remaining portion of the content from the multicast session.

Figure 11:
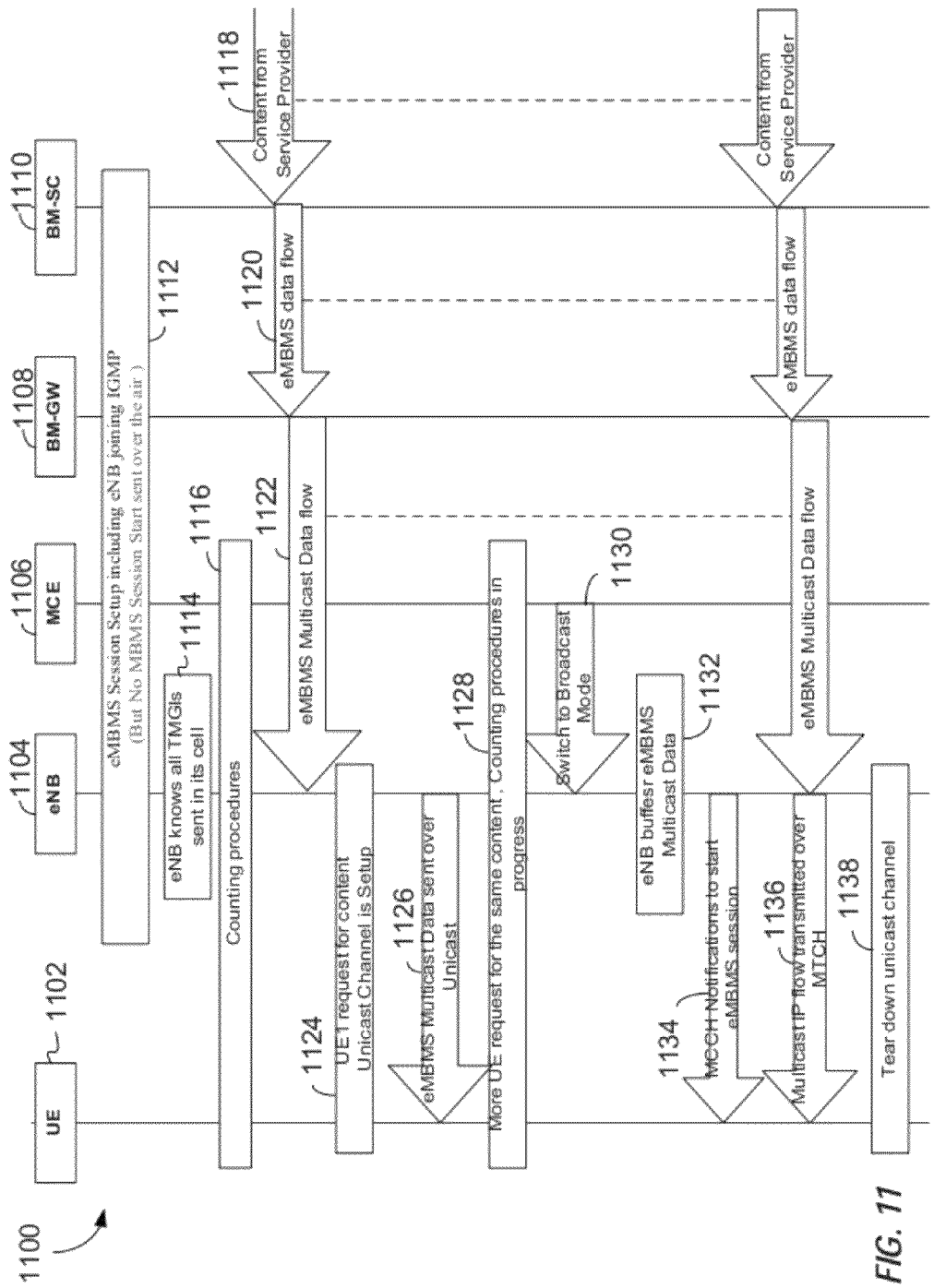
FIG. 11 is a sequence diagram illustrating activity by various components of a wireless communications system implementing or supporting a demand-based multicast service, according to embodiments implementing counting procedures using system base stations (e.g., eNBs).

FIG. 11 shows an example call flow 1100 for a demand-based multicast service using a pre-established MBSFN area. Initially, an eNB 1104, and MCE 1106, a BM-GW 1108 and a BM-SC 1110 may participate in an eMBMS session startup 1112 including the eNB 1104 joining the relevant Internet Group Management Protocol (IGMP), without initiating multicasting of any content. After the startup 1112, the eNB 1104 monitors 1114 all Temporary Mobile Group Identifiers (TMGIs) used for mobile entities in its cell, and initiates a counting procedure 1116 for relevant content requests that it handles. Meanwhile, once the content is advertised (not shown) content 1118 is provided from a content provider and flows as an eMBMS data flow 1120 from the BM-SC 1110 to the BM-GW 1108. From there, the content flows as an eMBMS multicast data flow 1122 to the eNB 1104, where, in response to a mobile entity request, the eNB 1104 and requesting UE 1102 set up a unicast channel 1124 for the multicast content. The multicast content is provided over the unicast channel 1126 while demand in the relevant cell or eMBMS area is less than some threshold. Accordingly, the eNB 1104 and MCE 1106 continue the counting procedures 1128 as more mobile entities request the multicast content and receive it via a unicast transmission.

The MCE 1106 may continue monitoring the level of demand to determine when the level of demand reaches a defined threshold in a multicast area. When the MCE determines that the threshold is reached, the MCE may instruct the eNB 1104 to transition the content to a multicast session 1130. In response, the eNB 1104 may buffer the incoming multicast data 1132 during a transition period from unicast to multicast, and transmit MCCH notifications 1134 to mobile entities for initiating reception of content via an eMBMS session. The content itself may continue to flow through the chain 1118, 1120, 1122 already described, and is transmitted over a Multicast Traffic Channel (MTCH) 1136, including the buffered content. Subsequently, the eNB 1104 may tear down (i.e., terminate) any unicast channel 1138 formerly used for the multicast content.

Figure 12:
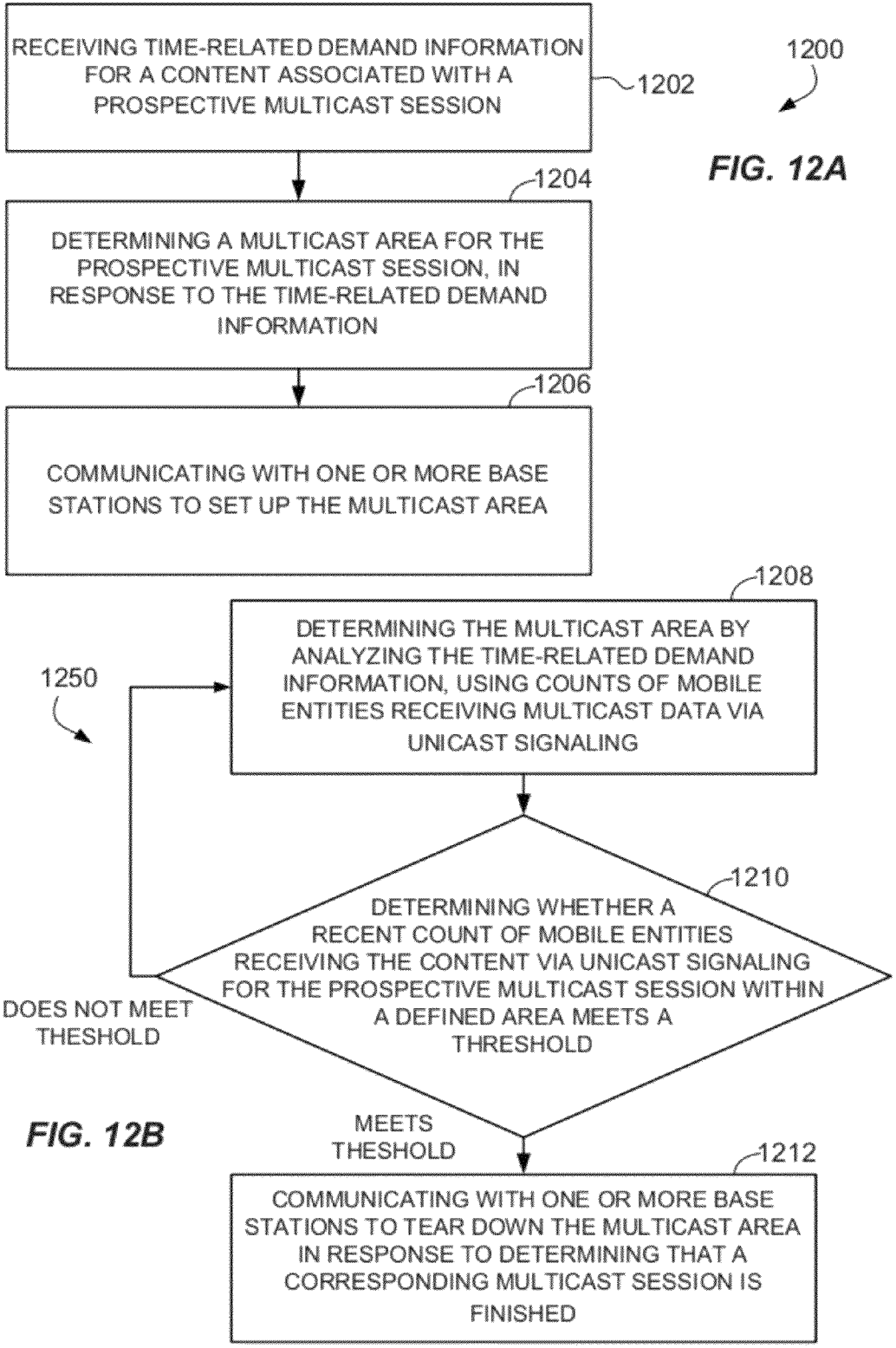
FIGS. 12A-B illustrate embodiments of a methodology for implementing a demand-based multicast service using a Multicast Coordinating Entity (MCE), according to a first alternative using counting of mobile entities in cooperation with base stations.

Consistent with the foregoing, FIG. 12A shows a method 1200 for managing demand-based multicast services at an MCE of a wireless communications system capable of both unicast and multicast signaling. The method is not limited to performance by an MCE, and may be performed by any network entity or combination of entities for which the defined operations are possible and/or permitted by applicable standards. The method 1200 may include the MCE, at 1202, receiving time-related demand information for a content associated with a prospective multicast session. The prospective multicast session may be associated with a session identifier. The session identifier may include, for example, a TMGI. The method 1200 may further include the MCE, at 1204, determining a multicast area for the prospective multicast session, in response to the time-related demand information. The time-related demand information may include a demand level indicator as described in more detail above. The MCE may determine the multicast area to be an area in which the time-related demand information indicates a demand level greater than some specified threshold. If the time-related demand information indicates a level of demand less than the applicable threshold, the MCE does not determine the multicast area. The method 1200 may further include, at 1206, communicating with one or more base stations to set up the multicast area. This operation 1206 may correspond to the flow block 1130 shown in the call flow diagram of FIG. 11 discussed above.

In addition, FIG. 12B shows further optional elements 1250 that may be implemented for use by the MCE in developing time-related demand information. These optional elements may, in the alternative, be performed by some other network entity in whole or in part. The elements 1250 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1200 includes at least one operation of FIG. 12B, then the method 1200 may terminate after the at least one operation, without necessarily having to include any subsequent downstream operation(s) that may be illustrated.

The additional elements 1250 may include, at 1208, the MCE determining the multicast area by analyzing the time-related demand information using at least counts of mobile entities receiving the content via unicast signaling. The additional elements 1250 may further include, at 1210, the MCE determining the multicast area by determining whether a recent count of mobile entities receiving the content via unicast signaling for the prospective multicast session within a defined area meets a threshold. The threshold may be defined by the MCE or other entity to improve or optimize bandwidth utilization within the defined area. The additional elements 1250 may further include, at 1212, the MCE communicating with one or more base stations to tear down the multicast area in response to determining that a corresponding multicast session is finished.

Figure 13:
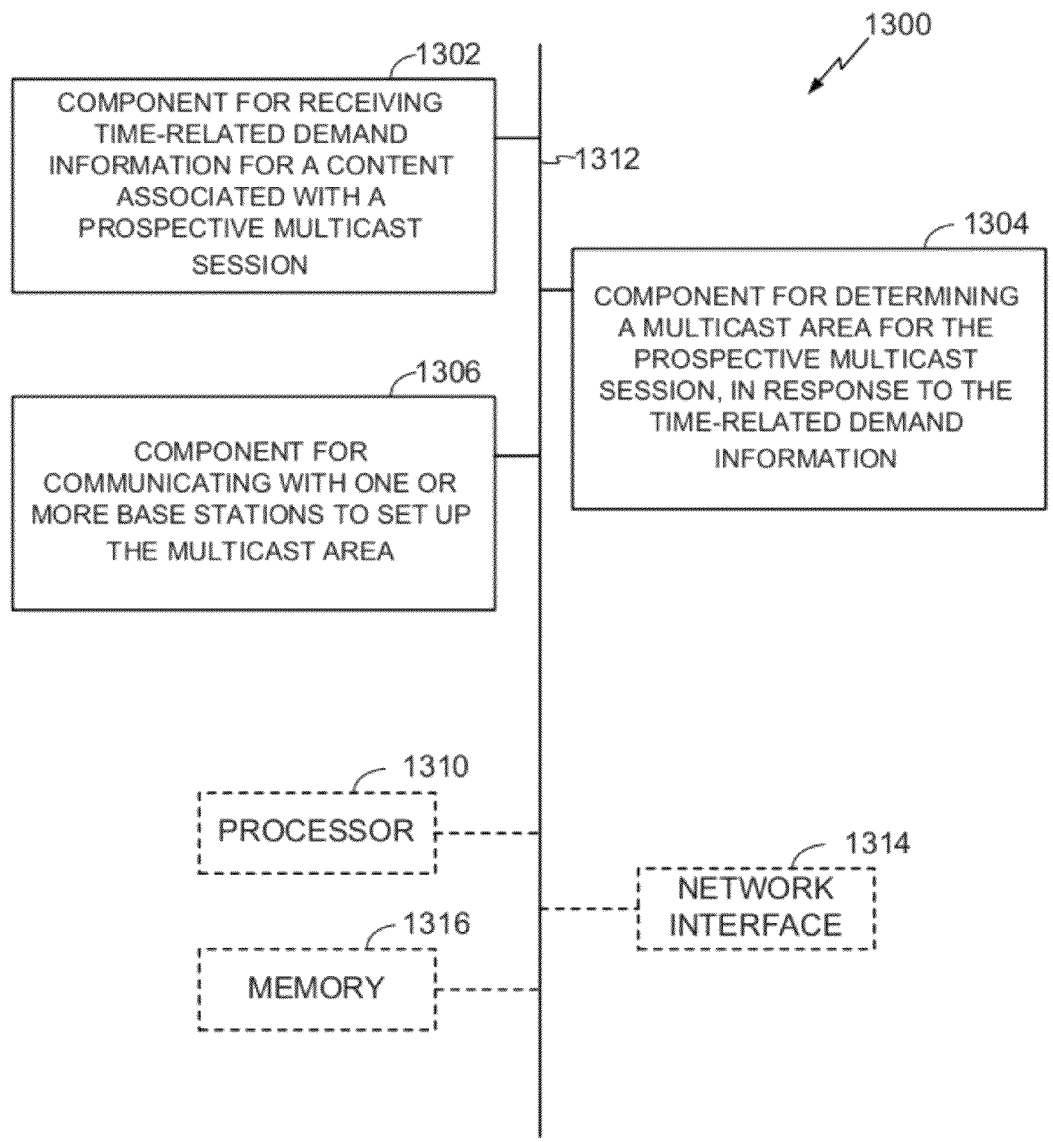
FIG. 13 illustrates an embodiment of an apparatus for implementing a demand-based multicast service, in accordance with the methodologies of FIGS. 12A-B.

With reference to FIG. 13, there is provided an exemplary apparatus 1300 that may be configured as an MCE in a wireless network, or as a processor or similar device for use within the MCE, for managing demand-based eMBMS. The apparatus 1300 may include functional blocks that can represent functions implemented by a processor, software, or combination thereof (e.g., firmware).

As illustrated, in one embodiment, the apparatus 1300 may include an electrical component or module 1302 for receiving time-related demand information for a content associated with a prospective multicast session. For example, the electrical component 1302 may include at least one control processor coupled to a network interface or the like and to a memory with instructions for receiving and using information from one or more base stations. The electrical component 1302 may be, or may include, a means for receiving time-related demand information for a content associated with a prospective multicast session. Said means may include an algorithm executed by one or more processors. The algorithm may include, for example, receiving counting data from multiple base stations and/or other network entities, and aggregating the counting information with respect to time, for example using a rolling average or similar computation, to determine the time-related demand information.

The apparatus 1300 may include an electrical component 1304 for determining a multicast area for the prospective multicast session, in response to the time-related demand information. For example, the electrical component 1304 may include at least one control processor coupled to a memory holding instructions for processing demand information to determine a multicast area. The electrical component 1304 may be, or may include, a means for determining a multicast area for the prospective multicast session, in response to the time-related demand information. Said means may include an algorithm executed by one or more processors. The algorithm may include, for example, referencing time-related demand information to one or more areas of the network, for example by separately computing time-related demand information for each base station or other node, and grouping base stations or nodes exhibiting high demand to determine the multicast area.

The apparatus 1300 may include an electrical component 1306 for communicating with one or more base stations to set up the multicast area. For example, the electrical component 1306 may include at least one control processor coupled to a network interface or the like memory holding instructions for setting up a multicast area by communicating with one or more base stations. The electrical component 1306 may be, or may include, a means for communicating with one or more base stations to set up the multicast area. Said means may include an algorithm executed by one or more processors. The algorithm may include, for example, configuring each base station in the multicast area by transmitting instructions for setting up the multicast area to each base station. The apparatus 1300 may include similar electrical components for performing any or all of the additional operations 1250 described in connection with FIG. 12B, which for illustrative simplicity are not shown in FIG. 13.

In related aspects, the apparatus 1300 may optionally include a processor component 1310 having at least one processor, in the case of the apparatus 1300 configured as a network entity, for example, an MCE. The processor 1310, in such case, may be in operative communication with the components 1302-1306 or similar components via a bus 1312 or similar communication coupling. The processor 1310 may effect initiation and scheduling of the processes or functions performed by electrical components 1302-1306.

In further related aspects, the apparatus 1300 may include a network interface component 1314 for communicating with other network entities. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for performing the activity of the components 1302-1306, and subcomponents thereof, or the processor 1310, the additional operations 1250, or the methods disclosed herein. The memory component 1316 may retain instructions for executing functions associated with the components 1302-1306. While shown as being external to the memory 1316, it is to be understood that the components 1302-1306 can exist within the memory 1316.

Operation of a base station or a mobile entity may include certain operations that are common to all four classes of embodiments described as examples herein. Accordingly, methodologies for performance by the base station or mobile entities are described in sections below, following descriptions of the methodologies and apparatus for the remaining classes 2-4.

Class 2

A second aspect of demand based eMBMS may incorporate using content request addresses and mobile entity location information to monitor content demand levels. This approach may be applied to on-demand streaming or file downloading using a URL protocol or other standardized addressing protocol to request content.

These embodiments make use of a new functionality, sometime called a proxy, added to a P-GW, to detect commonalities in content addresses (e.g., URLs) requested by different mobile entities. The P-GW may also access location information based on MME reports. Using the request and location information, the P-GW may generate a demand level indicator as described elsewhere herein to indicate a level of demand for particular content in a defined area and time window. In response to determining that a demand threshold is reached in a particular area, the P-GW communicates with the BM-SC to set up an eMBMS session in the relevant location. The BM-SC establishes the eMBMS session by communicating to the MBMS-GW and eNBs in the indicated area where demand meets or exceeds the threshold. Operation of the eNB and handling of late arrivers may be done as described for class 1 above.

Figure 14:
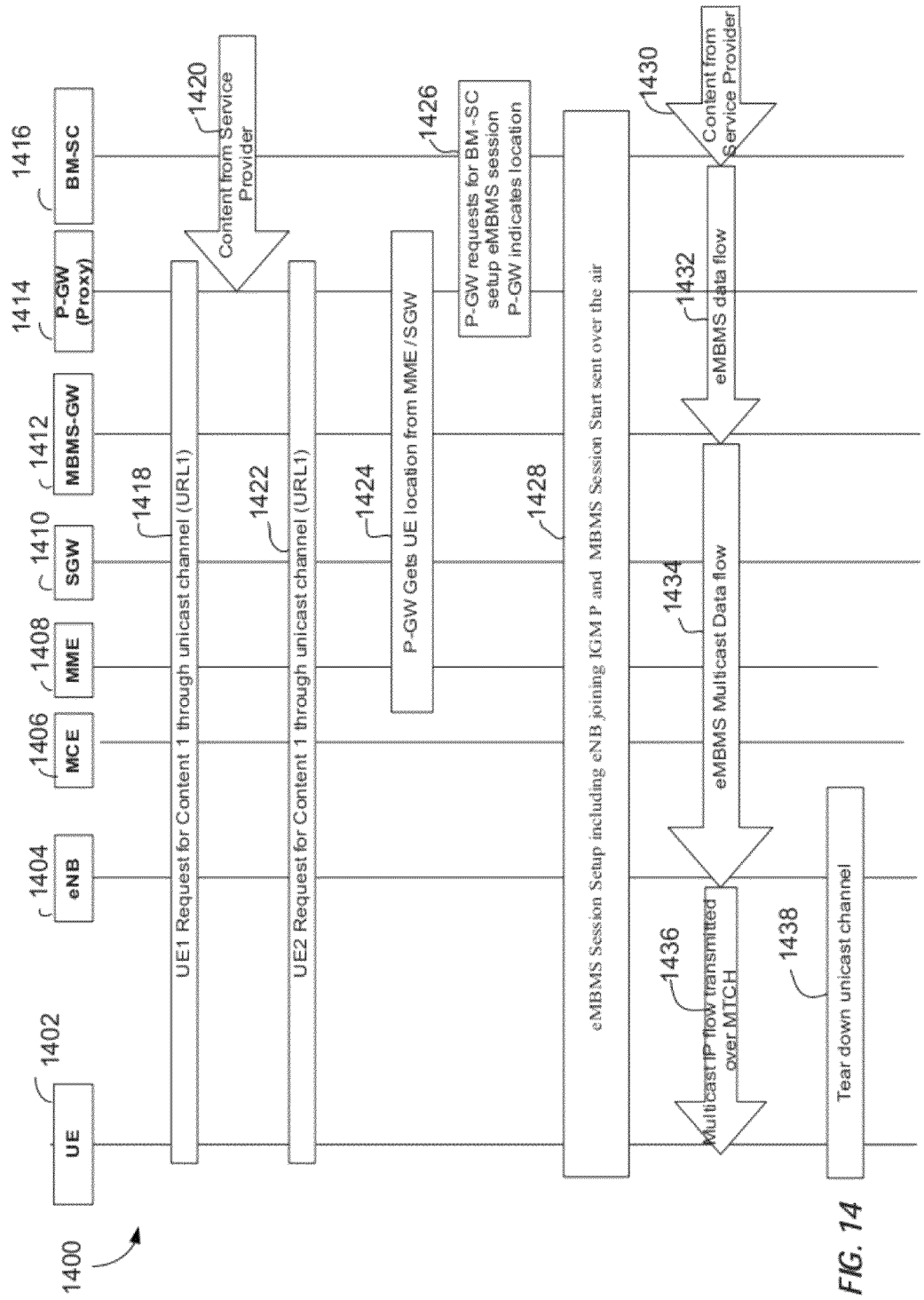
FIG. 14 is a sequence diagram illustrating activity by various components of a wireless communications system implementing or supporting a demand-based multicast service, according to embodiments implementing counting procedures using a Packet Data Network Gate Way (P-GW).

FIG. 14 shows an example call flow 1400 for a demand-based multicast service using content request addresses and mobile entity location information to monitor content demand levels. Initially, a mobile entity 1402 may request any available content 1418 that is addressed using a protocol recognized by the P-GW 1414, for example, a URL. The content request 1418 may be handled in a conventional fashion by the intervening entities eNB 1404, MCE 1406, MME 1408, SGW 1410 and MBMS-GW 1412. Content may be provided 1420 in response to the request via a BM-SC 1416. As shown at 1422, one or more additional mobile entities may generate requests for the same content as requested at 1418. The P-GW 1414 may log the first and second requests 1418, 1422, and obtain 1424 location information for the associated mobile entities from the MME 1408 and/or SGW 1410. The P-GW processes the location information and request log to determine a demand level for specific content in a defined location or area, for example, in a geographic area such as a campus, city, metropolitan area, and so forth. In response to determining that demand exceeds a threshold, the P-GW requests 1426 the BM-SC to set up an eMBMS session for the location or area indicated by the P-GW. In response, the BM-SC 1426 may initiate an eMBMS session startup procedure 1428 in which the depicted entities may participate. After eMBMS session startup 1428, content for the multicast session is obtained from a content provider 1430 through the BM-SC, which provides an eMBMS data flow 1432 to the MBMS-GW 1412. The MBMS-GW provides the content for an eMBMS multicast session 1434 to the eNB 1404, which transmits the data 1436 to mobile entities 1402 using the MTCH. Subsequently, the eNB 1404 and UE 1402 may tear down any unicast channel 1438 formerly used to obtain content that is now being broadcast via the MTCH.

Figure 15A:
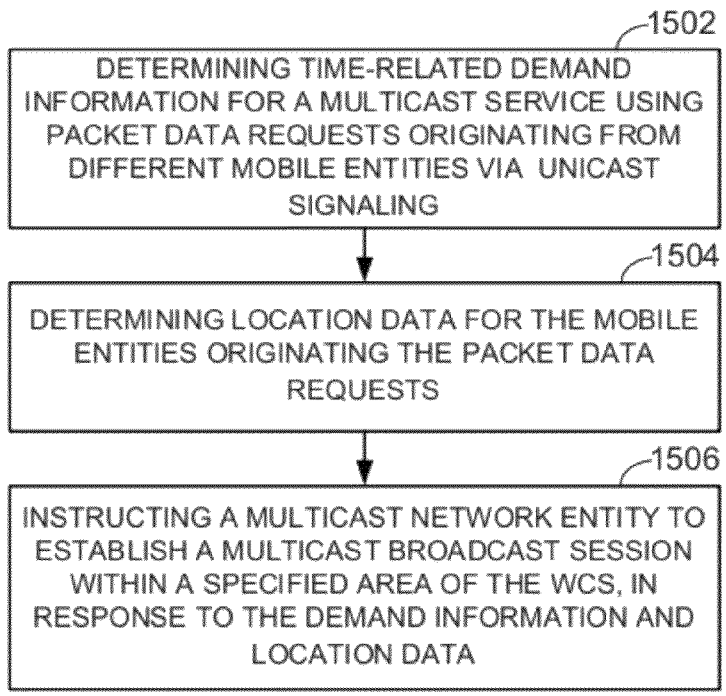
FIGS. 15A-B illustrate embodiments of a methodology for implementing a demand-based multicast service using a P-GW, according to a second alternative using counting by the P-GW.

Consistent with the foregoing, FIG. 15A shows a method 1500 for managing demand-based multicast services at P-GW of a wireless communications system capable of both unicast and multicast signaling. The method is not limited to being performed by a P-GW, and may be performed by any network entity or combination of entities for which the defined operations are possible and/or permitted by applicable standards. The method 1500 may include the P-GW, at 1502, determining time-related demand information for a multicast service using packet data requests originating from different mobile entities via unicast signaling. Time-related demand information may include any information indicating concurrent demand at a particular time, for example a current time, or a recent time. The packet data requests may be addressed using a defined protocol, for example, a URL protocol. The method 1500 may further include the P-GW, at 1504, determining location data for the mobile entities originating the packet data requests. The location data may include, for example, a current location of each mobile entity. The time-related demand information may include a demand level indicator as described in more detail above. The P-GW may determine the multicast area to be an area in which the time-related demand information indicates a demand level greater than some specified threshold, using mobile entity location data from an MME. The method 1500 may further include, at 1506, the P-GW instructing a multicast-capable network entity, for example a BM-SC, to establish a multicast session within a specified area of the wireless communications system, in response to the demand information and location data. If the time-related demand information indicates a level of demand less than an applicable threshold, the P-GW does not instruct the multicast-capable network entity to establish a multicast session. The P-GW may continue demand monitoring for the content.

Figure 15B:
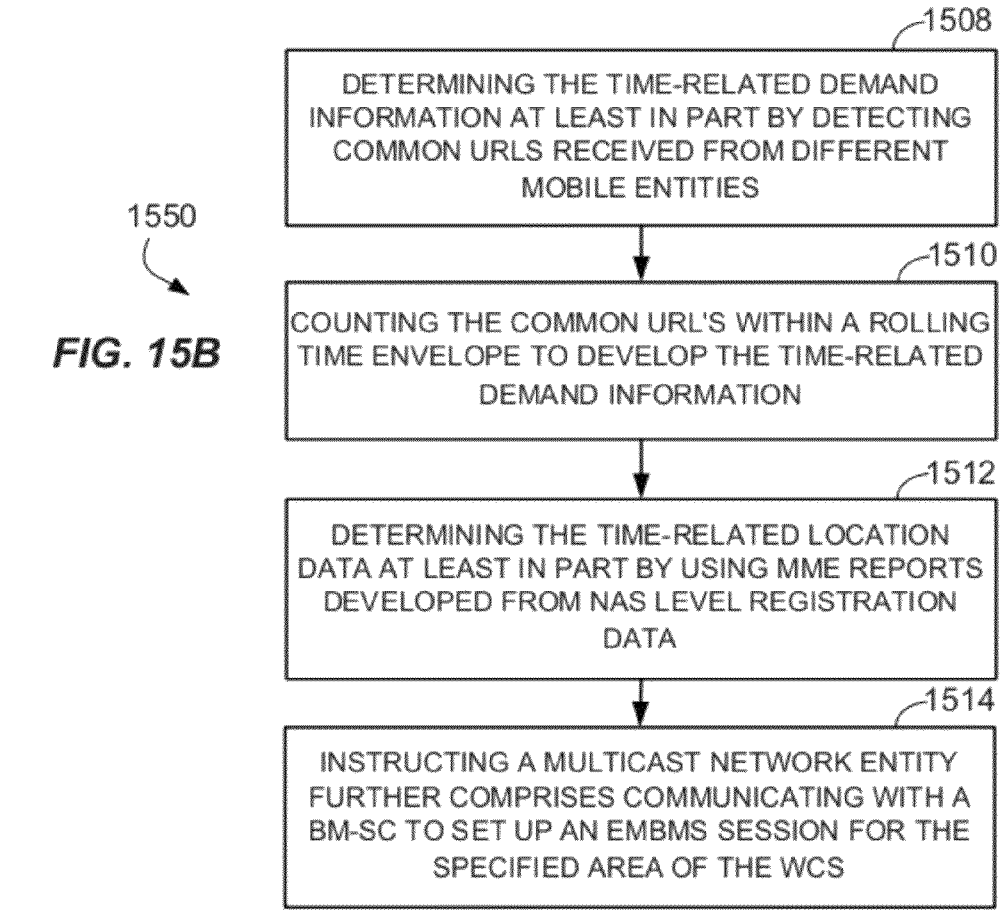

In addition, FIG. 15B shows further optional elements 1550 that may be implemented for use by the P-GW in developing time-related demand information. These optional elements may, in the alternative, be performed by some other network entity in whole or in part. The elements 1550 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1500 includes at least one operation of FIG. 15B, then the method 1500 may terminate after the at least one operation, without necessarily having to include any subsequent downstream operation(s) that may be illustrated.

The additional elements 1550 may include, at 1508, the P-GW determining the time-related demand information at least in part by detecting common URLs received from different mobile entities. That is, an aspect of determining the time-related demand information may include detecting the common URLs as indicated at 1508. The additional elements 1550 may further include, at 1510, the P-GW counting the common URL's within a rolling time envelope to develop the time-related demand information. That is, an aspect of determining the time-related demand information may include counting the common URLs within a rolling time envelope as indicated at 1510, for example as may be done to calculate a rolling average per unit time. The additional elements 1550 may further include, at 1512, the P-GW determining the location data at least in part by using MME reports developed from Non-Access Stratum (NAS) level registration data. The additional elements 1550 may further include, at 1514, the P-GW instructing a multicast network entity further comprises communicating with a BM-SC to set up an eMBMS session for the specified area of the wireless communications system.

Figure 16:
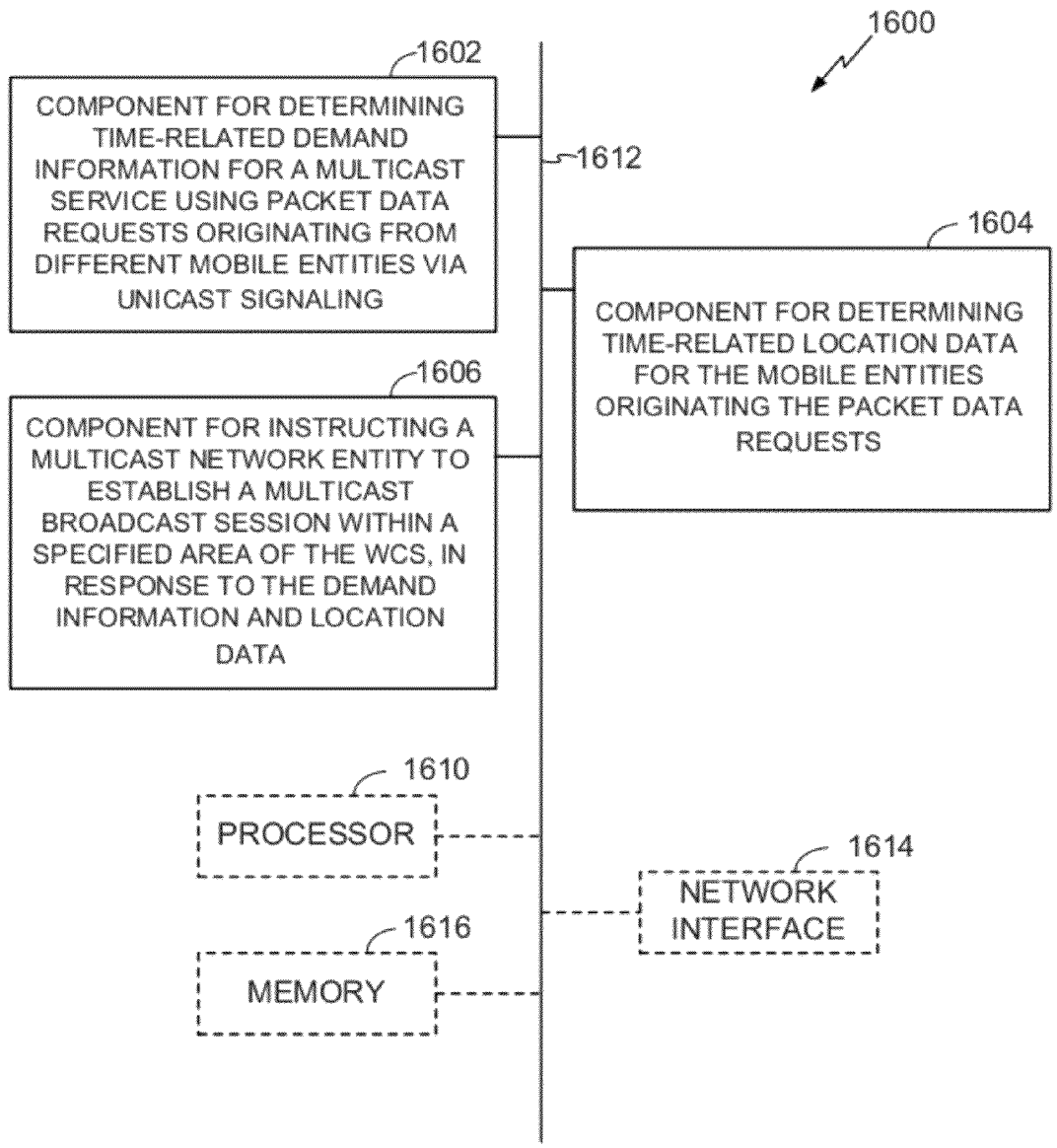
FIG. 16 illustrates an embodiment of an apparatus for implementing a demand-based multicast service, in accordance with the methodologies of FIGS. 15A-B.

With reference to FIG. 16, there is provided an exemplary apparatus 1600 that may be configured as a P-GW or other entity in a wireless network, or as a processor or similar device for use within the P-GW or other entity, for managing demand-based eMBMS. The apparatus 1600 may include functional blocks that can represent functions implemented by a processor, software, or combination thereof (e.g., firmware).

As illustrated, in one embodiment, the apparatus 1600 may include an electrical component or module 1602 for determining time-related demand information for a multicast service using packet data requests originating from different mobile entities via unicast signaling. For example, the electrical component 1602 may include at least one control processor coupled to a network interface or the like and to a memory with instructions for receiving packet data requests at a gate way. The electrical component 1602 may be, or may include, a means for determining time-related demand information for a multicast service using packet data requests originating from different mobile entities via unicast signaling. Said means may include an algorithm executed by one or more processors. The algorithm may include, for example, determining an originating location for incoming packet data requests, for example using an IP address look up, and counting requests received per unit time, for one or more defined network areas.

The apparatus 1600 may include an electrical component 1604 for determining location data for the mobile entities originating the packet data requests. For example, the electrical component 1604 may include at least one control processor coupled to a clock/timer and to a memory holding instructions for receiving the packet data requests with location information for originating mobile entities to develop demand information. The electrical component 1604 may be, or may include, a means for determining location data for the mobile entities originating the packet data requests. Said means may include an algorithm executed by one or more processors. The algorithm may include, for example, one or more of the operations 1550 described in connection with FIG. 15B.

The apparatus 1600 may include an electrical component 1606 for instructing a multicast network entity to establish a multicast session within a specified area of the WCS, in response to the demand information and location data. For example, the electrical component 1606 may include at least one control processor coupled to a network interface or the like and to a memory holding instructions for analyzing demand data relative to a threshold to trigger the instructions. The electrical component 1606 may be, or may include, a means for instructing a multicast network entity to establish a multicast session within a specified area of the WCS, in response to the demand information and location data. Said means may include an algorithm executed by one or more processors. The algorithm may include, for example, defining a multicast area based on the demand information (e.g. identifying an MBMS area or set of adjacent base stations in which demand exceeds a defined threshold), and transmitting an instruction to each base station in the multicast area, wherein the instruction specifies a transition from a unicast to multicast for identified content. The apparatus 1600 may include similar electrical components for performing any or all of the additional operations 1550 described in connection with FIG. 15B, which for illustrative simplicity are not shown in FIG. 16.

In related aspects, the apparatus 1600 may optionally include a processor component 1610 having at least one processor, in the case of the apparatus 1600 configured as a network entity. The processor 1610, in such case, may be in operative communication with the components 1602-1606 or similar components via a bus 1612 or similar communication coupling. The processor 1610 may effect initiation and scheduling of the processes or functions performed by electrical components 1602-1606.

In further related aspects, the apparatus 1600 may include a network interface component 1614 for communicating with other network entities, which may include, for example, a wired or wireless interface. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for performing the activity of the components 1602-1606, and subcomponents thereof, or the processor 1610, the additional operations 1550, or the methods disclosed herein. The memory component 1616 may retain instructions for executing functions associated with the components 1602-1606. While shown as being external to the memory 1616, it is to be understood that the components 1602-1606 can exist within the memory 1616.

Operation of a base station or a mobile entity in cooperation with operation of a network entity as described for class 2 may include certain operations that are common other classes of embodiments described as examples herein. Accordingly, methodologies for performance by the base station or mobile entities that may be used in associated with the methodologies of class 2 are described in sections below, following the methodologies and apparatus described for the remaining classes 3-4.

Class 3

A third as aspect of demand based eMBMS may incorporate using location-specific IP addresses assigned to mobile entities for demand-level monitoring. A location of a mobile entity may initially be determined using a cell identifier, geographical location derived from a Global Positioning System (GPS) or other locating tool, or a tracking area identifier (TAI). In one aspect, an MME or P-GW may assign an IP address to a mobile entity based on the location of the mobile entity. The assigned IP address may be mapped to the initially determined location of each mobile entity. For example, if using IP Version 6, a prefix assignment or interface ID may be assigned to indicate a mobile entity location. In IP Version 4, the Most Significant Bits (MSBs) of the IP address may be assigned based on location. The number of bits to use for location indication may be set by agreement with the content server operator. The new IP address format need not be publicized to the mobile entities. In another aspect, for IPv6 address, the mobile entity assigns the interface ID based on a pre-configured format where location information is encoded in the interface identifier part. In this aspect, the network elements (MME, SGW & PGW) do not need to be aware of the special IP format that contains location information embedded in the IP address.

The content server or downstream proxy may monitor the number of content requests received from a given location within a time window, where the location is determined using the source IP addresses and information mapping the addresses to locations. The information mapping the addresses to locations may be received from the P-GW or MME or may be provisioned at the content server. A unicast socket may be set up initially between the mobile entity and content server. The content server may monitor a predefined number of bits of an IP v6 prefix or MSBs of an IPv4 address included in the source IP address of the unicast socket. The content server may determine a number of mobile entities within a certain area demanding a certain content flow, while using a predefined mapping of IP address bits to a potential MBSFN area to determine a number of mobile entities connecting from the potential MBSFN area. The content server or its proxy may thereby perform demand level monitoring as described elsewhere herein. If the number of users from a certain area receiving content is more than a designated threshold, then the content server may initiate procedures to set up and activate an MBSFN area for multicast transmission of the content. In the alternative, the content server may transmit demand level information for the content to another network entity, which may determine whether or not to activate a multicast session using some defined demand trigger.

If IPv6 addresses are used and the interface identifier is predetermined by the mobile entity and BM-SC, then, in an alternative embodiment, the BM-SC may count a number of users interested in certain content, based on a requested URL.

In some embodiments, a dedicated Access Point Name (APN) or P-GW may be set up for content that is anticipated to be eligible for multicast transmission. Pre-configured information in the mobile entity may be used to indicate whether to use a dedicated APN at the time a unicast channel is established for content. Use of a dedicated APN/P-GW may provide the benefit of permitting localization of IP address format for the APN connection. Mobility effects may be minimized by using the dedicated APN only for specific content to reduce the likelihood that the mobile entity will move too far away from the area initially used to set up the PDN connection where its IP address is assigned. Also, a different IP address may be assigned if the mobile entity moves and requests new content that is directed through the dedicated APN after moving.

One dedicated APN may be used for all multicast-eligible content, which may include content that is in a format suitable for multicasting and is not restricted from being multicast by the content source, and not restricted for any other reason. A Domain Name Server (DNS) for the packet data network may redirect certain requests to the APN for a BM-SC instead of its normal address. For example, a DNS look-up for a mobile entity request for "www.cnn.com" may be redirected to a BM-SC instead of to a content server for the "CNN" address.

To accommodate participation by a content server in demand monitoring, a new interface may need to be defined between the content server and the BM-SC, or by pre-provisioning of the content server information on the BM-SC. Provision of location information is already supported by the TAI at the MME.

Figure 17A:
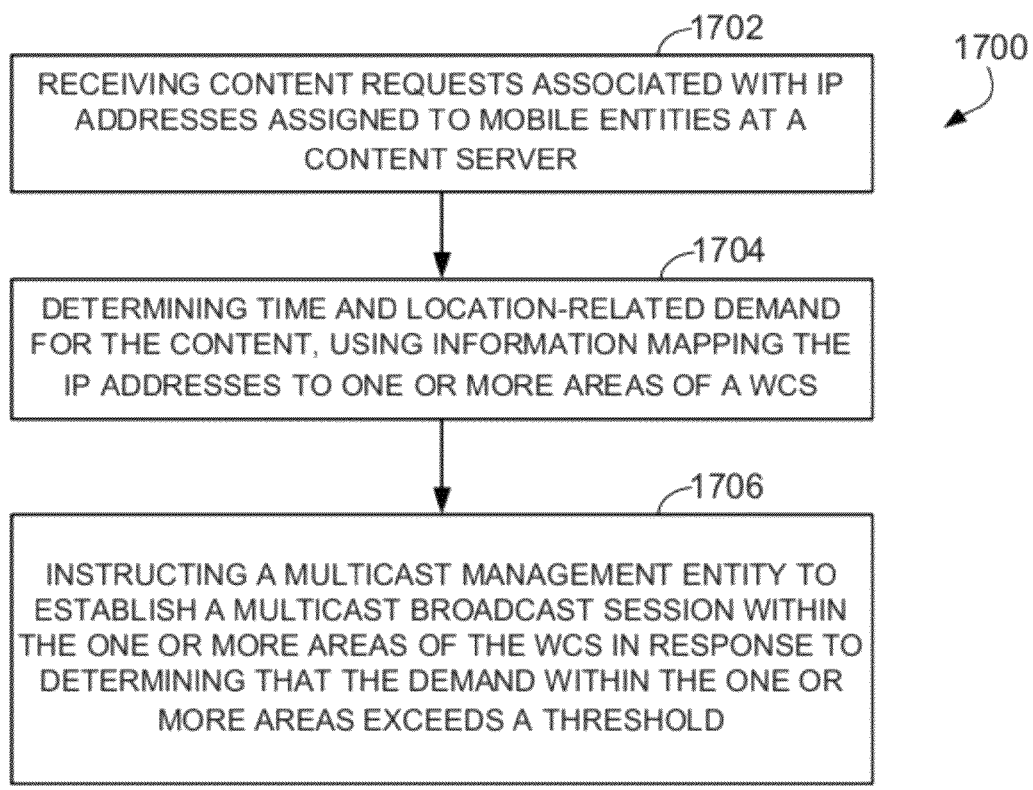
FIGS. 17A-B illustrate embodiments of a methodology for implementing a demand-based multicast service using a content server, according to a third alternative using IP addresses for demand monitoring.

Consistent with the foregoing, FIG. 17A shows a method 1700 for managing demand-based multicast services at content server of a wireless communications system capable of both unicast and multicast signaling. The method 1700 may include the content server, at 1702, receiving content requests associated with IP addresses assigned to mobile entities for a content at a content server. The IP address may be formatted to contain location-related information. The method 1700 may further include the content server, at 1704, determining time and location-related demand for the content, using information mapping the IP addresses to one or more areas of the wireless communications system. As noted above, the location-related data may come from an MME using a TAI. The content server may determine for a certain area, the time-related demand information indicates a demand level greater than some specified threshold. The method 1700 may further include, at 1706, the content server instructing a multicast management entity, for example a BM-SC, to establish a multicast session within the one or more areas of the wireless communications system in response to determining that the demand within the one or more areas exceeds a defined threshold. If the time and location-related demand is less than an applicable threshold, the content server does not instruct the multicast network entity to establish a multicast session, but may continue demand monitoring for the content.

Figure 17B:
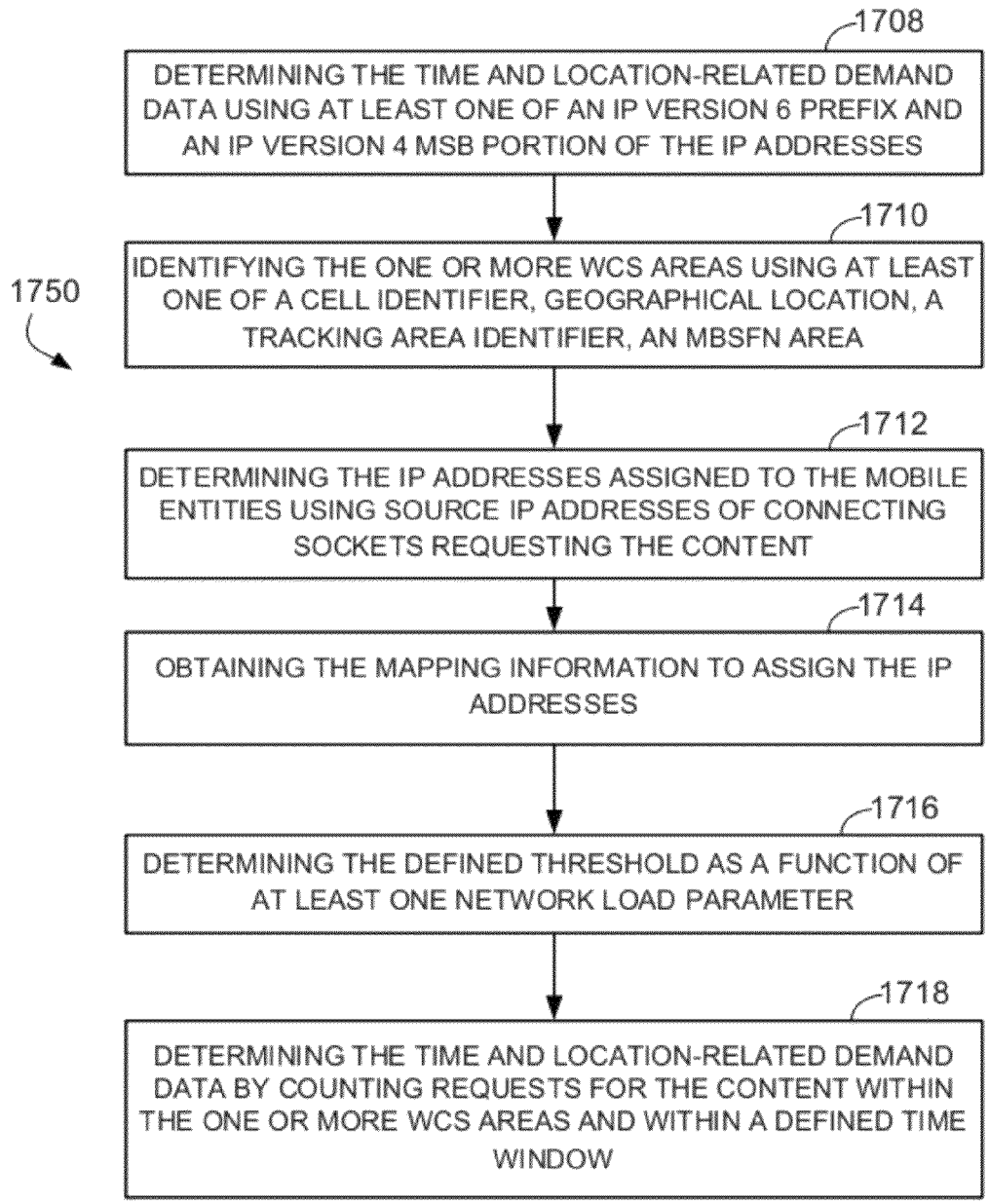

In addition, FIG. 17B shows further optional elements 1750 that may be implemented for use by the content server in association with method 1700. These optional elements may, in the alternative, be performed by some other network entity in whole or in part. The elements 1750 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1700 includes at least one operation of FIG. 17B, then the method 1700 may terminate after the at least one operation, without necessarily having to include any subsequent downstream operation(s) that may be illustrated.

The additional elements 1750 may include, at 1708, the content server determining the time and location-related demand using at least one of an IP Version 6 prefix and an IP Version 4 MSB portion of the IP addresses. The additional elements 1750 may further include, at 1710, the content server identifying the one or more areas of the WCS using at least one of a cell identifier, geographical location, a tracking area identifier, and a MBSFN area. The additional elements 1750 may further include, at 1712, the content server determining the IP addresses assigned to the mobile entities using the source IP addresses of connecting sockets requesting the content. The additional elements 1750 may further include, at 1714, the content server obtaining the mapping information to assign the IP addresses. The IP address may be assigned by a different entity, for example by a Packet Data Network Gate Way. The additional elements 1750 may further include, at 1716, the content server determining the defined threshold based on a network load parameter. The additional elements 1750 may further include, at 1718, the content server determining the time and location-related demand by counting requests for the content from locations within the one or more areas and within a defined time window.

Figure 18:
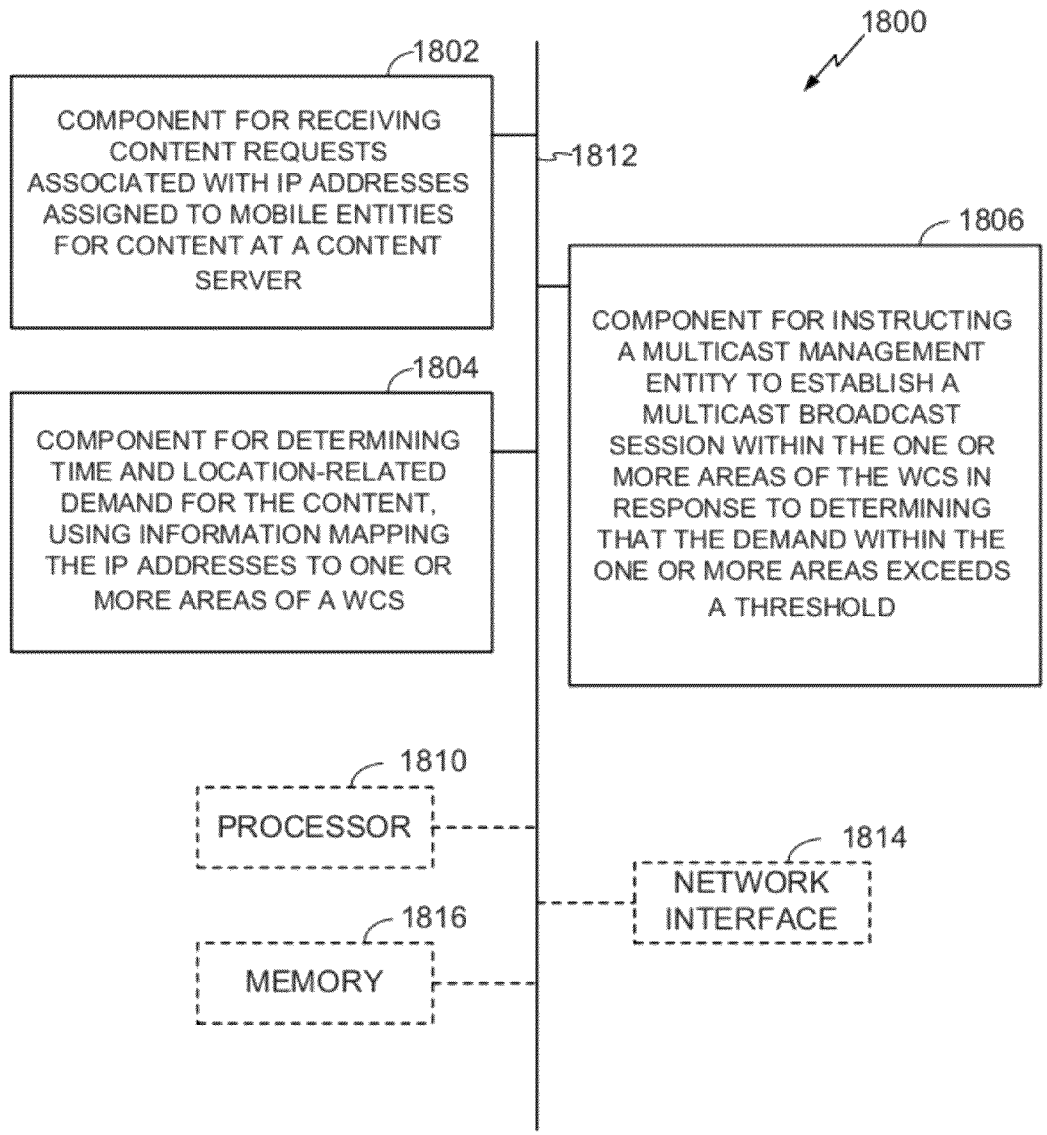
FIG. 18 illustrates an embodiment of an apparatus for implementing a demand-based multicast service, in accordance with the methodologies of FIGS. 17A-B.

With reference to FIG. 18, there is provided an exemplary apparatus 1800 that may be configured as a content server in a wireless network, or as a processor or similar device for use within the content server, for managing demand-based eMBMS. The apparatus 1800 may include functional blocks that can represent functions implemented by a processor, software, or combination thereof (e.g., firmware).

As illustrated, in one embodiment, the apparatus 1800 may include an electrical component or module 1802 for receiving content requests associated with IP addresses assigned to mobile entities for a content at a content server. For example, the electrical component 1802 may include at least one control processor coupled to a network interface or the like and to a memory with instructions for receiving content requests for the content through a gate way. The electrical component 1802 may be, or may include, a means for receiving content requests for the content at a content server, wherein each of the requests is associated with different IP addresses assigned to respective ones of the mobile entities. Said means may include an algorithm executed by one or more processors. The algorithm may include, for example, communicating with a network element that relays content requests, for example a P-BW or BM-SC, receiving content requests from the network entity, and processing each request to determine an associated IP address, e.g., an originating IP address for each request.

The apparatus 1800 may include an electrical component 1804 for determining time and location-related demand for the content, using information mapping the IP addresses to one or more areas of the wireless communications system. For example, the electrical component 1804 may include at least one control processor coupled to a network interface and to a memory holding instructions for obtaining and mapping the location data to sockets for specific content. The electrical component 1804 may be, or may include, a means for determining time and location-related demand for the content, using information mapping the IP addresses to one or more areas of the wireless communications system. Said means may include an algorithm executed by one or more processors. The algorithm may include, for example, determining network locations for each request using an IP look up table or other data structure that maps IP addresses to locations, determine a time of each request using a time stamp, counting requests based on network area, and determining a time-related demand measure by aggregating the count per unit time for each area, for example by computing a rolling average per area. The algorithm may include, for example, any one or more of the operations 1750 described in connection with FIG. 17B.

The apparatus 1800 may include an electrical component 1806 for instructing a multicast management entity to establish a multicast session within one or more areas of the wireless communications system in response to determining that the demand within the one or more areas exceeds a defined threshold. For example, the electrical component 1806 may include at least one control processor coupled to a network interface or the like and to memory holding instructions for analyzing demand data relative to a threshold to trigger the instructions. The electrical component 1806 may be, or may include, a means for instructing a multicast management entity to establish a multicast session within one or more areas of the wireless communications system in response to determining that the demand within the one or more areas exceeds a defined threshold. Said means may include an algorithm executed by one or more processors. The algorithm may include, for example, determining a fixed or variable threshold value, comparing the demand measure to the threshold value, and providing information describing the multicast area (e.g., a service area identifier) and content to a network entity managing multicast sessions in the network area. The apparatus 1800 may include similar electrical components for performing any or all of the additional operations 1750 described in connection with FIG. 17B, which for illustrative simplicity are not shown in FIG. 18.

In related aspects, the apparatus 1800 may optionally include a processor component 1810 having at least one processor, in the case of the apparatus 1800 configured as a network entity. The processor 1810, in such case, may be in operative communication with the components 1802-1806 or similar components via a bus 1812 or similar communication coupling. The processor 1810 may effect initiation and scheduling of the processes or functions performed by electrical components 1802-1806.

In further related aspects, the apparatus 1800 may include a network interface component 1814 for communicating with other network entities. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for performing the activity of the components 1802-1806, and subcomponents thereof, or the processor 1810, the additional operations 1750, or the methods disclosed herein. The memory component 1816 may retain instructions for executing functions associated with the components 1802-1806. While shown as being external to the memory 1816, it is to be understood that the components 1802-1806 can exist within the memory 1816.

Figure 19A:
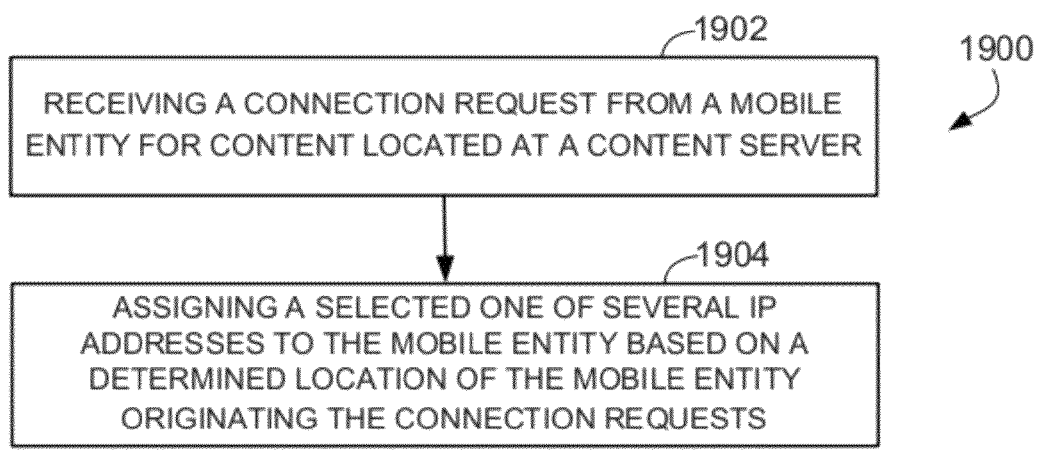
FIGS. 19A-B illustrate embodiments of a methodology for implementing a demand-based multicast service using a Packet Data Network Gate Way, according to the third alternative.

In addition, FIG. 19A shows a method 1900 for managing demand-based multicast services at a P-GW of a wireless communications system capable of both unicast and multicast signaling. The method 1900 may include the P-GW, at 1902, receiving a connection request from a mobile entity. The content server may include any server that is capable of serving content through the P-GW that can be requested using a request passing through the P-GW. The method 1900 may further include the P-GW, at 1904, assigning a selected one of several IP addresses to the mobile entity based on a determined location of the mobile entity originating the connection request. As noted above, the IP address may be formatted to contain location-related information, which may come from an MME using a TAI. The P-GW may select each IP address from a reserved pool of IP addresses dedicated to one or more areas of the wireless communications system, according to the location information. For example, if the location information indicates that a mobile entity is located in "Area A", the P-GW may select an available IP address for the mobile entity from a pool reserved for Area A.

Figure 19B:
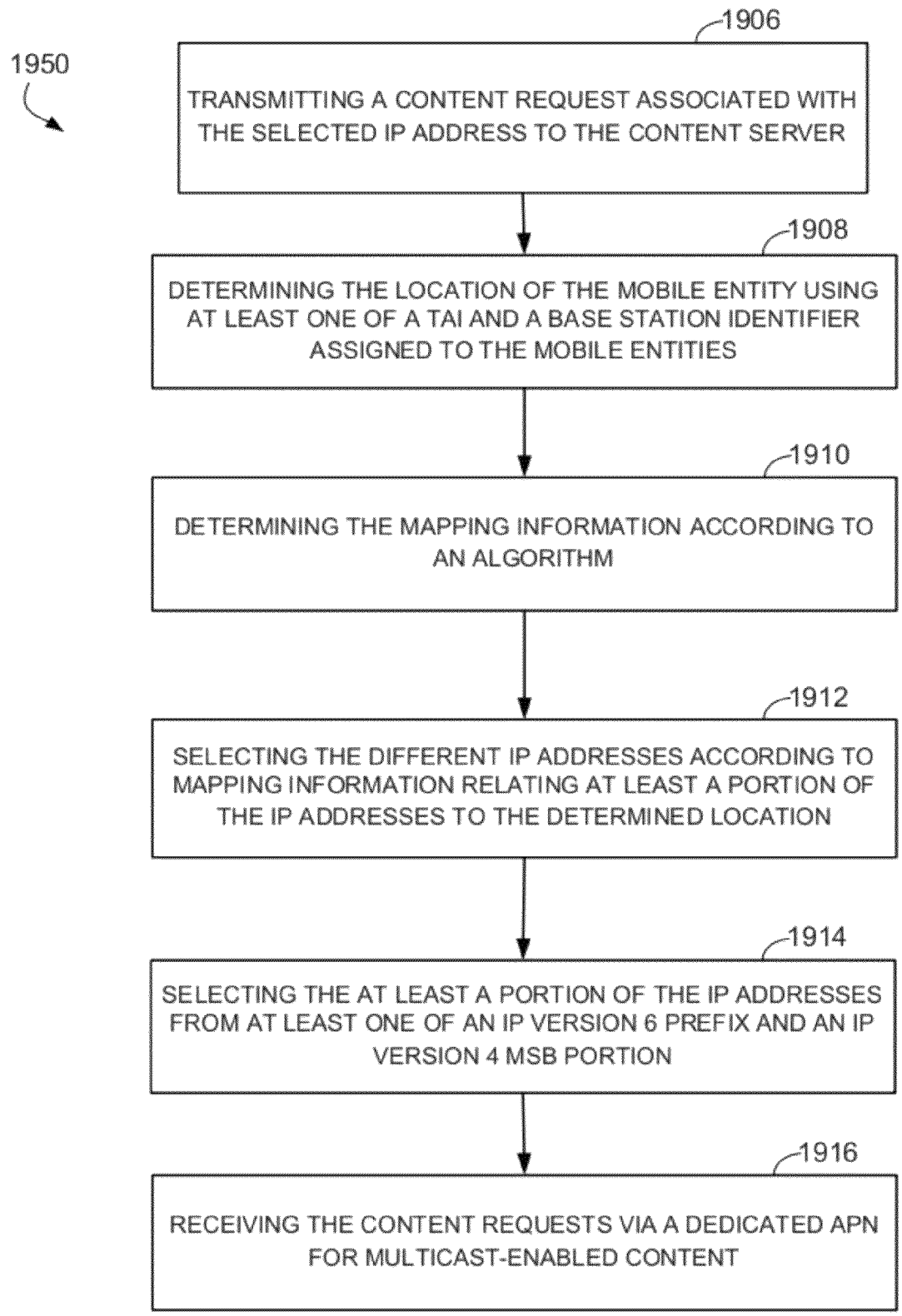

In addition, FIG. 19B shows further optional elements 1950 that may be implemented for use by the P-GW in association with method 1900. These optional elements may, in the alternative, be performed by some other network entity in whole or in part. The elements 1950 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1900 includes at least one operation of FIG. 19B, then the method 1900 may terminate after the at least one operation, without necessarily having to include any subsequent downstream operation(s) that may be illustrated.

The additional elements 1950 may include, at 1906, the P-GW transmitting a content request associated with the one of the several IP addresses to the content server. The content server or a downstream proxy may use the IP address assigned by the P-GW to discern information about a location of each requesting mobile entity. In the alternative, the PGW may assign an IPv6 prefix that is independent of the location of the mobile entity and the mobile entity may choose an IPv6 interface identifier that is based on its location. The additional elements 1950 may include, at 1908, the P-GW determining the location of the mobile entity using at least one of a TAI and a base station identifier assigned to the mobile entities. The additional elements 1950 may further include, at 1910, the P-GW determining the mapping information according to an algorithm. The additional elements 1950 may further include, at 1912, the P-GW selecting the one of several IP addresses according to mapping information relating at least a portion of the IP addresses to the determined location. The additional elements 1950 may further include, at 1914, the P-GW selecting the at least a portion of the IP addresses from at least one of an IP Version 6 prefix and an IP Version 4 predefined portion, for example, MSB. The additional elements 1950 may further include, at 1916, the P-GW receiving the content request via a dedicated APN for multicast-enabled content.

Figure 20:
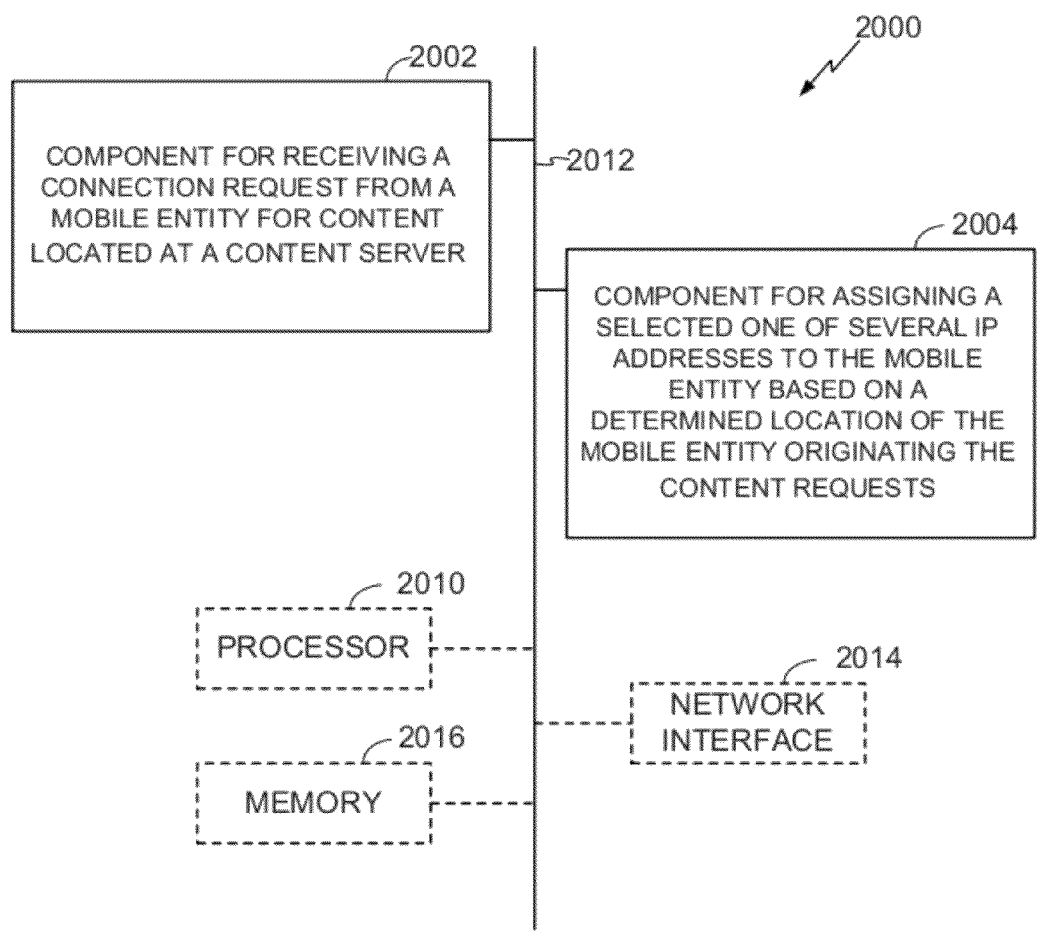
FIG. 20 illustrates an embodiment of an apparatus for implementing a demand-based multicast service, in accordance with the methodologies of FIGS. 19A-B.

With reference to FIG. 20, there is provided an exemplary apparatus 2000 that may be configured as a P-GW in a wireless network, or as a processor or similar device for use within the P-GW, for managing demand-based eMBMS. The apparatus 2000 may include functional blocks that can represent functions implemented by a processor, software, or combination thereof (e.g., firmware).

As illustrated, in one embodiment, the apparatus 2000 may include an electrical component or module 2002 for receiving a connection request from a mobile entity. For example, the electrical component 2002 may include at least one control processor coupled to a network interface or the like and to a memory with instructions for receiving connection requests as a gate way server. The electrical component 2002 may be, or may include, a means for receiving a connection request from a mobile entity. Said means may include an algorithm executed by one or more processors. The algorithm may include, for example, communicating with an MBMS GW, and receiving the connection request relayed by the MBMS GW.

The apparatus 2000 may include an electrical component 2004 for assigning a selected one of several IP addresses to the mobile entity based on a determined location of the mobile entity originating the connection request. For example, the electrical component 2004 may include at least one control processor coupled to a network interface and to a memory holding instructions for obtaining and mapping the location data to specific prefix or MSB values. The electrical component 2004 may be, or may include, a means for assigning a selected one of several IP addresses to the mobile entity based on a determined location of the mobile entity originating the connection request. Said means may include an algorithm executed by one or more processors. The algorithm may include, for example, determining a network location of the mobile entity originating the connection request, looking up an IP address indicative of the location, and assigning the IP address to the connection request. The algorithm may include any one or more of the operations 1950 described in connection with FIG. 19B.

The apparatus 2000 may include similar electrical components for performing any or all of the additional operations 1950 described in connection with FIG. 19B, which for illustrative simplicity are not shown in FIG. 20.

In related aspects, the apparatus 2000 may optionally include a processor component 2010 having at least one processor, in the case of the apparatus 2000 configured as a network entity. The processor 2010, in such case, may be in operative communication with the components 2002-2004 or similar components via a bus 2012 or similar communication coupling. The processor 2010 may effect initiation and scheduling of the processes or functions performed by electrical components 2002-2004.

In further related aspects, the apparatus 2000 may include a network interface component 2014 for communicating with other network entities. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2004, and subcomponents thereof, or the processor 2010, the additional operations 1950, or the methods disclosed herein. The memory component 2016 may retain instructions for executing functions associated with the components 2002-2004. While shown as being external to the memory 2016, it is to be understood that the components 2002-2004 can exist within the memory 2016.

Operation of a base station or a mobile entity may include certain operations that are common to all four classes of embodiments described as examples herein. Accordingly, methodologies for performance by the base station or mobile entities in connection with class 3 embodiments are described in sections below, following the methodologies and apparatus described for the remaining class 4.

Class 4

A fourth aspect for providing demand based eMBMS may include using a network entity such as a P-GW or the like to provide demand level monitoring for a live broadcast content type. Aggregation of multiple media downloads and streaming from the same source using an eMBMS session reduces loads on cell resources and thereby increases overall system capacity.

A P-GW may be used to handle requests for live streaming of broadcast content. The P-GW may use the URL or other address for the media source, or data streaming from a multicast IP address, to identify commonly used or requested content within a time window. For example, the P-GW may identify requests for common content using URL's of incoming content requests. Initially, the multicast session from the content source is captured by the P-GW and tunneled into a new or existing Dedicated Radio Bearer (DRB) for the requesting mobile entity for use with live streaming data. The P-GW monitors such activities and reports a number of mobile entities and their associated identifiers receiving the same streaming content to an MME. The MME makes a determination whether or not to associate the live streaming broadcast with an eMBMS session in an MBSFN area, depending on load condition and other factors. The MME/MCE approves the eMBMS session for a given cell group, based on the demand level and threshold information. The MCE sets up an eMBMS channel for the media source supplying the live streaming content, and assigns a TMGI for the session.

The MME/MCE instructs one or more eNBs to start an eMBMS session for a specific TMGI. The eNB then indicates to mobile entities that for a specific logical channel, some data will be transmitted via the eMBMS traffic channel (MTCH). A mobile entity receiving this message may associate the eMBMS bearer to an existing bearer or logical channel associated with the live broadcast. During a transition from unicast to multicast, the UE may receive duplicate data through unicast and multicast transmissions. The streaming application need not be aware of the eMBMS session making this option compatible with any live stream application on the World Wide Web. In the alternative, the application could be aware of multiple streams through the unicast and multicast bearers, and aggregate them together. However, this will add complexity at the application level.

The MME instructs the P-GW to stop sending the multicast data via unicast channels, once the eMBMS area is established. At a coordinated time (e.g., just prior to to, at, or just after stopping the unicast data flow), the P-GW instructs the BM-SC to start the associated eMBMS session. Conversely, if demand drops below a threshold, the MME/MCE can tear down an eMBMS session. In such case, the MME may instruct the P-GW and BM-SC to stop the multicast session and begin sending the streaming data via unicast.

Consistent with the foregoing, FIG. 21A shows a method 2100 for managing demand-based multicast services at a P-GW of a wireless communications system capable of both unicast and multicast signaling. The method 2100 may include the P-GW, at 2102, counting a number of mobile entities requesting or receiving a live streaming service via unicast signaling. The P-GW may count the number of mobile entities requesting the live streaming service, those receiving it at a current time, or some combination of requesting and receiving mobile entities. The P-GW may maintain and adjust the count so that it can be used as a measure or estimate of current or imminent demand for the live streaming service. For example, if counting requests, the P-GM may decrement the count in a time-based fashion to account for entities that requested the service too long ago to accurately reflect current or imminent demand. The method 2100 may further include the P-GW, at 2104, reporting the number of mobile entities and their identifiers to a multicast management entity for use in determining demand for the live streaming service in one or more areas of the wireless communications system.

In addition, FIG. 21B shows further optional elements 2150 that may be implemented for use by the P-GW in association with method 2100. These optional elements may, in the alternative, be performed by some other network entity in whole or in part. The elements 2150 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2100 includes at least one operation of FIG. 21B, then the method 2100 may terminate after the at least one operation, without necessarily having to include any subsequent downstream operation(s) that may be illustrated.

The additional elements 2150 may include, at 2108, the P-GW transmitting the live streaming service to one or more base stations for transmission to the mobile entities via unicast signaling. The additional elements 2150 may further include, at 2110, the P-GW receiving a signal from a management entity indicating that the live streaming service is to be multicast to certain ones of the mobile entities located in at least one area of the WCS. The additional elements 2150 may further include, at 2112, the P-GW instructing a BM-SC to initiate a multicast session for the live streaming service, in response to the signal. The additional elements 2150 may further include, at 2114, the P-GW stopping transmission of the streaming service via unicast signaling, in response to determining that a multicast session for the live streaming service has been initiated.

Figure 22:
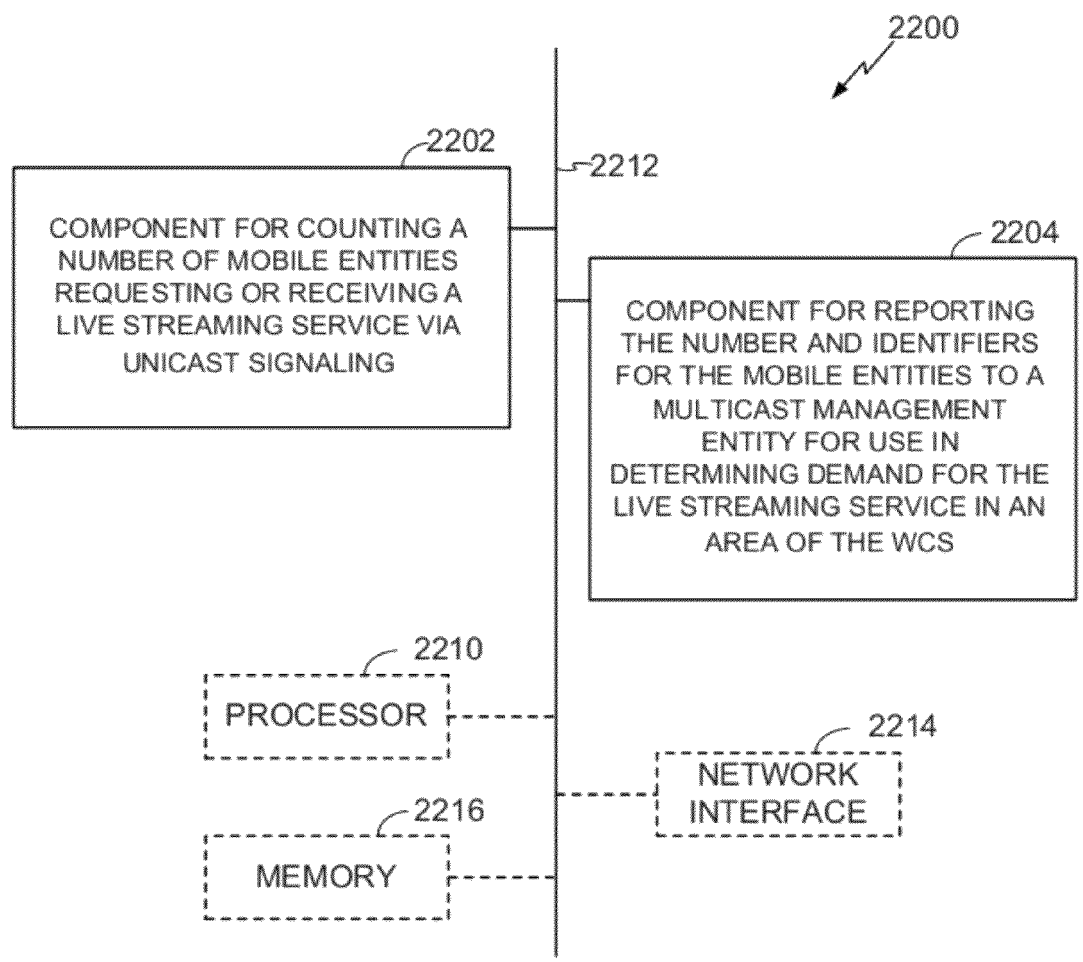
FIG. 22 illustrates an embodiment of an apparatus for implementing a demand-based multicast service, in accordance with the methodologies of FIGS. 21A-B.

With reference to FIG. 22, there is provided an exemplary apparatus 2200 that may be configured as a P-GW in a wireless network, or as a processor or similar device for use within the P-GW, for managing demand-based eMBMS. The apparatus 2200 may include functional blocks that can represent functions implemented by a processor, software, or combination thereof (e.g., firmware).

As illustrated, in one embodiment, the apparatus 2200 may include an electrical component or module 2202 for counting a number of mobile entities requesting or receiving a live streaming service via unicast signaling. For example, the electrical component 2202 may include at least one control processor coupled to a network interface or the like and to a memory with instructions for detecting and counting common content requests for live streaming content. The electrical component 2202 may be, or may include, a means for counting a number of mobile entities requesting or receiving a live streaming service via unicast signaling. Said means may include an algorithm executed by one or more processors. The algorithm may include, for example, detecting requests for live streaming services originating from the mobile entities, determining network locations for each request for example using an IP look up table or other data structure, and counting the requests for each area. The area may be defined as a pre-existing group of base stations, e.g., a predefined MBSFN area or predefined MBMS service area (see FIG. 5.). In the alternative, the area may be an ad hoc area defined by a group of adjacent base stations selected in connection with the counting of requests, e.g., a group of base stations for which counting indicates that demand for a service is high.

The apparatus 2200 may include an electrical component 2204 for reporting the number of mobile entities and their identifiers to a multicast management entity for use in determining demand for the live streaming service in one or more areas of the wireless communications system. For example, the electrical component 2204 may include at least one control processor coupled to a network interface and to a memory holding instructions for communicating the enumerated values to an MME. The electrical component 2204 may be, or may include, a means for reporting the number of mobile entities and their identifiers to a multicast management entity for use in determining demand for the live streaming service in one or more areas of the wireless communications system. Said means may include an algorithm executed by one or more processors. The algorithm may include, for example, periodically obtaining the current live streaming count, and transmitting the current count to the MME. The apparatus 2200 may include similar electrical components for performing any or all of the additional operations 2150 described in connection with FIG. 21B, which for illustrative simplicity are not shown in FIG. 22.

In related aspects, the apparatus 2200 may optionally include a processor component 2210 having at least one processor, in the case of the apparatus 2200 configured as a network entity. The processor 2210, in such case, may be in operative communication with the components 2202-2204 or similar components via a bus 2212 or similar communication coupling. The processor 2210 may effect initiation and scheduling of the processes or functions performed by electrical components 2202-2204.

In further related aspects, the apparatus 2200 may include a network interface component 2214 for communicating with other network entities. The apparatus 2200 may optionally include a component for storing information, such as, for example, a memory device/component 2216. The computer readable medium or the memory component 2216 may be operatively coupled to the other components of the apparatus 2200 via the bus 2212 or the like. The memory component 2216 may be adapted to store computer readable instructions and data for performing the activity of the components 2202-2204, and subcomponents thereof, or the processor 2210, the additional operations 2150, or the methods disclosed herein. The memory component 2216 may retain instructions for executing functions associated with the components 2202-2204. While shown as being external to the memory 2216, it is to be understood that the components 2202-2204 can exist within the memory 2216.

Figure 23A:
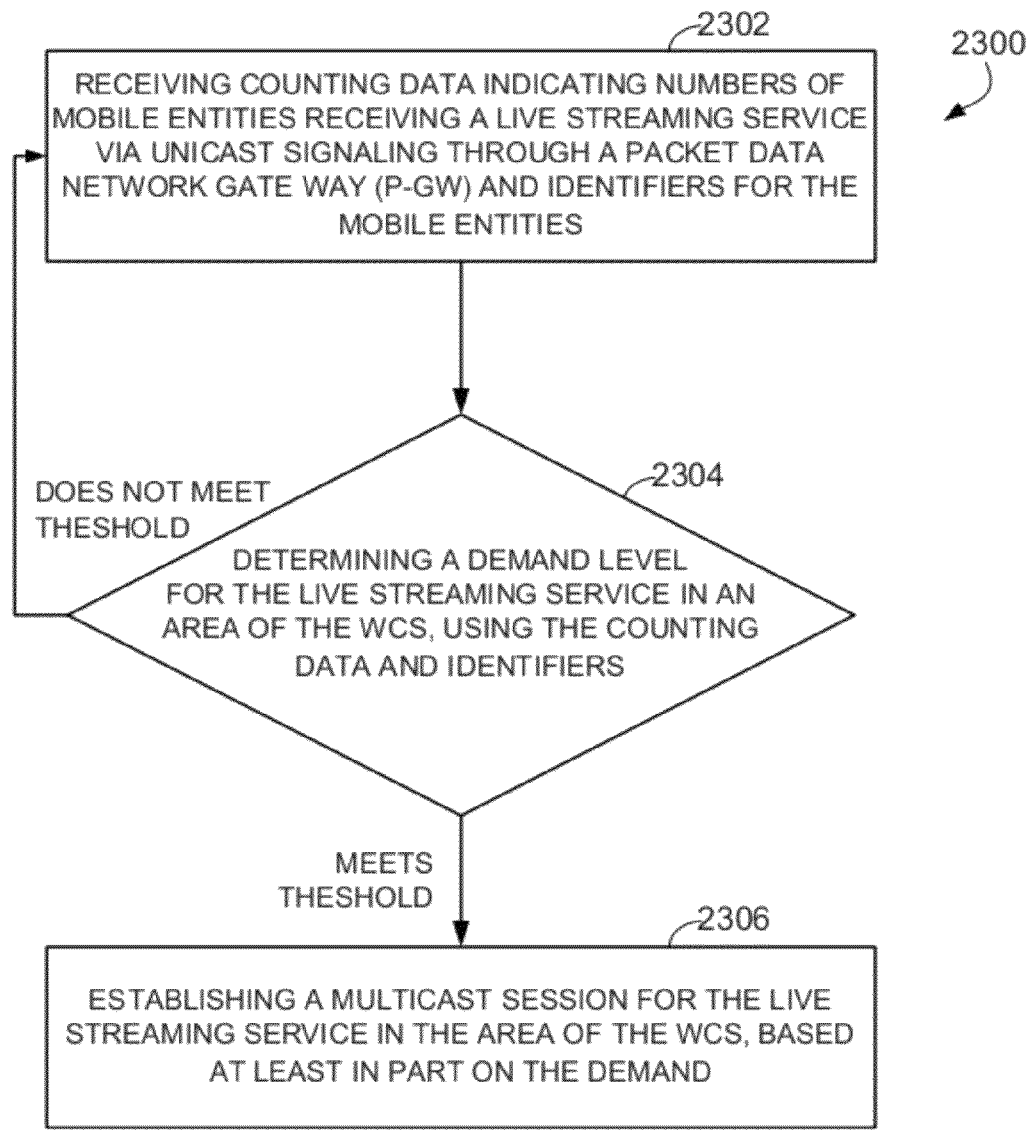
FIGS. 23A-B illustrate embodiments of a methodology for implementing a demand-based multicast service using a Mobility Management Entity, according to the fourth alternative.

In addition, FIG. 23A shows a method 2300 for managing demand-based multicast services at an MME of a wireless communications system capable of both unicast and multicast signaling. The method 2300 may include the MME, at 2302, receiving counting data indicating numbers of mobile entities receiving a live streaming service via unicast signaling through a P-GW and identifiers for the mobile entities. The method 2300 may further include the MME, at 2304, determining a demand level for the live streaming service in an area of the wireless communications system, using the counting data and identifiers. A demand level may be determined using any method as disclosed herein or otherwise suitable. The method 2300 may further include, at 2306, the MME establishing a multicast session for the live streaming service in one or more areas of the wireless communications system, based at least in part on the demand.

Figure 23B:
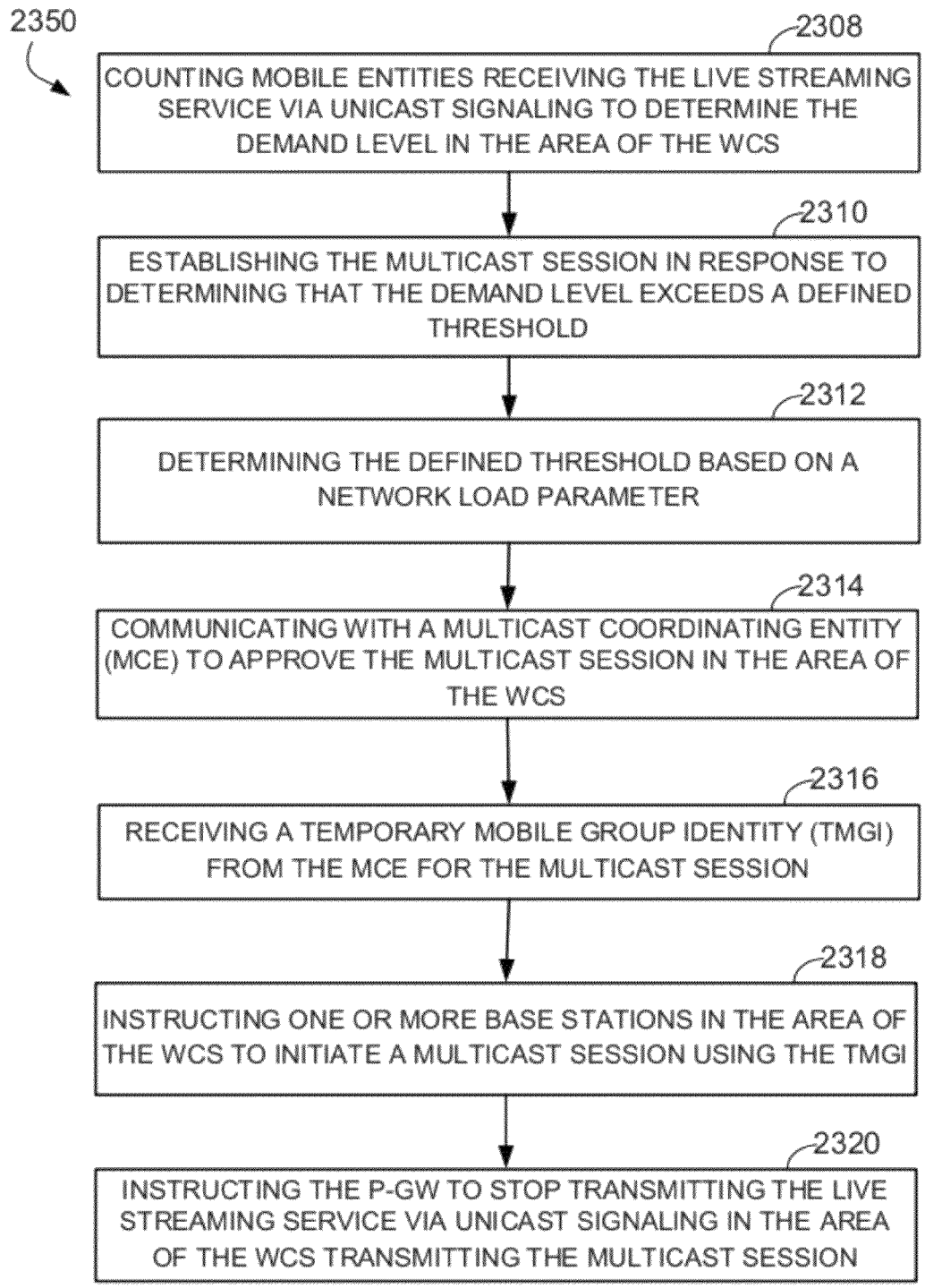

In addition, FIG. 23B shows further optional elements 2350 that may be implemented for use by the MME in association with method 2300. These optional elements may, in the alternative, be performed by some other network entity in whole or in part. The elements 2350 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2300 includes at least one operation of FIG. 23B, then the method 2300 may terminate after the at least one operation, without necessarily having to include any subsequent downstream operation(s) that may be illustrated.

The additional elements 2350 may include, at 2308, the MME counting mobile entities receiving the live streaming service via unicast signaling to determine the demand level in the area of the wireless communications system. The additional elements 2350 may further include, at 2310, the MME establishing the multicast session in response to determining that the demand level exceeds a defined threshold. The additional elements 2350 may further include, at 2312, the MME determining the defined threshold based on a network load parameter. The additional elements 2350 may further include, at 2314, the MME communicating with MCE to approve the multicast session in the area of the wireless communications system. The additional elements 2350 may further include, at 2316, the MME receiving a TMGI from the MCE for the multicast session. The additional elements 2350 may further include, at 2318, the MME instructing a base station in the area of the wireless communications system to initiate a multicast session using the TMGI. The additional elements 2350 may further include, at 2320, the MME instructing the P-GW to stop transmitting the live streaming service via unicast signaling in the area of the WCS transmitting the multicast session.

Figure 24:
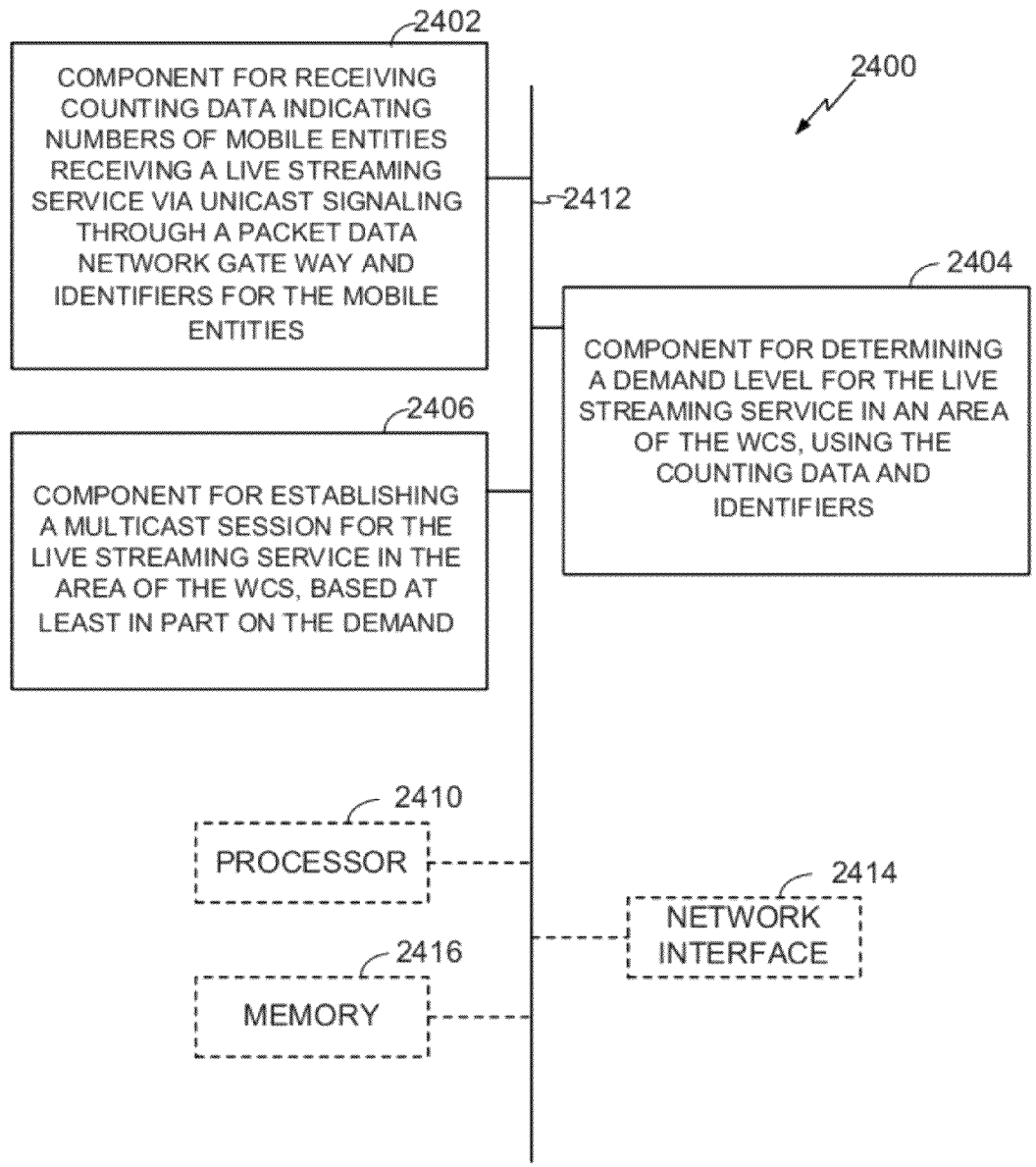
FIG. 24 illustrates an embodiment of an apparatus for implementing a demand-based multicast service, in accordance with the methodologies of FIGS. 23A-B.

With reference to FIG. 24, there is provided an exemplary apparatus 2400 that may be configured as a MME in a wireless network, or as a processor or similar device for use within the MME, for managing demand-based eMBMS. The apparatus 2400 may include functional blocks that can represent functions implemented by a processor, software, or combination thereof (e.g., firmware).

As illustrated, in one embodiment, the apparatus 2400 may include an electrical component or module 2402 for receiving counting data indicating numbers of mobile entities receiving a live streaming service via unicast signaling through a P-GW and identifiers for the mobile entities. For example, the electrical component 2402 may include at least one control processor coupled to a network interface or the like and to a memory with instructions for receiving content requests communicating with a gate way server. The electrical component 2402 may be, or may include, a means for receiving counting data indicating numbers of mobile entities receiving a live streaming service via unicast signaling through a P-GW and identifiers for the mobile entities. Said means may include an algorithm executed by one or more processors. The algorithm may include, for example, communicating with a P-GW to obtain the count of mobile entities receiving the live streaming service, either periodically, or in response to a signal from the P-GW indicating that the count has exceeded a defined threshold, and obtaining identifying information for the mobile entities receiving the streaming service and included in the count.

The apparatus 2400 may include an electrical component 2404 for determining a demand level for the live streaming service in an area of the wireless communications system, using the counting data and identifiers. For example, the electrical component 2404 may include at least one control processor coupled to a network interface and to a memory holding instructions for detecting demand levels. The electrical component 2404 may be, or may include, a means for determining the demand level for the live streaming service in an area of the wireless communications system, using the counting data and identifiers. Said means may include an algorithm executed by one or more processors. The algorithm may include, for example, determining a location for each of the mobile entities based on the identifiers. For example, if the identifiers include IP addresses, the algorithm may look up the network location for each IP address using a look up table or similar data structure. The algorithm may further include, calculating a number of mobile entities receiving the live streaming service in each area, or in at least one area, based on the network location determined for each of the mobile entities.

The apparatus 2400 may include an electrical component 2406 for establishing a multicast session for the live streaming service in one or more areas of the wireless communications system, based at least in part on the demand. For example, the electrical component 2406 may include at least one control processor coupled to a network interface or the like and to memory holding instructions for transmitting the instructions to other network entities. The electrical component 2406 may be, or may include, a means for establishing a multicast session for the live streaming service in one or more areas of the wireless communications system, based at least in part on the demand. Said means may include an algorithm executed by one or more processors. The algorithm may include, for example, determining a fixed or variable demand threshold, comparing the demand threshold to the count of mobile entities receiving the streaming service for each of one or more areas, and providing instructions to network entities (e.g. to base stations) in each area where the count exceeds the threshold, providing information for transitioning the live streaming to a multicast service in the each area. The apparatus 2400 may include similar electrical components for performing any or all of the additional operations 2350 described in connection with FIG. 23B, which for illustrative simplicity are not shown in FIG. 24.

In related aspects, the apparatus 2400 may optionally include a processor component 2410 having at least one processor, in the case of the apparatus 2400 configured as a network entity. The processor 2410, in such case, may be in operative communication with the components 2402-2406 or similar components via a bus 2412 or similar communication coupling. The processor 2410 may effect initiation and scheduling of the processes or functions performed by electrical components 2402-2406.

In further related aspects, the apparatus 2400 may include a network interface component 2414 for communicating with other network entities. The apparatus 2400 may optionally include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for performing the activity of the components 2402-2406, and subcomponents thereof, or the processor 2410, the additional operations 2350, or the methods disclosed herein. The memory component 2416 may retain instructions for executing functions associated with the components 2402-2406. While shown as being external to the memory 2416, it is to be understood that the components 2402-2406 can exist within the memory 2416.

Figure 25A:
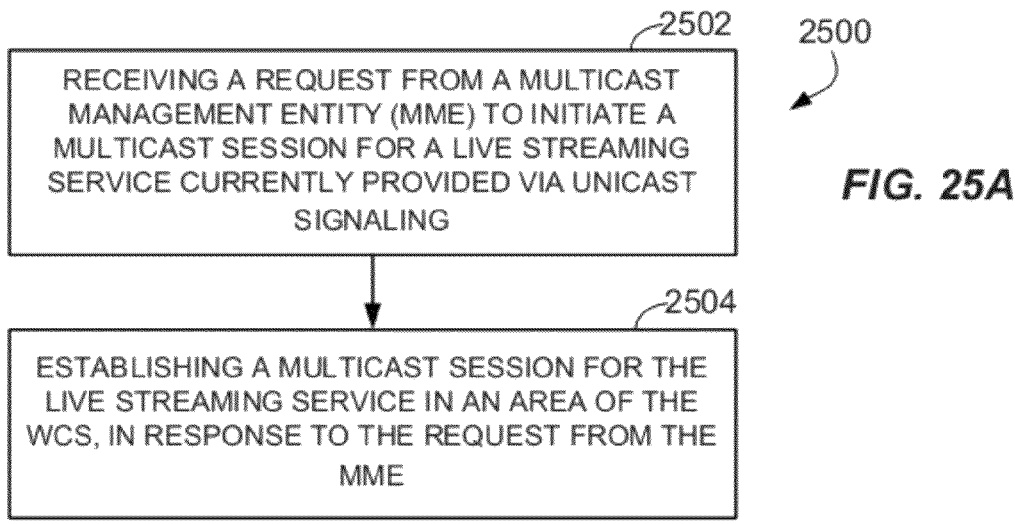
FIGS. 25A-B illustrate embodiments of a methodology for implementing a demand-based multicast service using a Multicast Coordinating Entity, according to the fourth alternative.

Further in addition, FIG. 25A shows a method 2500 for managing demand-based multicast services at an MCE of a wireless communications system capable of both unicast and multicast signaling. The method 2500 may include the MCE, at 2502, receiving a request from an MME to initiate a multicast session for a live streaming service currently provided via unicast signaling. The method 2500 may further include the MCE, at 2504, establishing a multicast session for the live streaming service in one or more areas of the wireless communications system, in response to the request from the MME.

Figure 25B:
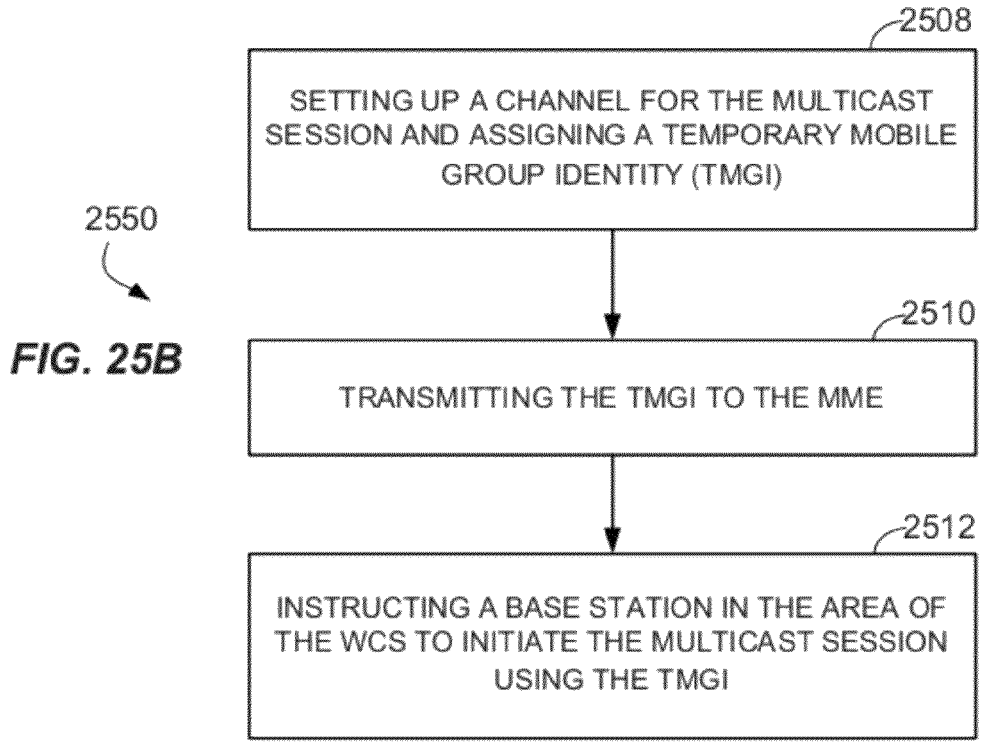

In addition, FIG. 25B shows further optional elements 2550 that may be implemented for use by the MCE in association with method 2500. These optional elements may, in the alternative, be performed by some other network entity in whole or in part. The elements 2550 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2500 includes at least one operation of FIG. 25B, then the method 2500 may terminate after the at least one operation, without necessarily having to include any subsequent downstream operation(s) that may be illustrated.

The additional elements 2550 may include, at 2508, the MCE setting up a channel for the multicast session and assigning a TMGI. The additional elements 2550 may further include, at 2510, the MCE transmitting the TMGI to the MME. The additional elements 2550 may further include, at 2512, the MCE instructing one or more base stations in the one or more areas of the wireless communications system to initiate the multicast session using the TMGI.

Figure 26:
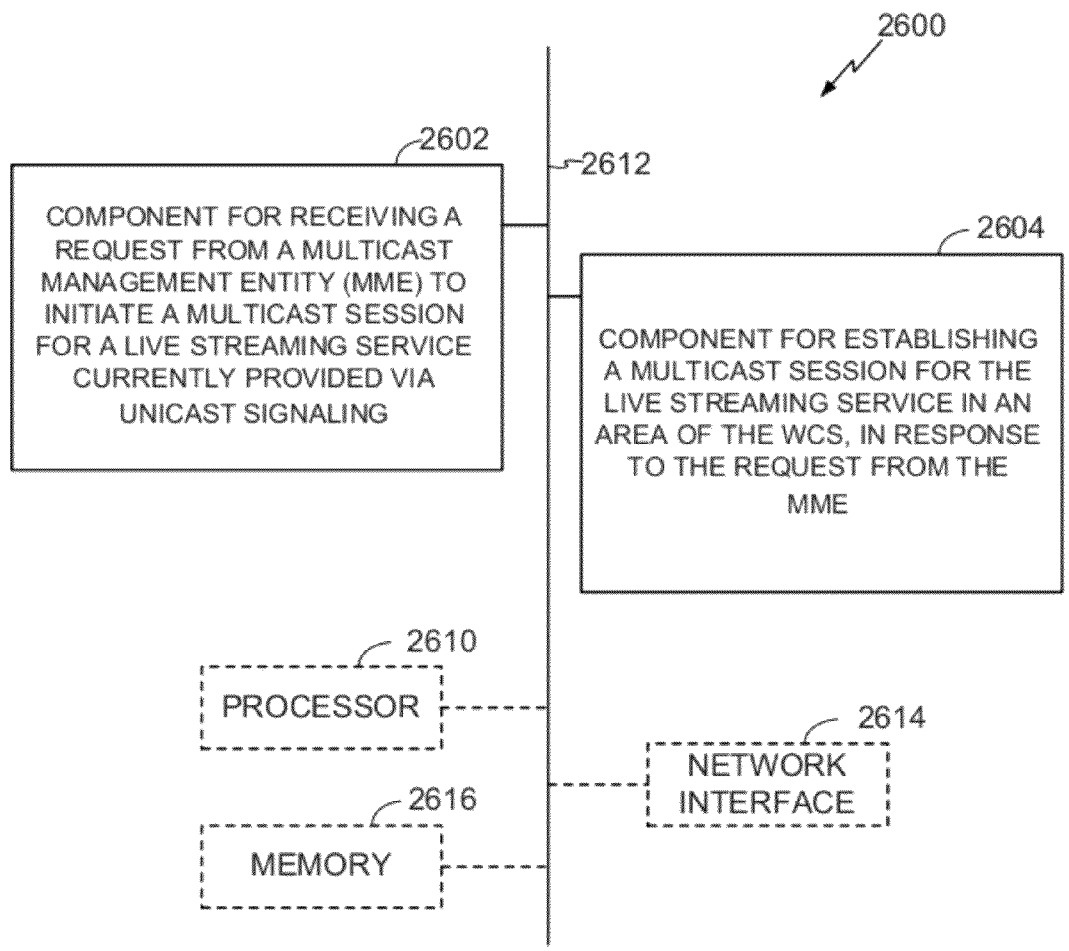
FIG. 26 illustrates an embodiment of an apparatus for implementing a demand-based multicast service, in accordance with the methodologies of FIGS. 25A-B.

With reference to FIG. 26, there is provided an exemplary apparatus 2600 that may be configured as a MCE in a wireless network, or as a processor or similar device for use within the MCE, for managing demand-based eMBMS. The apparatus 2600 may include functional blocks that can represent functions implemented by a processor, software, or combination thereof (e.g., firmware).

As illustrated, in one embodiment, the apparatus 2600 may include an electrical component or module 2602 for receiving a request from an MME to initiate a multicast session for a live streaming service currently provided via unicast signaling. The method is not limited to performance by an MME, and may be performed by any network entity or combination of entities for which the defined operations are possible and permitted by applicable standards. For example, the electrical component 2602 may include at least one control processor coupled to a network interface or the like and to a memory with instructions for communicating with an MCE. The electrical component 2602 may be, or may include, a means for receiving a request from an MME to initiate a multicast session for a live streaming service currently provided via unicast signaling. Said means may include an algorithm executed by one or more processors. The algorithm may include, for example, receiving a data transmission over a network interface, authenticating the transmission as being provided from the MME, and processing the transmission to detect the request and recognize any accompanying parameters.

The apparatus 2600 may include an electrical component 2604 for establishing a multicast session for the live streaming service in one or more areas of the wireless communications system, in response to the request from the MME. For example, the electrical component 2604 may include at least one control processor coupled to a network interface and to a memory holding instructions for establishing an eMBMS session in cooperation with other network entities. The electrical component 2604 may be, or may include, a means for establishing an eMBMS session in cooperation with other network entities. Said means may include an algorithm executed by one or more processors. The algorithm may include, for example, determining parameters for the multicast session (e.g., resource blocks, QoS, or other parameters), based on the request from the MME, and communicating with base stations in the defined multicast area to transition signaling for the content to multicast signaling (e.g., eMBMS) according to the parameters specified by the request. The apparatus 2600 may include similar electrical components for performing any or all of the additional operations 2550 described in connection with FIG. 25B, which for illustrative simplicity are not shown in FIG. 26.

In related aspects, the apparatus 2600 may optionally include a processor component 2610 having at least one processor, in the case of the apparatus 2600 configured as a network entity (e.g., MCE). The processor 2610, in such case, may be in operative communication with the components 2602-2604 or similar components via a bus 2612 or similar communication coupling. The processor 2610 may effect initiation and scheduling of the processes or functions performed by electrical components 2602-2604.

In further related aspects, the apparatus 2600 may include a network interface component 2614 for communicating with other network entities. The apparatus 2600 may optionally include a component for storing information, such as, for example, a memory device/component 2616. The computer readable medium or the memory component 2616 may be operatively coupled to the other components of the apparatus 2600 via the bus 2612 or the like. The memory component 2616 may be adapted to store computer readable instructions and data for performing the activity of the components 2602-2604, and subcomponents thereof, or the processor 2610, the additional operations 2550, or the methods disclosed herein. The memory component 2616 may retain instructions for executing functions associated with the components 2602-2604. While shown as being external to the memory 2616, it is to be understood that the components 2602-2604 can exist within the memory 2616.

Demand Monitoring

In the preceding discussion, various methodologies and apparatus are discussed that involve monitoring of demand for a service, such as an eMBMS service. There are further schemes, however, that may be used in conjunction with or instead of some or all of the above-mentioned schemes. These further schemes may utilize a network entity that may be referred to, for example, as a high attach rate detection module (HDM). This is shown in FIG. 6B, which is similar to FIG. 6A, and uses the same reference numerals for corresponding elements. The HDM 624 may be an additional distinct network entity, or it may be incorporated into, for example, the P-GW 610 or the BM-SC 612 (e.g., as a logical entity). If the HDM 624 is implemented as a distinct network entity, it may be located, for example, between the P-GW 610 and the BM-SC 612; however, the invention is not thus limited.

A first further demand monitoring scheme may be based on the use, by UEs in demand-based MBMS, of dedicated connections, for example, dedicated APNs or PDN connections, even when receiving content in a broadcast/multicast mode. In the case of a UE initially receiving content in a unicast mode and then being switched to a broadcast/multicast mode, the existing dedicated connection between the UE and the network may be maintained, even after switching to the delivery of the content via a broadcast/multicast connection. In the case of a UE joining a broadcast/multicast service in progress (e.g., a "late UE"), such a late UE may still be required to be connected to the network using such a dedicated connection or to use an existing dedicated connection (e.g., PDN connection), even though the late UE may be receiving the content in broadcast mode. In this scheme, a UE may maintain a list of URLs corresponding to content that may be received in unicast and/or broadcast/multicast mode and may transmit a message to the network, indicating URLs of content the UE wants to receive. While this discussion may refer to URLs, it should be noted that other identifiers of content being received may be used, in addition to or instead of URLs. This message may be transmitted to the network via the dedicated connection (e.g., PDN or APN). The message may be interpreted by the P-GW, and the HDM may receive from the P-GW the indications of services being received by the various UEs in unicast mode and/or in broadcast/multicast mode. Alternatively, if the HDM is incorporated into the P-GW, this may be an internal operation within the P-GW; or if the HDM is incorporated into the BM-SC, the P-GW may forward the information to the BM-SC for processing. The HDM may then provide counts of how many UEs are receiving various content offerings in unicast mode or in broadcast/multicast mode and may provide such information as demand information, e.g., to the BM-SC or other network entity responsible for deciding whether to initiate a transition from unicast delivery of content to broadcast/multicast delivery of content (or vice versa).

A second further demand monitoring scheme may be based on counting IP socket connections. In this scheme, UEs that are interested in receiving content, in either unicast or broadcast/multicast mode, may set up unicast socket-based connections with the network. Such socket-based connections may, for example, be connections to the HDM. The HDM may then track a number of UEs corresponding to a given URL by counting socket-based connections corresponding to UEs receiving content associated with the URL. As above, it should be noted that, while this discussion may mention URLs, other content identifiers may similarly be used instead of or in addition to URLs. Again, even a late UE, joining in receiving content that is being sent in broadcast/multicast mode, may set up such a socket-based connection, which may facilitate counting. In this scheme, a relatively large TCP keep-alive timer may be negotiated for the socket, e.g., to avoid frequent wake-ups (e.g., when the content is being delivered via broadcast/multicast, and the connection may not be very active, so if the TCP keep-alive timer is not large, frequent probes may be sent between the network and the UE to test the connection, which may waste resources). In such a scheme, the UEs may close their respective socket-based connections when they are finished receiving the respective content and/or if they no longer wish to receive such content. Again, the HDM may forward count information for various content offerings to an appropriate network entity, which may determine, e.g., based on the count, whether or not to transition to a different mode of offering the content.

In a third further demand monitoring scheme, a UE may periodically provide reception reports to the network, or alternatively, the network may embed a command within the content being transmitted to the UE to signal the UE to provide a reception report. In the latter case, the command may be, for example, initiated by the BM-SC; however, the invention is not thus limited. The UE may maintain (or compile, upon demand) a list of services being received in unicast and/or broadcast/multicast modes. The reception report sent to the network by the UE may contain URLs (and/or other identifiers, as mentioned above) of services being obtained by the UE in unicast and/or broadcast/multicast mode. Again, the HDM may process these reports and provide counts of UEs receiving respective content to an appropriate network entity.

Finally, in a fourth further demand monitoring scheme, UEs may send counting messages to the network. These counting messages may be sent periodically or may be sent upon demand from the network (e.g., in response to a counting request from the network, which may, for example, be sent from the BM-SC to the MCE, via the MBMS-GW and the MME, and this may be sent to UEs via the eNBs). A counting message may carry URLs and/or TMGIs (and/or other identifiers, as mentioned above) corresponding to content being received by a UE in unicast and/or broadcast/multicast mode. The HDM may receive the count information, which may, e.g., be obtained from the MCE, and may provide the count information to an appropriate network entity.

In a further variation of the first, third, and fourth schemes discussed above, a UE may also be triggered, e.g., internally, by having a timer timeout, or by negotiating a timeout interval with the network, to send an update message to the network if the UE stops receiving a particular service. This further message may be a complete listing of the URLs corresponding to content still being received, or it may be a specific update message.

Base Station

Figure 27A:
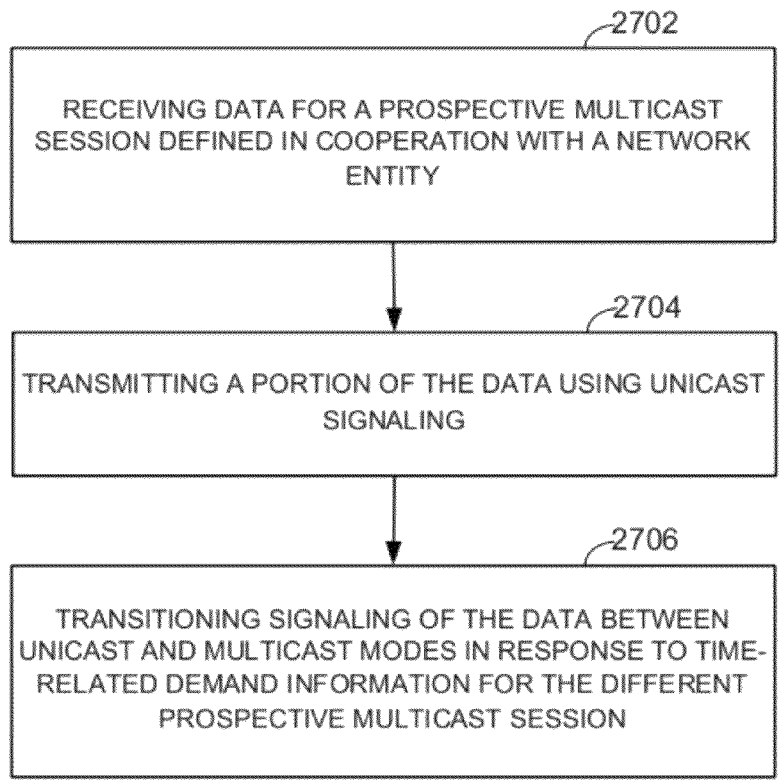
FIGS. 27A-B illustrate embodiments of a methodology for implementing a demand-based multicast service using a base station, consistent with the first through fourth alternatives.

A base station may be operated in cooperation with other network entities to perform any or all of the various aspects discussed above. Certain operations of a base station may be useful for all of the examples discussed above, as disclosed below in connection with FIGS. 27A-B. Referring to FIG. 27A, a method 2700 for managing demand-based multicast services at a base station of a wireless communications system capable of both unicast and multicast signaling is illustrated. The method 2700 may include the base station, at 2702, receiving data for a prospective multicast session, the multicast session defined in cooperation with a network entity. Such data may be transmitted via a P-GW or other network entity to multiple eNB's for transmission to multiple mobile entities. The method 2700 may further include the base station, at 2704, transmitting a portion of the data using unicast signaling. The method 2700 may further include, at 2706, the base station transitioning signaling of the data between unicast and multicast modes in response to time-related demand information for the prospective multicast session. The base station may not itself receive details of the time-related demand information, such as counting or location data. Instead, it may receive a signal generated by a different network entity simply instructing it to initiate a multicast session because the network entity has determined that a demand level in the base station area has passed a defined threshold at a current (or very recent) time. This signal may be considered to be a form of time-related demand information.

Figure 27C:
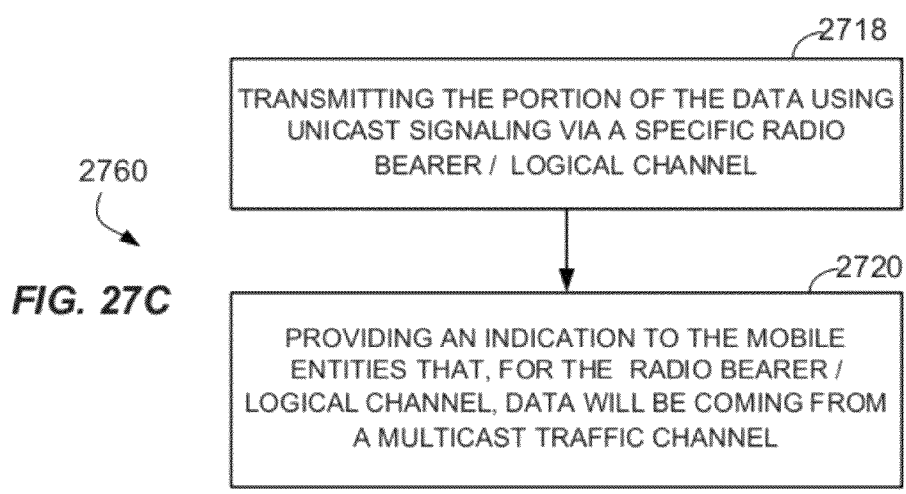
FIG. 27C illustrates embodiments of a methodology for implementing a demand-based multicast service using a base station, consistent with the fourth alternative.
Figure 27B:
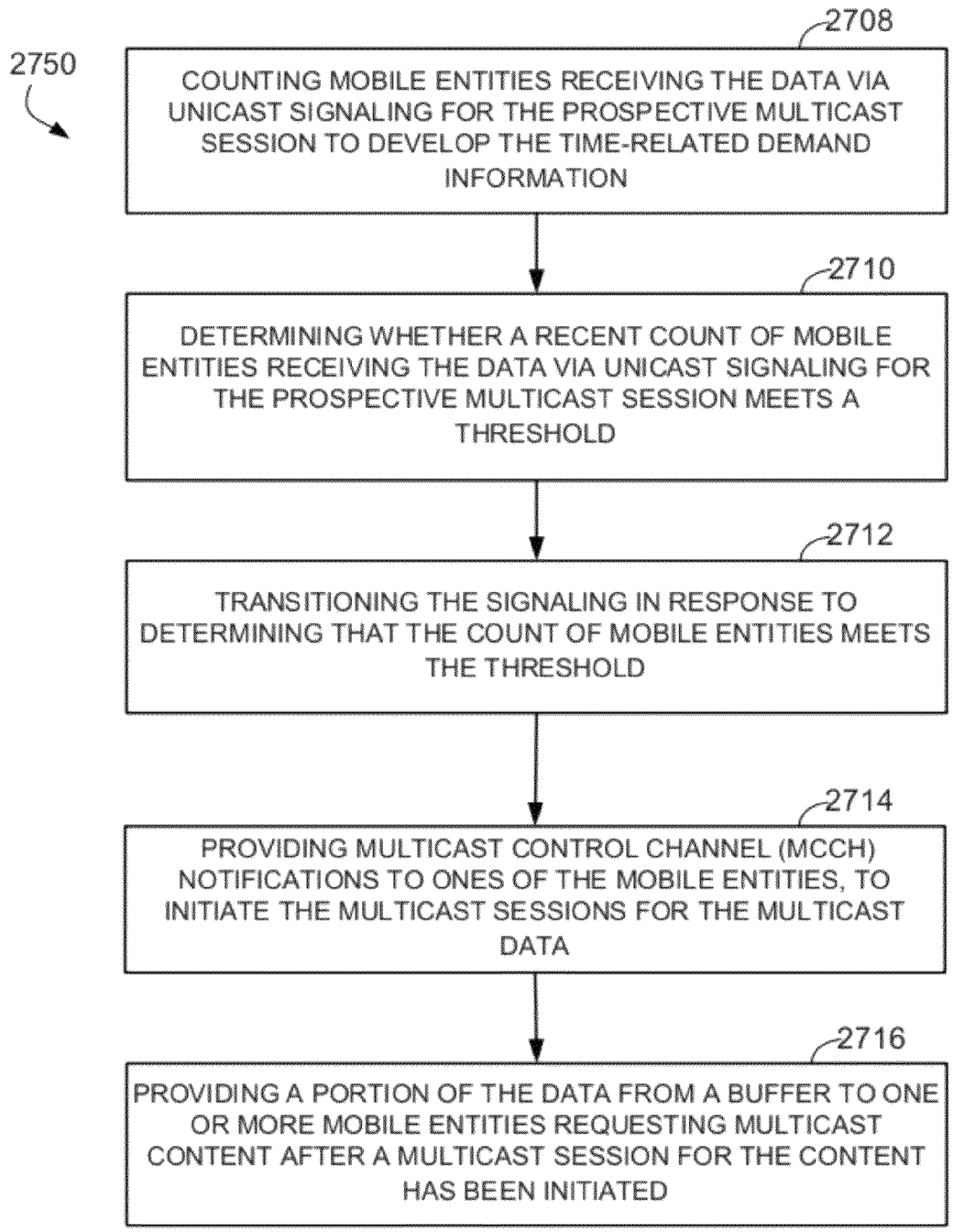

In addition, FIG. 27B shows further optional elements 2750 that may be implemented for use by the base station in association with method 2700. These optional elements may, in the alternative, be performed by some other network entity in whole or in part. The elements 2750 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2700 includes at least one operation of FIG. 27B, then the method 2700 may terminate after the at least one operation, without necessarily having to include any subsequent downstream operation(s) that may be illustrated.

The additional elements 2750 may include, at 2708, counting mobile entities receiving the data via unicast signaling for the prospective multicast session to develop the time-related demand information. The additional elements 2750 may further include, at 2710, determining whether a recent count of mobile entities receiving the data via unicast signaling for the prospective multicast session meets a threshold, as a way of transitioning the signaling to multicast transmission. The additional elements 2750 may further include, at 2712, transitioning the signaling in response to determining that the count of mobile entities meets the threshold. Elements 2708, 2710 and 2712 may be performed using a P-GW, MCE, or MME. The additional elements 2750 may further include, at 2714, the base station providing MCCH notifications to ones of the mobile entities, to initiate the multicast session for the data. The additional elements 2750 may further include, at 2716, the base station providing a portion of the data from a buffer to one or more mobile entities requesting multicast content after a multicast session for the content has been initiated. The data may be buffered and provided to the base station by another network entity, such as a P-GW, MCE or MME. As noted above, this may be useful to enable a late-arriving mobile entity to have uninterrupted access to an entirety of a broadcast program.

Certain operations of a base station may be useful for one of the four aspects discussed above. FIG. 27C shows further optional elements 2760 that may be implemented for use by the base station in association with method 2700, for use with embodiments in class 4. The additional operations 2760 may include, at 2718, the base station transmitting the portion of the data using unicast signaling via a specific radio bearer and logical channel. The additional operations 2760 may include, at 2720, the base station providing an indication to the mobile entities that, for the specific radio bearer and logical channel, data will be transitioned to a multicast traffic channel.

Figure 28:
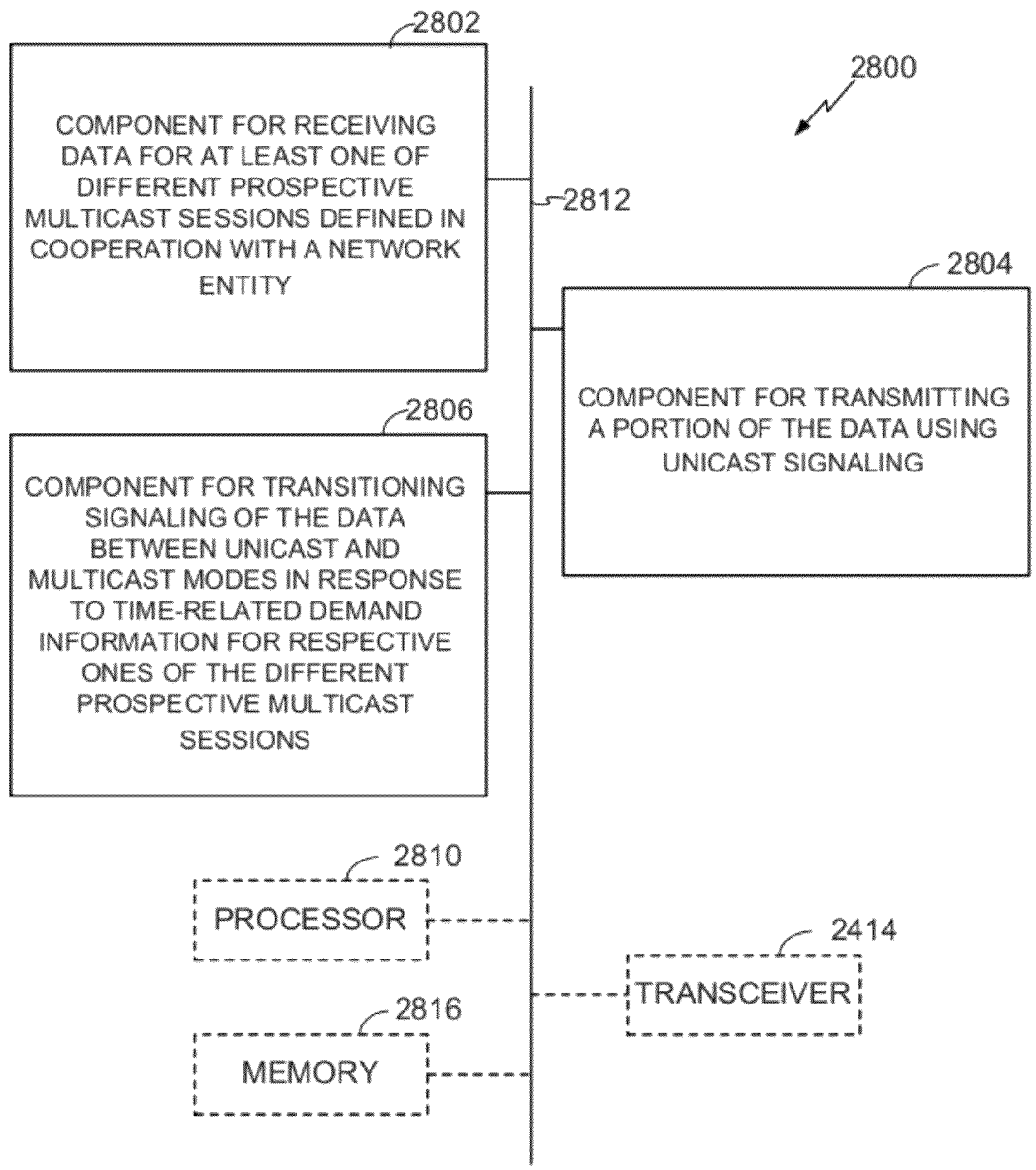
FIG. 28 illustrates an embodiment of an apparatus for implementing a demand-based multicast service at a base station, in accordance with the methodologies of FIGS. 27A-B.

With reference to FIG. 28, there is provided an exemplary apparatus 2800 that may be configured as a network entity in a wireless network, or as a processor or similar device for use within the network entity, for providing eMBMS. The network entity may be an eNB, or other base station (e.g., Home Node B, etc.) of a wireless communications network. The apparatus 2800 may include functional blocks that can represent functions implemented by a processor, software, or combination thereof (e.g., firmware).

As illustrated, in one embodiment, the apparatus 2800 may include an electrical component or module 2802 for receiving data for a prospective multicast session, the multicast session defined in cooperation with a network entity. For example, the electrical component 2802 may include at least one control processor coupled to a transceiver or the like and to a memory with instructions for selecting multicast data. The electrical component 2802 may be, or may include, a means for receiving data for a prospective multicast session, the multicast session defined in cooperation with a network entity. Said means may include an algorithm executed by one or more processors. The algorithm may include, for example, receiving parameters for a multicast session from an MCE or other network entity, receiving content identified as for the multicast session from a content source, and caching the content for transmittal via one or more of a unicast or multicast transmission.

The apparatus 2800 may include an electrical component 2804 for transmitting a portion of the data using unicast signaling. For example, the electrical component 2804 may include at least one control processor coupled to a transceiver or the like and to a memory holding instructions for transmitting multicast data via unicast signaling. The electrical component 2804 may be, or may include, a means for transmitting a portion of the data using unicast signaling. Said means may include an algorithm executed by one or more processors. The algorithm may include, for example, determining based on parameters for the multicast session and on a clock whether a time for initiating the multicast session has commenced, and prior to such time, transmitting a portion of the data in one or more unicast session to requesting mobile entities. The algorithm may, in the alternative or in addition, include one or more of the operations 2750 described in connection with FIG. 27B.

The apparatus 2800 may include an electrical component 2806 for transitioning signaling of the data between unicast and multicast modes in response to time-related demand information for the prospective multicast session. For example, the electrical component 2806 may include at least one control processor coupled to a transceiver or the like and to a memory holding instructions for initiating a multicast session and then terminating unicast signaling. The electrical component 2806 may be, or may include, a means for transitioning signaling of the data between unicast and multicast modes in response to time-related demand information for the prospective multicast session. Said means may include an algorithm executed by one or more processors. The algorithm may include, for example, signaling to mobile entities information for receiving the multicast session and defining termination of unicast sessions for the data, initiating transmission of the data via multicast, and terminating transmission of the data via unicast. The apparatus 2800 may include similar electrical components for performing any or all of the additional operations 2750 or 2760 described in connection with FIGS. 27B-C, which for illustrative simplicity are not shown in FIG. 28.

In related aspects, the apparatus 2800 may optionally include a processor component 2810 having at least one processor, in the case of the apparatus 2800 configured as a network entity. The processor 2810, in such case, may be in operative communication with the components 2802-2806 or similar components via a bus 2812 or similar communication coupling. The processor 2810 may effect initiation and scheduling of the processes or functions performed by electrical components 2802-2806.

In further related aspects, the apparatus 2800 may include a radio transceiver component 2814. A stand alone receiver and/or stand alone transmitter may be used in lieu of or in conjunction with the transceiver 2814. The apparatus 2800 may optionally include a component for storing information, such as, for example, a memory device/component 2816. The computer readable medium or the memory component 2816 may be operatively coupled to the other components of the apparatus 2800 via the bus 2812 or the like. The memory component 2816 may be adapted to store computer readable instructions and data for performing the activity of the components 2802-2806, and subcomponents thereof, or the processor 2810, the additional aspects 2750 or 2760, or the methods disclosed herein. The memory component 2816 may retain instructions for executing functions associated with the components 2802-2806. While shown as being external to the memory 2816, it is to be understood that the components 2802-2806 can exist within the memory 2816.

Mobile Entity

Figure 29A:
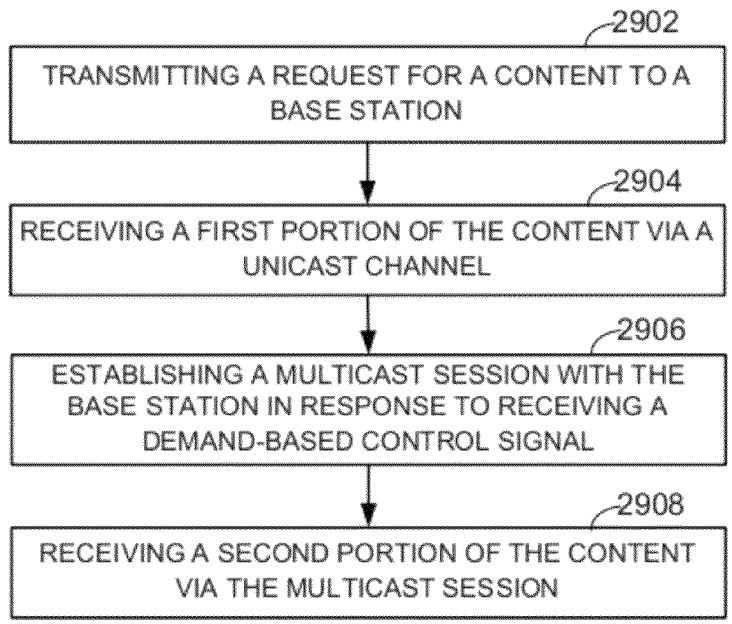
FIGS. 29A-B illustrate embodiments of a methodology for implementing a demand-based multicast service using a mobile entity, consistent with the first through fourth alternatives.

A mobile entity may also be operated in cooperation with other network entities to perform any or all of the various aspects discussed above. Certain operations of a mobile entity may be useful for all of the examples discussed above, as disclosed below in connection with FIGS. 29A-B. Referring to FIG. 29A, a method 2900 for enabling demand-based multicast services at a mobile entity of a wireless communications system capable of both unicast and multicast signaling is illustrated. The method 2900 may include the mobile entity, at 2902, transmitting a request for a content to a base station. The content may be designated as eligible for a multicast session, but the mobile entity may not possess information about eligibility of the content for multicast. The method 2900 may further include the mobile entity, at 2904, receiving a first portion of the content via a unicast channel. The method 2900 may further include, at 2906, the mobile entity establishing a multicast session with the base station in response to receiving a demand-based control signal. The mobile entity may not itself receive details of the time-related demand information, such as counting or location data. Instead, it may receive a signal generated by a base station simply instructing it to establish a multicast session for receiving the content, or to start receiving content via a session established by the base station, because the base station has received a signal indicating that some other network entity has determined that a demand level in the base station area has passed a defined threshold at a current or very recent time. This signal may be considered to be a form of time-related demand information. The method 2900 may further include, at 2908, the mobile entity receiving a second portion of the content via the multicast session.

Figure 29B:
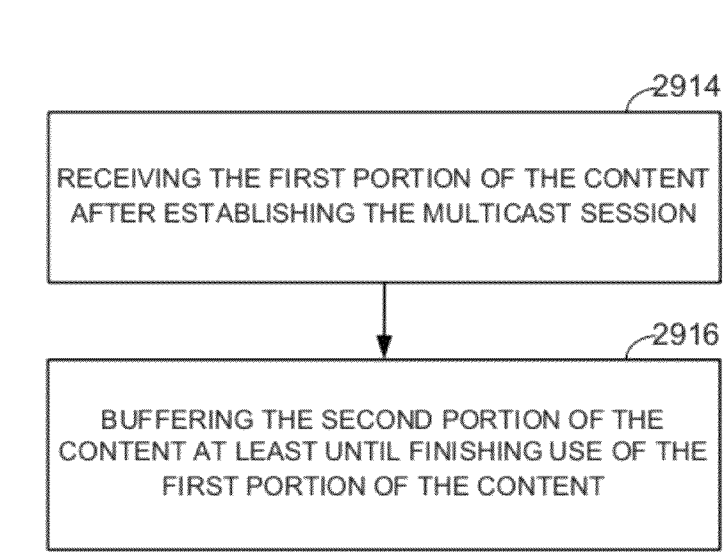

In addition, FIG. 29B shows further optional elements 2930 that may be implemented for use by the mobile entity in association with method 2900. These optional elements may, in the alternative, be performed by some other network entity in whole or in part. The elements 2930 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 2900 includes at least one operation of FIG. 29B, then the method 2900 may terminate after the at least one operation, without necessarily having to include any subsequent downstream operation(s) that may be illustrated.

Referring to FIG. 29B, the additional elements 2930 may include, at 2914, the mobile entity receiving the first portion of the content after establishing the multicast session, for example, when the mobile entity is a late arriver. For example, the mobile entity may receive the first portion of the content via a unicast transmission from the base station, by downloading from a specified address via a network connection, or by any other suitable operation. The additional elements 2935 may further include, at 2916, the mobile entity buffering the second portion of the content at least until finishing use of the first portion of the content. As noted above, this may be useful to enable a late-arriving mobile entity to have uninterrupted access to an entirety of a broadcast program.

Figure 29C:
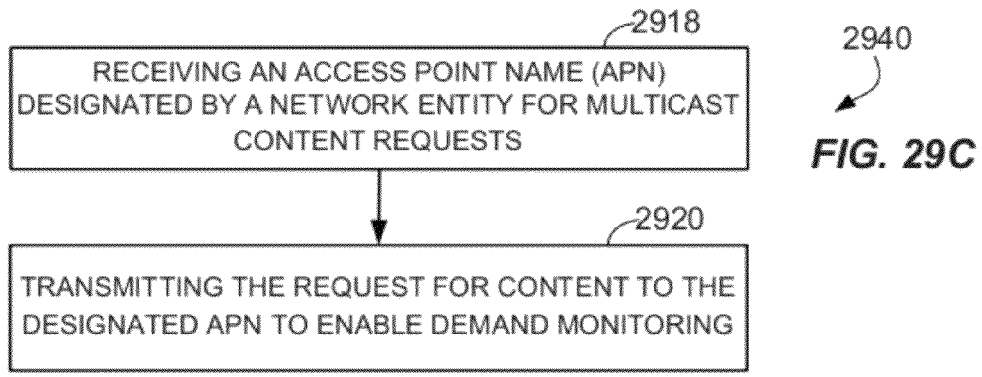
FIG. 29C illustrates embodiments of a methodology for implementing a demand-based multicast service using a mobile entity, consistent with the third alternative.

Certain operations of a mobile entity may be useful in one or more aspects discussed above. FIG. 29C shows further optional elements 2940 that may be implemented for use by the mobile entity in association with method 2900, for use with aspects of class 3. The additional operations 2940 may include, at 2918, the mobile entity receiving an APN designated by a network entity for multicast content requests. The additional operations 2940 may include, at 2920, the mobile entity transmitting the request for content to the designated APN to enable demand monitoring.

Figure 29D:
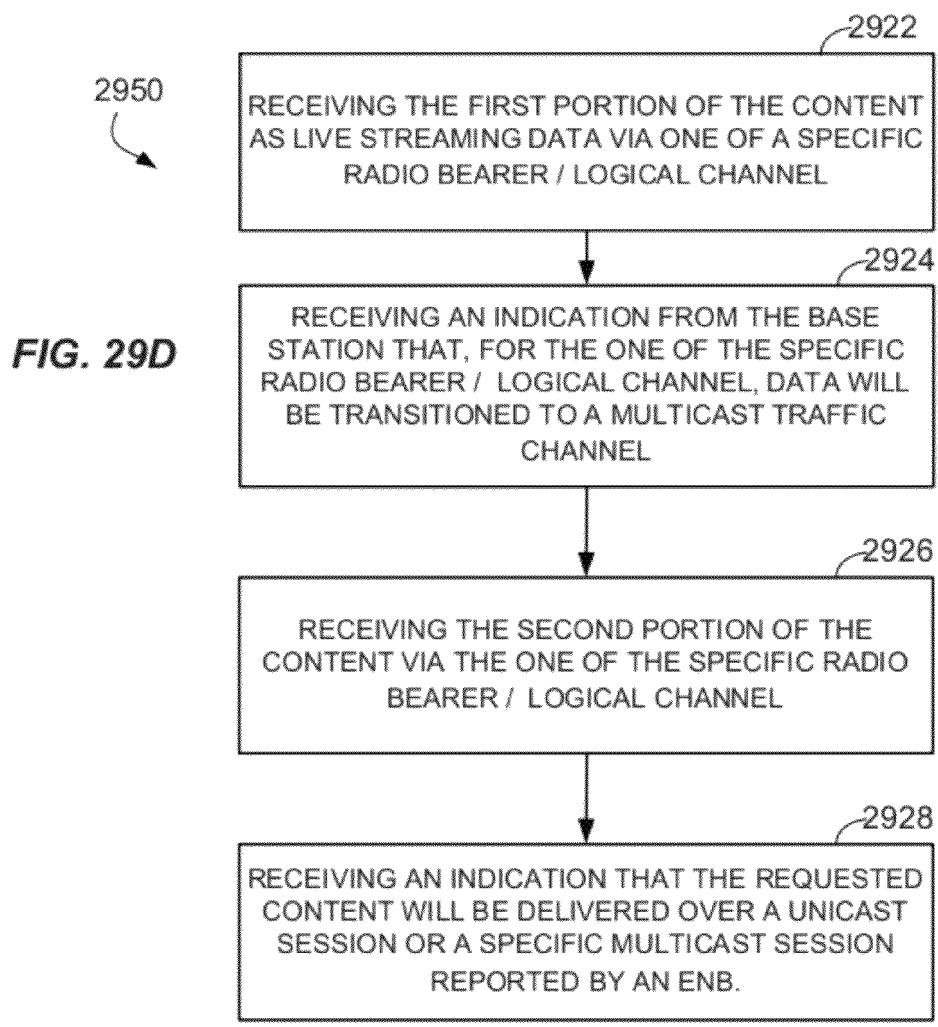
FIG. 29D illustrates embodiments of a methodology for implementing a demand-based multicast service using a mobile entity, consistent with the fourth alternative.

In addition, FIG. 29D shows further optional elements 2950 that may be implemented for use by the mobile entity in association with method 2900, for use with aspects of class 4. The additional operations 2950 may include, at 2922, the mobile entity receiving the first portion of the content as live streaming data via a specific radio bearer and logical channel. The additional operations 2950 may include, at 2924, the mobile entity receiving an indication from the base station that, for the specific radio bearer and logical channel, data will be transitioned to a multicast traffic channel. The additional operations 2950 may include, at 2926, the mobile entity receiving the second portion of the content via the specific radio bearer and logical channel. The additional operations 2950 may include, at 2928, the mobile entity receiving an indication that the requested content will be delivered over a unicast session or a specific multicast session reported by an eNB.

Figure 30:
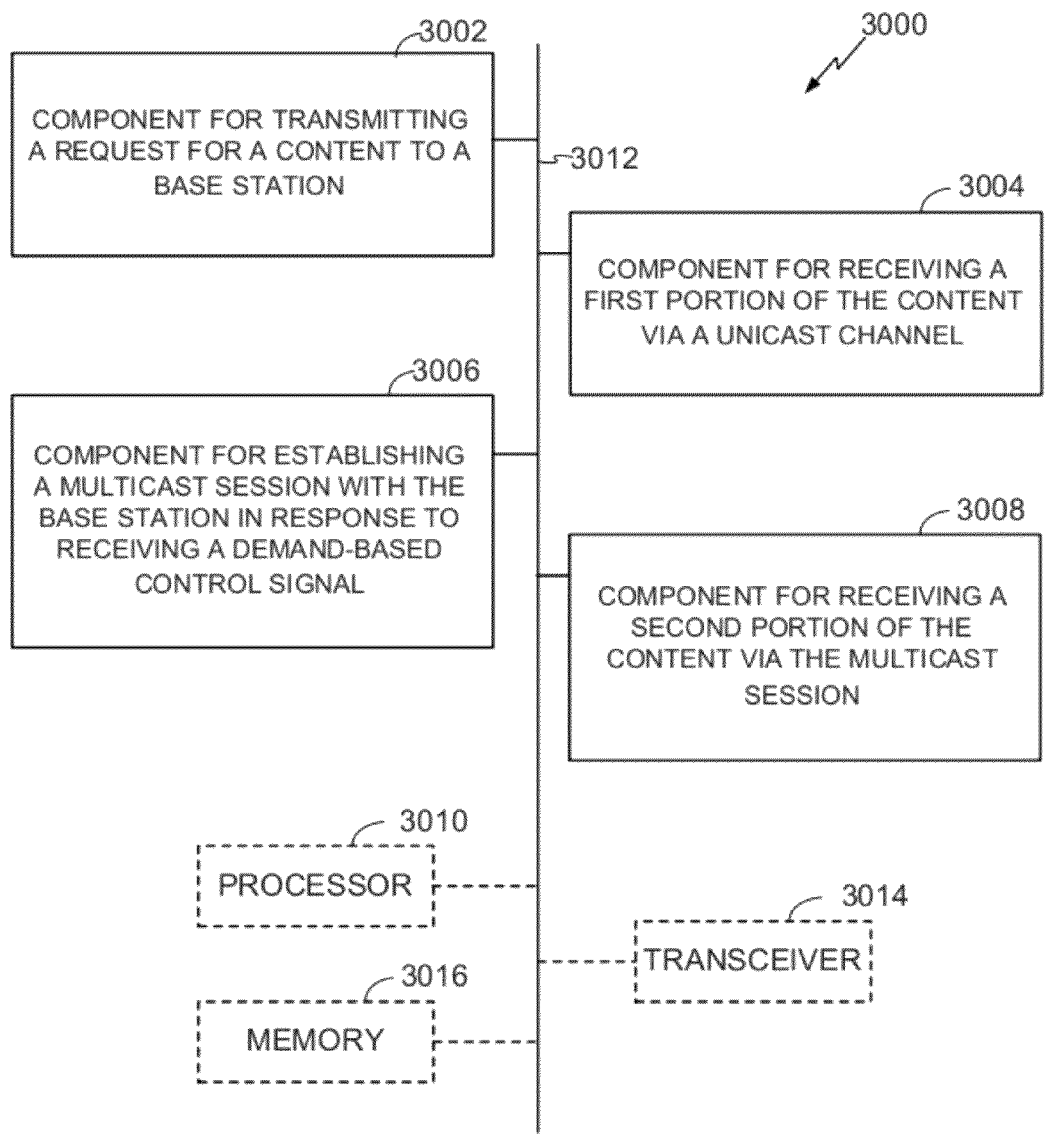
FIG. 30 illustrates an embodiment of an apparatus for implementing a demand-based multicast service at a mobile entity, in accordance with the methodologies of FIGS. 29A-D.

With reference to FIG. 30, there is provided an exemplary apparatus 3000 that may be configured as a mobile entity in a wireless network, or as a processor or similar device for use within the mobile entity, for enabling demand-based multicast services at a mobile entity of a wireless communications system capable of both unicast and multicast signaling. The apparatus 3000 may include functional blocks that can represent functions implemented by a processor, software, or combination thereof (e.g., firmware).

As illustrated, in one embodiment, the apparatus 3000 may include an electrical component or module 3002 for transmitting a request for content to a base station. For example, the electrical component 3002 may include at least one control processor coupled to a transceiver or the like and to a memory with instructions for transmitting a request for a content to a base station. The electrical component 3002 may be, or may include, a means for transmitting a request for content to a base station. Said means may include an algorithm executed by one or more processors. The algorithm may include, for example, receiving user input indicating a selection of the content, generating a request for the content in response to the user input, and transmitting the request to a base station.

The apparatus 3000 may further include an electrical component 3004 for receiving a first portion of the content via a unicast channel. For example, the electrical component 3004 may include at least one control processor coupled to a transceiver or the like and to a memory holding instructions for receiving content via unicast signaling. The electrical component 3004 may be, or may include, a means for receiving a first portion of the content via a unicast channel. Said means may include an algorithm executed by one or more processors. The algorithm may include, for example, receiving control information for receiving the content via unicast, and receiving and decoding unicast data according to the control information to obtain the content.

The apparatus 3000 may further include an electrical component 3006 for establishing a multicast session with the base station in response to receiving a demand-based control signal. For example, the electrical component 3006 may include at least one control processor coupled to a transceiver or the like and to a memory holding instructions for establishing a multicast session despite a concurrent unicast session for the same content. The electrical component 3006 may be, or may include, a means for establishing a multicast session with the base station in response to receiving a demand-based control signal. Said means may include an algorithm executed by one or more processors. The algorithm may include, for example, receiving a control signal via the MCCH indicating availability of content via a multicast transmission, and decoding parameters for receiving the multicast transmission while receiving the content via unicast.

The apparatus 3000 may further include an electrical component 3008 for receiving a second portion of the content via the multicast session. For example, the electrical component 3008 may include at least one control processor coupled to a transceiver or the like and to a memory holding instructions for receiving a second portion of the content via the multicast session and transitioning to the multicast session. The electrical component 3008 may be, or may include, a means for receiving a second portion of the content via the multicast session. Said means may include an algorithm executed by one or more processors. The algorithm may include, for example, receiving a signal indicating that unicast transmission of the content is terminated, receiving multicast data via a multicast transmission, and decoding the multicast data to obtain the content. The apparatus 3000 may include similar electrical components for performing any or all of the additional operations 2930, 2940 or 2950 described in connection with FIG. 29B-D, which for illustrative simplicity are not shown in FIG. 30.

In related aspects, the apparatus 3000 may optionally include a processor component 3010 having at least one processor, in the case of the apparatus 3000 configured as a mobile entity. The processor 3010, in such case, may be in operative communication with the components 3002-3008 or similar components via a bus 3012 or similar communication coupling. The processor 3010 may effect initiation and scheduling of the processes or functions performed by electrical components 3002-3008.

In further related aspects, the apparatus 3000 may include a radio transceiver component 3014. A stand alone receiver and/or stand alone transmitter may be used in lieu of or in conjunction with the transceiver 3014. The apparatus 3000 may optionally include a component for storing information, such as, for example, a memory device/component 3016. The computer readable medium or the memory component 3016 may be operatively coupled to the other components of the apparatus 3000 via the bus 3012 or the like. The memory component 3016 may be adapted to store computer readable instructions and data for performing the activity of the components 3002-3008, and subcomponents thereof, or the processor 3010, the additional aspects 2930, 2940 or 2950, or the methods disclosed herein. The memory component 3016 may retain instructions for executing functions associated with the components 3002-3008. While shown as being external to the memory 3016, it is to be understood that the components 3002-3008 can exist within the memory 3016.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection may be properly termed a computer-readable medium to the extent involving non-transitory storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transitory length of time. Disk and disc, as used herein, includes compact disc (CD), laser disc, optical disc, digital versatile disc (DVD), floppy disk and blu-ray disc where disks usually encode data magnetically, while discs hold data encoded optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing demand-based multicast services in a wireless communications system (WCS) capable of both unicast and multicast signaling, the method comprising:
   providing content requested by a mobile entity in an area of the WCS via a unicast session;
   determining that a concurrent demand level for the content exceeds a defined threshold for the area of the WCS, wherein determining that the concurrent demand level for the content exceeds the defined threshold comprises:
      receiving one or more reporting messages from respective mobile entities;
      based at least in part on the one or more reporting messages, determining a count of a number of mobile entities presently receiving the content in respective unicast sessions, wherein a respective reporting message comprises a listing of one or more uniform resource locators (URLs) corresponding to content being received via one or more sessions, and wherein determining the count comprises counting a number of mobile entities providing respective URLs corresponding to the content in their reporting messages; and comparing the count to the defined threshold; and
   initiating a multicast session for the content in the area of the WCS, in response to determining the concurrent demand level has exceeded the threshold.

2. The method of claim 1, further comprising stopping transmission of the content via the unicast session for the mobile entity located in the area of the WCS, after initiating the multicast session.

3. The method of claim 1, further comprising establishing multicast areas for the content, in advance of providing the content via a unicast session.

4. The method of claim 1, further comprising publishing availability of the content to the mobile entities, in advance of providing the content via a unicast session.

5. The method of claim 1, further comprising resuming providing of the content via a unicast session, for a mobile entity receiving the content via the multicast session, in response to detecting that a number of mobile entities receiving the content via the multicast session has dropped below a defined threshold.

6. The method of claim 1, further comprising monitoring the concurrent demand level by counting a number of requests in the area of the WCS for the content received via respective base stations of the WCS.

7. The method of claim 6, further comprising recognizing the requests for the content using a Uniform Resource Locator (URL) that is common to the requests.

8. The method of claim 1, further comprising monitoring the concurrent demand level by determining locations of the mobile entities from respective source Internet Protocol (IP) addresses assigned to the mobile entities.

9. The method of claim 8, further comprising assigning the IP addresses to the mobile entities so as to map to specified locations of the WCS.

10. The method of claim 9, further comprising determining locations of the mobile entities from at least one of a cell identifier, Global Positioning System (GPS) information, tracking area identifier or cell group identifier.

11. The method of claim 1, further comprising redirecting a Domain Name System (DNS) request for content received from the mobile entity to a Broadcast Media Service Center (BM-SC).

12. The method of claim 1, wherein the respective reporting message further comprises temporary mobile group identifiers (TMGIs) corresponding to content being received via one or more sessions, and wherein obtaining the count further comprises counting TMGIs corresponding to the content in their reporting messages.

13. The method of claim 1, further comprising periodically receiving the one or more reporting messages from the respective mobile entities.

14. The method of claim 1, further comprising sending one or more control messages to one or more respective mobile entities to command the one or more respective mobile entities to provide the one or more reporting messages.

15. The method of claim 1, wherein obtaining the count of the number of mobile entities comprises counting a number of socket-based connections corresponding to the mobile entities presently receiving the content in respective unicast sessions.

16. A system for managing demand-based multicast services in a wireless communications system (WCS) capable of both unicast and multicast signaling, the system comprising:
   means for providing content requested by a mobile entity in an area of the WCS via a unicast session;
   means for determining that a concurrent demand level for the content exceeds a defined threshold for the area of the WCS, wherein the means for determining that the concurrent demand level for the content exceeds the defined threshold comprises:
      means for receiving one or more reporting messages from respective mobile entities;
      based at least in part on the one or more reporting messages, means for determining a count of a number of mobile entities presently receiving the content in respective unicast sessions, wherein a respective reporting message comprises a listing of one or more uniform resource locators (URLs) corresponding to content being received via one or more sessions, and wherein the means for determining the count comprises means for counting a number of mobile entities providing respective URLs corresponding to the content in their reporting messages; and
      means for comparing the count to the defined threshold; and
   means for initiating a multicast session for the content in the area of the WCS, in response to determining the concurrent demand level has exceeded the threshold.

17. A system for managing demand-based multicast services in a wireless communications system (WCS) capable of both unicast and multicast signaling, comprising:
   at least one processor configured for providing content requested by a mobile entity in an area of the WCS via a unicast session, determining that a concurrent demand level for the content exceeds a defined threshold for the area of the WCS, and initiating a multicast session for the content in the area of the WCS, in response to determining the concurrent demand level has exceeded the defined threshold, wherein the at least one processor is further configured to determine that the concurrent demand level for the content exceeds the defined threshold by performing further operations comprising:
  receiving one or more reporting messages from respective mobile entities; and
  based at least in part on the one or more reporting messages, determining a count of a number of mobile entities presently receiving the content in respective unicast sessions, wherein a respective reporting message comprises a listing of one or more uniform resource locators (URLs) corresponding to content being received via one or more sessions, and wherein determining the count comprises counting a number of mobile entities providing respective URLs corresponding to the content in their reporting messages; and
  comparing the count to the defined threshold; and
a memory coupled to the at least one processor for storing data.

18. The system of claim 17, wherein the processor is further configured for stopping transmission over the unicast session for the mobile entity located in the area of the WCS, after initiating the multicast session.

19. The system of claim 17, wherein the processor is further configured for establishing multicast areas for the content, in advance of providing the content via a unicast session.

20. The system of claim 17, wherein the processor is further configured for publishing availability of the content to the mobile entities, in advance of providing the content via a unicast session.

21. The system of claim 17, wherein the processor is further configured for resuming providing of the content via a unicast session, for a mobile entity receiving the content via the multicast session, in response to detecting that a number of mobile entities receiving the content via the multicast session has dropped below a defined threshold.

22. The system of claim 21, wherein the processor is further configured for stopping transmission over the multicast session after resuming provision of the content via the unicast session.

23. The system of claim 17, wherein the processor is further configured for monitoring the concurrent demand level by counting a number of requests in the area of the WCS for the content received via respective base stations of the WCS.

24. The system of claim 23, wherein the processor is further configured for recognizing the requests for the content using a Uniform Resource Locator (URL) that is common to the requests.

25. The system of claim 24, wherein the processor is further configured for monitoring the concurrent demand level by determining locations of the mobile entities from respective source Internet Protocol (IP) addresses assigned to the mobile entities.

26. The system of claim 25, wherein the processor is further configured for assigning the IP addresses to the mobile entities so as to map to specified locations of the WCS.

27. The system of claim 26, wherein the processor is further configured for determining locations of the mobile entities from at least one of a cell identifier, Global Positioning System (GPS) information, tracking area identifier or cell group identifier.

28. The system of claim 17, wherein the processor is further configured for redirecting a Domain Name System (DNS) request for content received from the mobile entity to a Broadcast Media Service Center (BM-SC).

29. The system of claim 17, wherein the respective reporting message further comprises temporary mobile group identifiers (TMGIs) corresponding to content being received via one or more sessions, and wherein the at least one processor is further configured for obtaining the count by further performing operations comprising counting TMGIs corresponding to the content in their reporting messages.

30. The system of claim 17, wherein the at least one processor is configured to periodically receive the one or more reporting messages from the respective mobile entities.

31. The system of claim 17, wherein the at least one processor is further configured to send one or more control messages to one or more respective mobile entities to command the one or more respective mobile entities to provide the one or more reporting messages.

32. The system of claim 17, wherein the at least one processor is configured for obtaining the count of the number of mobile entities by performing operations comprising counting a number of socket-based connections corresponding to the mobile entities presently receiving the content in respective unicast sessions.

33. A non-transitory computer-readable medium comprising code for managing demand-based multicast services in a wireless communications system (WCS) capable of both unicast and multicast signaling, including code for:
  providing content requested by a mobile entity in an area of the WCS via a unicast session,
  determining that a concurrent demand level for the content exceeds a defined threshold for the area of the WCS, wherein determining that the concurrent demand level for the content exceeds the defined threshold comprises:
    receiving one or more reporting messages from respective mobile entities;
    based at least in part on the one or more reporting messages, determining a count of a number of mobile entities presently receiving the content in respective unicast sessions, wherein a respective reporting message comprises a listing of one or more uniform resource locators (URLs) corresponding to content being received via one or more sessions, and wherein determining the count comprises counting a number of mobile entities providing respective URLs corresponding to the content in their reporting messages; and
    comparing the count to the defined threshold, and
  initiating a multicast session for the content in the area of the WCS, in response to determining the concurrent demand level has exceeded the threshold.

34. A method for managing demand-based multicast services at a Multicast Coordinating Entity (MCE) of a wireless communications system capable of both unicast and multicast signaling, the method comprising:
  receiving time-related demand information for a content associated with a prospective multicast session, wherein the time-related demand information is based at least in part on common Uniform Resource Locators (URLs) received at a Packet Data Network Gate Way (P-GW) from different mobile entities;
  determining a multicast area for the prospective multicast session, in response to the time-related demand information; and
  communicating with one or more base stations to set up the multicast area.

35. The method of claim 34, further comprising communicating with one or more base stations to tear down the multicast area in response to determining that a corresponding multicast session is finished.

36. An apparatus for managing demand-based multicast services of a wireless communications system capable of both unicast and multicast signaling, the apparatus comprising:
- means for receiving time-related demand information for a content associated with a prospective multicast session, wherein the time-related demand information is based at least in part on common Uniform Resource Locators (URLs) received at a Packet Data Network Gate Way (P-GW) from different mobile entities;
- means for determining a multicast area for the prospective multicast session, in response to the time-related demand information; and
- means for communicating with one or more base stations to set up the multicast area.

37. An apparatus for managing demand-based multicast services of a wireless communications system capable of both unicast and multicast signaling, comprising:
- at least one processor configured for:
  - receiving time-related demand information for a content associated with a prospective multicast session, wherein the time-related demand information is based at least in part on common Uniform Resource Locators (URLs) received at a Packet Data Network Gate Way (P-GW) from different mobile entities,
  - determining a multicast area for the prospective multicast session, in response to the time-related demand information, and
  - communicating with one or more base stations to set up the multicast area; and
- a memory coupled to the at least one processor for storing data.

38. The apparatus of claim 37, wherein the processor is further configured for communicating with one or more base stations to tear down the multicast area in response to determining that a corresponding multicast session is finished.

39. A non-transitory computer-readable medium comprising code for managing demand-based multicast services at a Multicast Coordinating Entity (MCE) of a wireless communications system (WCS) capable of both unicast and multicast signaling, including code for:
- receiving time-related demand information for a content associated with a prospective multicast session, wherein the time-related demand information is based at least in part on common Uniform Resource Locators (URLs) received at a Packet Data Network Gate Way (P-GW) from different mobile entities,
- determining a multicast area for the prospective multicast session, in response to the time-related demand information, and
- communicating with one or more base stations to set up the multicast area.

40. A method for managing demand-based multicast services at a network entity of a wireless communications system (WCS) capable of both unicast and multicast signaling, the method comprising:
- determining time-related demand information for a content using packet data requests originating from different mobile entities via unicast signaling, wherein the time-related demand information is further determined at least in part by detecting common Uniform Resource Locators (URLs) received at a Packet Data Network Gate Way (P-GW) from different mobile entities;
- determining location data for the mobile entities originating the packet data requests; and
- instructing a multicast network entity to establish a multicast session within an area of the WCS, in response to the demand information and location data.

41. The method of claim 40, further comprising determining the location data at least in part by using Multicast Management Entity (MME) reports developed from Non-Access Stratum (NAS) level registration data.

42. The method of claim 40, wherein instructing a multicast network entity further comprises communicating with a Broadcast Media Service Center (BM-SC) to set up an evolved Multicast Broadcast Multimedia Service (eMBMS) session for the specified area of the WCS.

43. The method of claim 42, further comprising determining a count of a number of mobile entities receiving the content via unicast sessions by counting a number of socket-based connections corresponding to the mobile entities presently receiving the content in respective unicast sessions.

44. The method of claim 40, further comprising receiving, at a content server, content requests associated with Internet Protocol (IP) addresses assigned to the mobile entities for the content, and determining the location data, based at least in part on information mapping the IP addresses to one or more areas of the WCS.

45. The method of claim 44, further comprising determining the location data based on at least one of an IP Version 6 prefix and an IP Version 4 Most Significant Bit (MSB) portion of the IP addresses.

46. The method of claim 44, further comprising determining the IP addresses assigned to the mobile entities using source IP addresses of connecting sockets requesting the content.

47. The method of claim 44, further comprising determining the time-related demand information by counting requests for the content from locations within the one or more areas and within a defined time window.

48. The method of claim 40, further comprising receiving a connection request from at least one of the mobile entities at a Packet Data Network Gate Way (P-GW), and assigning a selected one of several Internet Protocol (IP) addresses to at least one of the mobile entities based on a determined location of at least one of the mobile entities originating the connection request.

49. The method of claim 48, further comprising transmitting a content request associated with the selected IP address to a content server.

50. The method of claim 40, wherein the content comprises multicast live streaming services.

51. An apparatus for managing demand-based multicast services of a wireless communications system (WCS) capable of both unicast and multicast signaling, the apparatus comprising:
- means for determining time-related demand information for a content using packet data requests originating from different mobile entities via unicast signaling, wherein the time-related demand information is further determined using at least means for detecting common Uniform Resource Locators (URLs) received at a Packet Data Network Gate Way (P-GW) from different mobile entities;
- means for determining location data for the mobile entities originating the packet data requests; and
- means for instructing a multicast network entity to establish a multicast session within an area of the WCS, in response to the demand information and location data.

52. An apparatus for managing demand-based multicast services of a wireless communications system (WCS) capable of both unicast and multicast signaling, comprising:

at least one processor configured for:
determining time-related demand information for a content using packet data requests originating from different mobile entities via unicast signaling, wherein the time-related demand information is further determined at least in part by detecting common Uniform Resource Locators (URLs) received at a Packet Data Network Gate Way (P-GW) from different mobile entities,
determining location data for the mobile entities originating the packet data requests, and
instructing a multicast network entity to establish a multicast session within an area of the WCS, in response to the demand information and location data; and
a memory coupled to the at least one processor for storing data.

53. The apparatus of claim 52, wherein the processor is further configured for determining the location data at least in part by using Multicast Management Entity (MME) reports developed from Non-Access Stratum (NAS) level registration data.

54. The apparatus of claim 52, wherein the processor is further configured for instructing a multicast network entity by communicating with a Broadcast Media Service Center (BM-SC) to set up an evolved Multicast Broadcast Multimedia Service (eMBMS) session for the specified area of the WCS.

55. The apparatus of claim 52, wherein the processor is further configured for determining a count of a number of mobile entities receiving the content via unicast sessions by counting a number of socket-based connections corresponding to the mobile entities presently receiving the content in respective unicast sessions.

56. The apparatus of claim 52, wherein the processor is further configured for receiving content requests associated with Internet Protocol (IP) addresses assigned to the mobile entities for the content, and determining the location data, based at least in part on information mapping the IP addresses to one or more areas of the WCS.

57. The apparatus of claim 56, wherein the processor is further configured for determining the location data based on at least one of an IP Version 6 prefix and an IP Version 4 Most Significant Bit (MSB) portion of the IP addresses.

58. The apparatus of claim 56, wherein the processor is further configured for determining the IP addresses assigned to the mobile entities using source IP addresses of connecting sockets requesting the content.

59. The apparatus of claim 56, wherein the processor is further configured for determining the time-related demand information by counting requests for the content from locations within the one or more areas and within a defined time window.

60. The apparatus of claim 52, wherein the processor is further configured for receiving a connection request from at least one of the mobile entities, and assigning a selected one of several Internet Protocol (IP) addresses to at least one of the mobile entities based on a determined location of at least one of the mobile entities originating the connection request.

61. The apparatus of claim 60, wherein the processor is further configured for transmitting a content request associated with the selected IP address to a content server.

62. The apparatus of claim 52, wherein the processor is further configured for determining the time-related demand information for the content comprising multicast live streaming services.

63. A non-transitory computer-readable medium comprising code for managing demand-based multicast services at a Packet Data Network Gate Way (P-GW) of a wireless communications system (WCS) capable of both unicast and multicast signaling, including code for:
determining time-related demand information for a content using packet data requests originating from different mobile entities via unicast signaling, wherein the time-related demand information is further determined at least in part by detecting common Uniform Resource Locators (URLs) received at the P-GW from different mobile entities,
determining location data for the mobile entities originating the packet data requests, and
instructing a multicast network entity to establish a multicast session within an area of the WCS, in response to the demand information and location data.

64. A method for managing demand-based multicast services at a base station of a wireless communications system capable of both unicast and multicast signaling, the method comprising:
receiving data for a prospective multicast session, the multicast session defined in cooperation with a network entity;
transmitting a portion of the data using unicast signaling; and
transitioning signaling of the data between unicast and multicast modes in response to time-related demand information for the prospective multicast session, wherein the time-related demand information is based at least in part on common Uniform Resource Locators (URLs) received at a Packet Data Network Gate Way (P-GW) from different mobile entities.

65. The method of claim 64, wherein transitioning the signaling further comprises determining whether a recent count of mobile entities receiving the data via unicast signaling for the prospective multicast session meets a threshold.

66. The method of claim 64, further comprising providing a portion of the data from a buffer to one or more mobile entities requesting multicast content after a multicast session for the content has been initiated.

67. The method of claim 64, further comprising transmitting the portion of the data using unicast signaling via a specific radio bearer and logical channel.

68. The method of claim 67, further comprising providing an indication that, for the specific radio bearer and logical channel, data will be transitioned to a multicast traffic channel.

69. An apparatus for managing demand-based multicast services in a wireless communications system capable of both unicast and multicast signaling, the apparatus comprising:
means for receiving data for a prospective multicast session, the multicast session defined in cooperation with a network entity;
means for transmitting a portion of the data using unicast signaling; and
means for transitioning signaling of the data between unicast and multicast modes in response to time-related demand information for the prospective multicast session, wherein the time-related demand information is based at least in part on common Uniform Resource Locators (URLs) received at a Packet Data Network Gate Way (P-GW) from different mobile entities.

70. An apparatus for managing demand-based multicast services in a wireless communications system capable of both unicast and multicast signaling, comprising:

at least one processor configured for:

receiving data for a prospective multicast session, the multicast session defined in cooperation with a network entity, transmitting a portion of the data using unicast signaling, and transitioning signaling of the data between unicast and multicast modes in response to time-related demand information for the prospective multicast session, wherein the time-related demand information is based at least in part on common Uniform Resource Locators (URLs) received at a Packet Data Network Gate Way (P-GW) from different mobile entities; and a memory coupled to the at least one processor for storing data.

71. The apparatus of claim 70, wherein the processor is further configured for transitioning the signaling by determining whether a recent count of mobile entities receiving the data via unicast signaling for the prospective multicast session meets a threshold.

72. The apparatus of claim 71, wherein the processor is further configured for transitioning the signaling in response to determining that the count of mobile entities meets the threshold.

73. The apparatus of claim 70, wherein the processor is further configured for providing a portion of the data from a buffer to one or more mobile entities requesting multicast content after a multicast session for the content has been initiated.

74. The apparatus of claim 70, wherein the processor is further configured for transmitting the portion of the data using unicast signaling via a specific radio bearer and logical channel.

75. The apparatus of claim 74, wherein the processor is further configured for providing an indication that, for the specific radio bearer and logical channel, data will be transitioned to a multicast traffic channel.

76. A non-transitory computer-readable medium comprising code for managing demand-based multicast services in a wireless communications system capable of both unicast and multicast signaling, including code for:

receiving data for a prospective multicast session, the multicast session defined in cooperation with a network entity, transmitting a portion of the data using unicast signaling, and transitioning signaling of the data between unicast and multicast modes in response to time-related demand information for the prospective multicast session, wherein the time-related demand information is based at least in part on common Uniform Resource Locators (URLs) received at a Packet Data Network Gate Way (P-GW) from different mobile entities.

\* \* \* \* \*